(12) United States Patent
Mitchell

(10) Patent No.: US 10,546,315 B2
(45) Date of Patent: Jan. 28, 2020

(54) SYSTEMS AND METHODS TO ENABLE OFFER AND REWARDS MARKETING, AND CUSTOMER RELATIONSHIP MANAGEMENT (CRM) NETWORK PLATFORM

(71) Applicant: Spring Marketplace, Inc., Chicago, IL (US)

(72) Inventor: Bruce Mitchell, San Francisco, CA (US)

(73) Assignee: Bruce Mitchell, San Francisco, CA (US)

( * ) Notice: Subject to any disclaimer, the term of this patent is extended or adjusted under 35 U.S.C. 154(b) by 111 days.

(21) Appl. No.: 15/435,737

(22) Filed: Feb. 17, 2017

(65) Prior Publication Data

US 2017/0178174 A1    Jun. 22, 2017

Related U.S. Application Data

(63) Continuation-in-part of application No. 14/329,781, filed on Jul. 11, 2014, now abandoned.

(60) Provisional application No. 61/845,984, filed on Jul. 13, 2013.

(51) Int. Cl.
```
G06Q 30/02      (2012.01)
G06Q 20/34      (2012.01)
G06Q 20/32      (2012.01)
```
(52) U.S. Cl.
CPC ..... *G06Q 30/0233* (2013.01); *G06Q 20/3223* (2013.01); *G06Q 20/342* (2013.01); *G06Q 30/0239* (2013.01)

(58) Field of Classification Search
None
See application file for complete search history.

(56) References Cited

U.S. PATENT DOCUMENTS

| 5,948,040 | A | * | 9/1999 | DeLorme | G01C 21/36 340/990 |
| 6,327,573 | B1 | | 12/2001 | Walker et al. | |
| 6,351,467 | B1 | * | 2/2002 | Dillon | H04L 12/18 370/432 |
| 7,991,666 | B2 | | 8/2011 | Haggerty et al. | |
| 8,429,009 | B2 | * | 4/2013 | Connor, Jr. | G06Q 30/02 705/14.3 |

(Continued)

FOREIGN PATENT DOCUMENTS

| KR | 1020110008739 A | 1/2011 |
| KR | 1020110033994 A | 4/2011 |

(Continued)

OTHER PUBLICATIONS

Trademark Electronic Search System (TESS), Starwood, Mar. 28, 2017, United States Patent and Trademark Office.*

(Continued)

*Primary Examiner* — Scott D Gartland
*Assistant Examiner* — Christopher B Tokarczyk
(74) *Attorney, Agent, or Firm* — NEO IP

(57) ABSTRACT

Systems and methods for providing and operating a customer loyalty and rewards platform including network-based and merchant-based registration and management, including mobile messaging, remote and local customer registration options, enrollment and automated payment card account association therewith.

16 Claims, 86 Drawing Sheets

(56) References Cited

U.S. PATENT DOCUMENTS

| | | |
|---|---|---|
| 8,505,813 B2 | 8/2013 | Grossman et al. |
| 2002/0062249 A1 | 5/2002 | Iannacci |
| 2002/0111859 A1 | 8/2002 | Sheldon et al. |
| 2002/0128916 A1 | 9/2002 | Beinecke |
| 2003/0236704 A1* | 12/2003 | Antonucci ............. G06Q 20/20 705/14.3 |
| 2004/0140361 A1 | 7/2004 | Paul et al. |
| 2005/0204047 A1 | 9/2005 | Mitchell et al. |
| 2007/0094114 A1 | 4/2007 | Bulford et al. |
| 2007/0198352 A1 | 8/2007 | Kannegiesser |
| 2008/0114694 A1* | 5/2008 | Hamdane ............... G06Q 20/02 705/59 |
| 2008/0201230 A1 | 8/2008 | Hardison |
| 2009/0182630 A1 | 7/2009 | Otto et al. |
| 2010/0057580 A1 | 3/2010 | Raghunathan |
| 2010/0082420 A1 | 4/2010 | Trifiletti et al. |
| 2010/0250354 A1 | 9/2010 | Waucampt |
| 2011/0099525 A1* | 4/2011 | Krysiuk ................. G06Q 30/02 715/849 |
| 2011/0106607 A1 | 5/2011 | Alfonso et al. |
| 2011/0125565 A1 | 5/2011 | MacIlwaine et al. |
| 2011/0137716 A1 | 6/2011 | Reuthe et al. |
| 2011/0153403 A1 | 6/2011 | Postrel |
| 2011/0307318 A1 | 12/2011 | Laporte et al. |
| 2012/0101884 A1 | 4/2012 | Duroux et al. |
| 2012/0185321 A1* | 7/2012 | Lal ...................... G06Q 30/0227 705/14.28 |
| 2012/0191525 A1 | 7/2012 | Singh et al. |
| 2012/0221391 A1 | 8/2012 | Wolf et al. |
| 2012/0310826 A1 | 12/2012 | Chatterjee |
| 2013/0054454 A1 | 2/2013 | Purves et al. |
| 2013/0073361 A1 | 3/2013 | Silver |
| 2013/0073377 A1 | 3/2013 | Heath |
| 2013/0117126 A1 | 5/2013 | Coppinger |
| 2013/0211886 A1 | 8/2013 | Kennamer et al. |
| 2013/0254028 A1 | 9/2013 | Salci |
| 2013/0256403 A1 | 10/2013 | Keith |
| 2013/0268333 A1 | 10/2013 | Ovick et al. |
| 2013/0297422 A1 | 11/2013 | Hunter et al. |
| 2013/0339124 A1 | 12/2013 | Postrel |
| 2014/0025457 A1 | 1/2014 | Martinez et al. |
| 2014/0025540 A1 | 1/2014 | Hendrickson |
| 2014/0114737 A1 | 4/2014 | Espejo |
| 2014/0244495 A1 | 8/2014 | Davis et al. |
| 2014/0249941 A1 | 9/2014 | Hicks et al. |
| 2014/0268205 A1* | 9/2014 | Dubois ................... H04L 67/10 358/1.14 |
| 2015/0019317 A1 | 1/2015 | Mitchell |

FOREIGN PATENT DOCUMENTS

| | | |
|---|---|---|
| WO | 2005098702 A2 | 10/2005 |
| WO | 2012024109 A1 | 2/2012 |

OTHER PUBLICATIONS

Trademark Electronic Search System (TESS), Visa, Mar. 28, 2017, United States Patent and Trademark Office.*
Trademark Electronic Search System (TESS), Mastercard, Mar. 28, 2017, United States Patent and Trademark Office.*
Trademark Electronic Search System (TESS), Discover, Mar. 28, 2017, United States Patent and Trademark Office.*
Trademark Electronic Search System (TESS), American Express, Mar. 28, 2017, United States Patent and Trademark Office.*
Trademark Electronic Search System (TESS), Itunes, Mar. 28, 2017, United States Patent and Trademark Office.*
Trademark Electronic Search System (TESS), Groupon, Mar. 28, 2017, United States Patent and Trademark Office.*
Trademark Electronic Search System (TESS), Livingsocial, Mar. 28, 2017, United States Patent and Trademark Office.*
Trademark Electronic Search System (TESS), Amazon, Mar. 28, 2017, United States Patent and Trademark Office.*
Trademark Electronic Search System (TESS), Braintree, Mar. 28, 2017, United States Patent and Trademark Office.*
Trademark Electronic Search System (TESS), Uber, Mar. 28, 2017, United States Patent and Trademark Office.*
Trademark Electronic Search System (TESS), AIRBNB, Mar. 28, 2017, United States Patent and Trademark Office.*
Trademark Electronic Search System (TESS), Lyft, Mar. 28, 2017, United States Patent and Trademark Office.*
Trademark Electronic Search System (TESS), Verifone, Mar. 28, 2017, United States Patent and Trademark Office.*
Trademark Electronic Search System (TESS), Javascript, Mar. 28, 2017, United States Patent and Trademark Office.*
Trademark Electronic Search System (TESS), Ruby, Mar. 28, 2017, United States Patent and Trademark Office.*
Webopedia, Cloud Computing, Internet archive way back machine capture date of May 11, 2012.*
Trademark Electronic Search System (TESS), EMV, Mar. 29, 2017, United States Patent and Trademark Office.*
Trademark Electronic Search System (TESS), WiFi, Mar. 29, 2017, United States Patent and Trademark Office.*

* cited by examiner

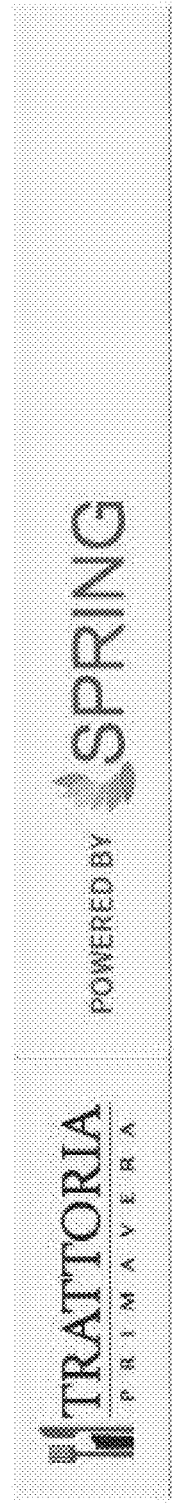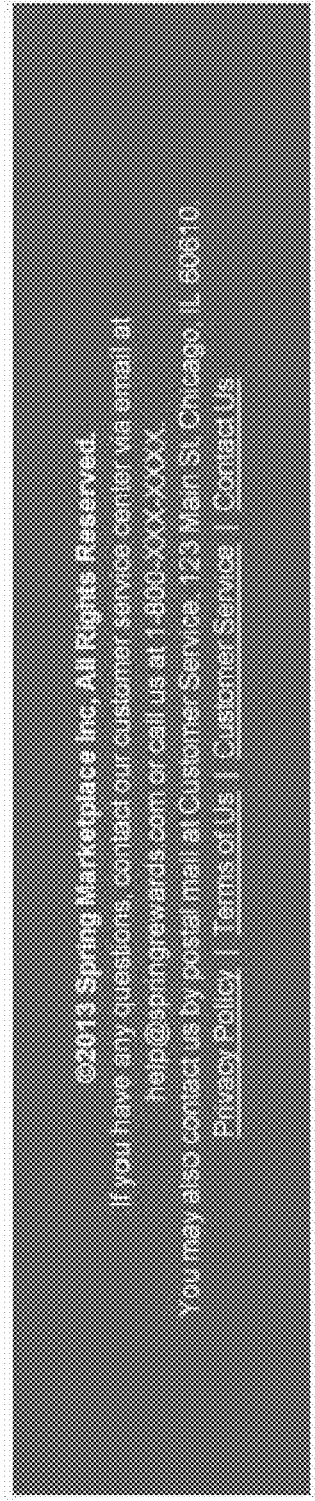
FIGURE 32

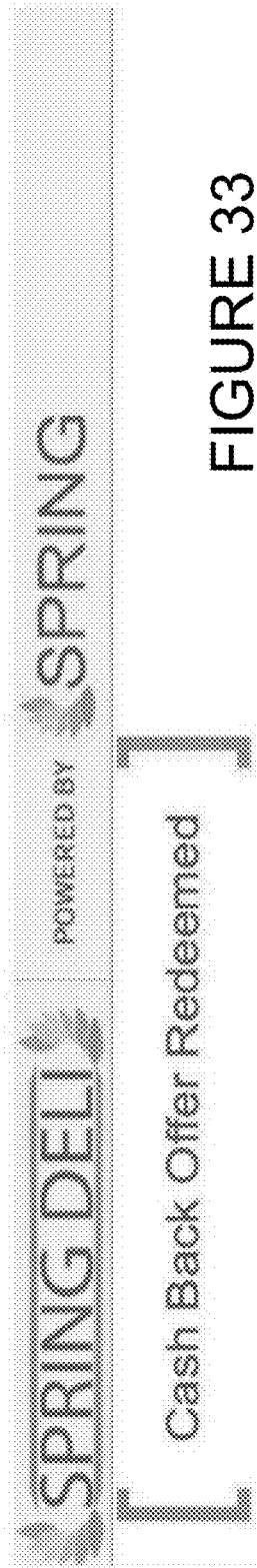
FIGURE 33

Email Invitations and Promotions

Spring creates branded emails for each merchant to invite their customers to their new rewards program and makes it easy for them to sign up online.

All subsequent emails with Offers also drive sign-ups — To claim the Offer, the user joins Spring.

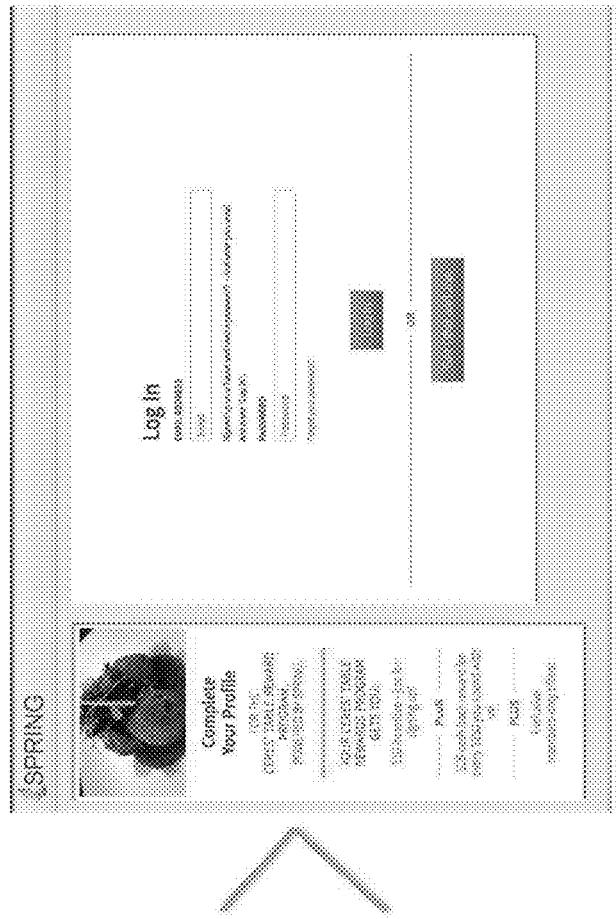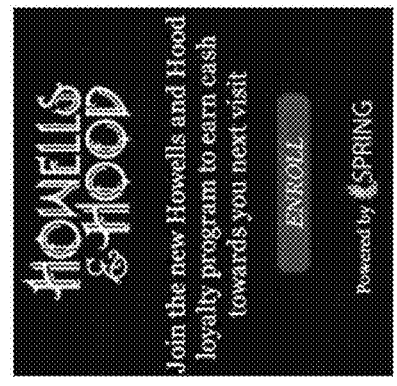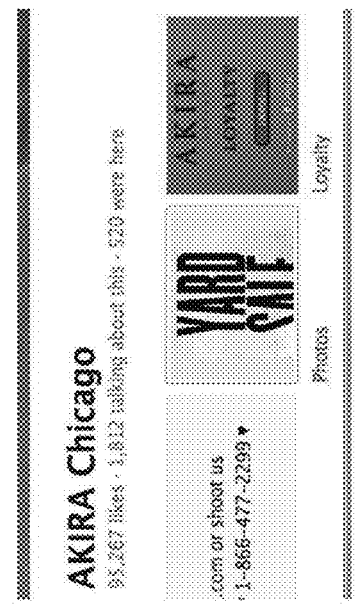
FIGURE 59

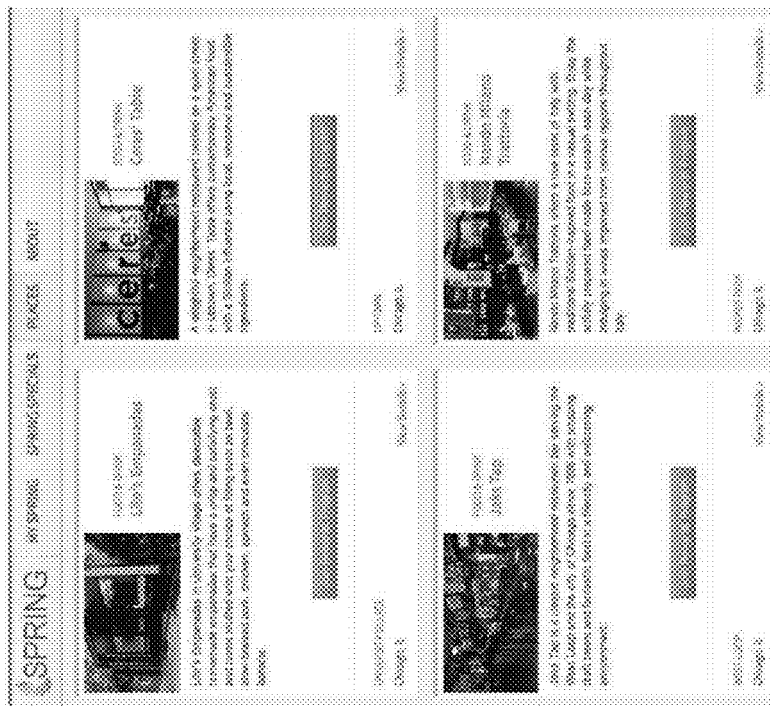
FIGURE 61

Online Advertising

Spring enables companies to connect online advertising directly to consumer spend. When consumers claim the offer, they sign-up for Spring – and the Merchant's Rewards Program. The Merchant gains performance-based media, track-able spend and a new Rewards Member.

FIGURE 67 Spring Customer Rewards

A customizable and easy-to-use program that turns the credit and debit card everyone already carries into a loyalty card that works directly with your business.

KEY BENEFITS
- Easy and Automatic on the Card they Already Carry
- Increase Frequency of Visits and Spend per Visit
- Happy Customers, Love Rewards
- Know More About Your Business

HOW IT WORKS

① ENROLL
- In-store, on-line, everywhere in your store
- Every visit is a chance to enroll ② REWARD
- Customized deliver real cash-back
- Zero friction
- Status & privileges ③ REACH
- Full email CRM platform with embedded offers
- Turns your email/social activity on steroids

FIGURE 70

OVERVIEW > CUSTOMER REWARDS > SPRING INTELLIGENCE > NEW CUSTOMER ACQUISITION > PROGRAMS > SUMMARY

FIGURE 71  Spring New Customer Acquisition

The Spring New Customer Acquisition solution helps you acquire new customers in a smart way. This unique form of advertising uses online promotion to:

- Deliver a first-time response – new customer
- Build an ongoing customer relationships

KEY BENEFITS
- Performance-Based
- Smart Targeting
- Automatic and on the Card
- Create a Long-term Customer
- Immediate Rewards Program Enrollment FIGURE 73  Spring Business Intelligence

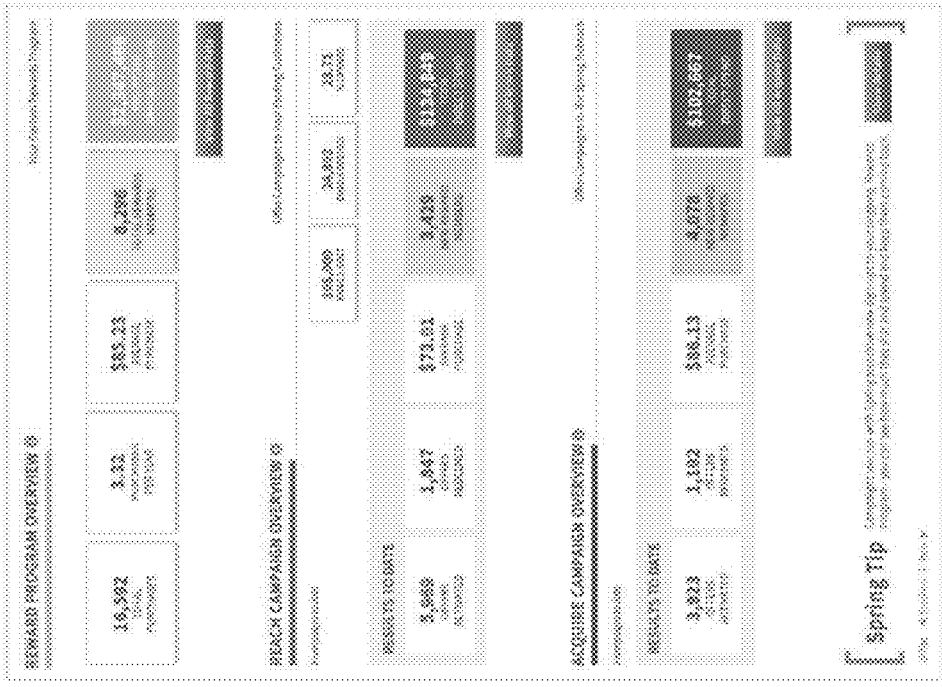

KEY BENEFITS

Spring provides you information about:
- Your overall business
- Your rewards program and spend of its members
- Reach campaigns you run to your rewards customers Examples include:
- How many customers you have
- How much they visit and spend, where they live and shop
- Size of your average order, slow times and fast times
- Are your revenues higher/lower/on target this month
- How do your VIPs and rewards members compare to your other customers
- How have each of your offers, campaigns and targeting plans performed and which ones work the best

FIGURE 82

Connect your card to start earning
cash-back rewards!
$[20] gift  +  $[5] reward
on your next purchase   for every $[250] you spend
A card is required for cash back 
We take your security seriously. Read our Security Policy.
Existing Spring member? Enter your email address to continue.
Enter your email address
Enter your mobile number
FIG. 85

FIG. 86

SYSTEMS AND METHODS TO ENABLE OFFER AND REWARDS MARKETING, AND CUSTOMER RELATIONSHIP MANAGEMENT (CRM) NETWORK PLATFORM

CROSS-REFERENCE TO RELATED APPLICATIONS

This application is related to and claims priority to and the benefit of one or more prior filed applications. This application is a continuation-in-part of U.S. application Ser. No. 14/329,781, filed Jul. 11, 2014, which claims the benefit of U.S. Provisional Application No. 61/845,984 filed Jul. 13, 2013, each of which is incorporated herein by reference in its entirety.

BACKGROUND OF THE INVENTION

1. Field of the Invention

The present invention relates to a cloud-based platform for enrolling accounts and administering one or more customer loyalty and rewards programs in electronic communications networks, and more particularly, systems and methods for providing and operating a customer loyalty and rewards platform including consumer or customer network-based and merchant-based registration and the management thereof.

2. Description of the Prior Art

Generally, prior art is known to provide digital loyalty and rewards system and methods. By way of example, relevant prior art includes the following U.S. patents and Publications:

U.S. Publication 2013/0073361 for "Methods and systems for offering targeted deals to customers and real-time automatic redemption thereof" filed on Sep. 20, 2012, describes wherein a customer can select from coupons to them, such as offers made to the customer (which may need to be purchased), vouchers purchased by the customer, and the like. A redemption choice is received from the cardholder indicating one or more coupons to 'load' onto the cardholder's card product. Information about offers, coupons, vouchers, etc., loaded onto a cardholder's card product can be stored in an offer deployment system. When the cardholder uses the card product to purchase a good or service, a transaction approval request is generated from at least one of a merchant, an acquirer, an association, a bank, and an issuer. The transaction approval request is processed wherein the step of processing comprises at least one of querying the offer deployment system which determines whether an offer loaded onto the cardholder's card product can be applied to the purchase. If so, the value of the offer is applied to the transaction. Preferably, offer value is applied to the amount of the transaction approval request before the request is received by the ultimate financial institution or card transaction processing system responsible for approving the transaction such that the amount of the transaction which must be approved is the purchase price of the good or service less the applied value of the offer. A receipt can be issued to the cardholder wherein the receipt indicates the purchase and use of the coupon.

U.S. Publication 2012/0191525 for "Systems and Methods to Facilitate Loyalty Reward Transactions" filed Jan. 23, 2012, describes wherein Reward communications can be processed as transactions over the communications system in a way similar to credit/debit transactions. The enhanced communications system allows simpler and/or more efficient implementation of complex loyalty programs, and provides new options for creating new loyalty programs. In one embodiment, a transaction handler for the processing of transactions on financial accounts, such as credit accounts, debit accounts, prepaid accounts, bank accounts, stored value accounts and the like, is configured to support transactions for crediting rewards to a reward account and/or transactions for redeeming rewards from a reward account.

U.S. Pat. No. 6,327,573 for "Multiple party reward system utilizing single account" filed Dec. 31, 1998, describes using one reward/loyalty card for multiple accounts and enabling a frequent shopper reward system capable of tracking performance data of a plurality of members or account holders linked to a single frequent shopper account. Additionally, the document discloses transacting with at least one of the present sub-account holders, calculating a reward level, allocating, to at least one of the present sub-account holders, at least a portion of the determined reward level, and updating the retrieved customer record.

U.S. Pat. No. 8,429,009 for "Universal Affinity System" filed Jul. 16, 2008, describes tracking loyalty/reward programs through the use of a third-party card or other medium. The system enables: a merchant to determine incentives, such as discounts, advertisements, or other offers, for a given customer or set of customers; uploaded these incentives to respective customer "personal account lockers"; and universal ID is encoded as a bar code, the bar code may be provided to a corresponding customer on a variety of different media, such as on an adhesive label that the customer may apply to another device or item, printed on a credit or debit card, printed on a key-chain card, or printed on any other device or item that a customer may be likely to carry with him or her.

U.S. Publication 2013/0054454 for "Wallet Service Enrollment Platform Apparatuses, Methods and Systems" filed Sep. 21, 2012, describes wherein a user may input username and password credentials into the wallet widget (e.g., 210) to get authenticated. The user may have control (e.g., create, view, manage, cancel, etc.) over the individual relationships and may configure permissions for each service they connect to. In one embodiment, the WSEP may allow approved services, issuers and merchants permissions to obtain various information relating to the user and wallet such as consumer profile 225, billing agreement 230, redemption 235, loyalty and rewards 240, coupons/offers 245, wish lists and stored items 250, merchant applications/widgets 255, Value Added Resellers (VAR)/Software-as-a-service (SaaS) commerce wallet plug-ins 260, analytics 265, account or points balance information 270, payments 275, and/or the like. In one implementation for example, the WSEP may manage which services can connect to the wallet. In a further implementation, the WSEP may pass along information from an approved and connected service such as a loyalty program (e.g., STARWOODS Preferred Guest program) to a merchant such that the merchant may provide the customer a special deal, offer or an opportunity to use or exchange points/currency when transacting. In one implementation, approved commerce services, issuers and merchants may be able to push information relating to any of the above to the wallet.

None of the prior art documents referenced herein or any known prior art provides the solutions to the longstanding unmet needs that are satisfied by the systems and methods of the loyalty platform of the present invention.

SUMMARY OF THE INVENTION

The present invention relates to systems and methods for providing and operating a customer loyalty and rewards platform including network-based and merchant-based registration and management, including mobile and electronic messaging, remote and local customer user registration options, enrollment, and credit, debit, and other electronic payment card account association with the customer loyalty and rewards platform.

The present invention further provides credit, debit, electronic payment, and/or card account enrollment automatically, as well as the functions of adding promotional and/or discount offer(s) to profile, adding cards, credit, debit, and other electronic payment card accounts or electronic payment accounts, redeeming promotional or discount offers, real-time automated functionality, providing data for a marketplace of vendors and customers, including account and activity data, providing a coalition network model, and combinations thereof.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIGS. 3-86 illustrate graphic user interface (GUI) diagrams of embodiments of the invention (corresponds to GUIs from PPA).

DETAILED DESCRIPTION

Figure 1:
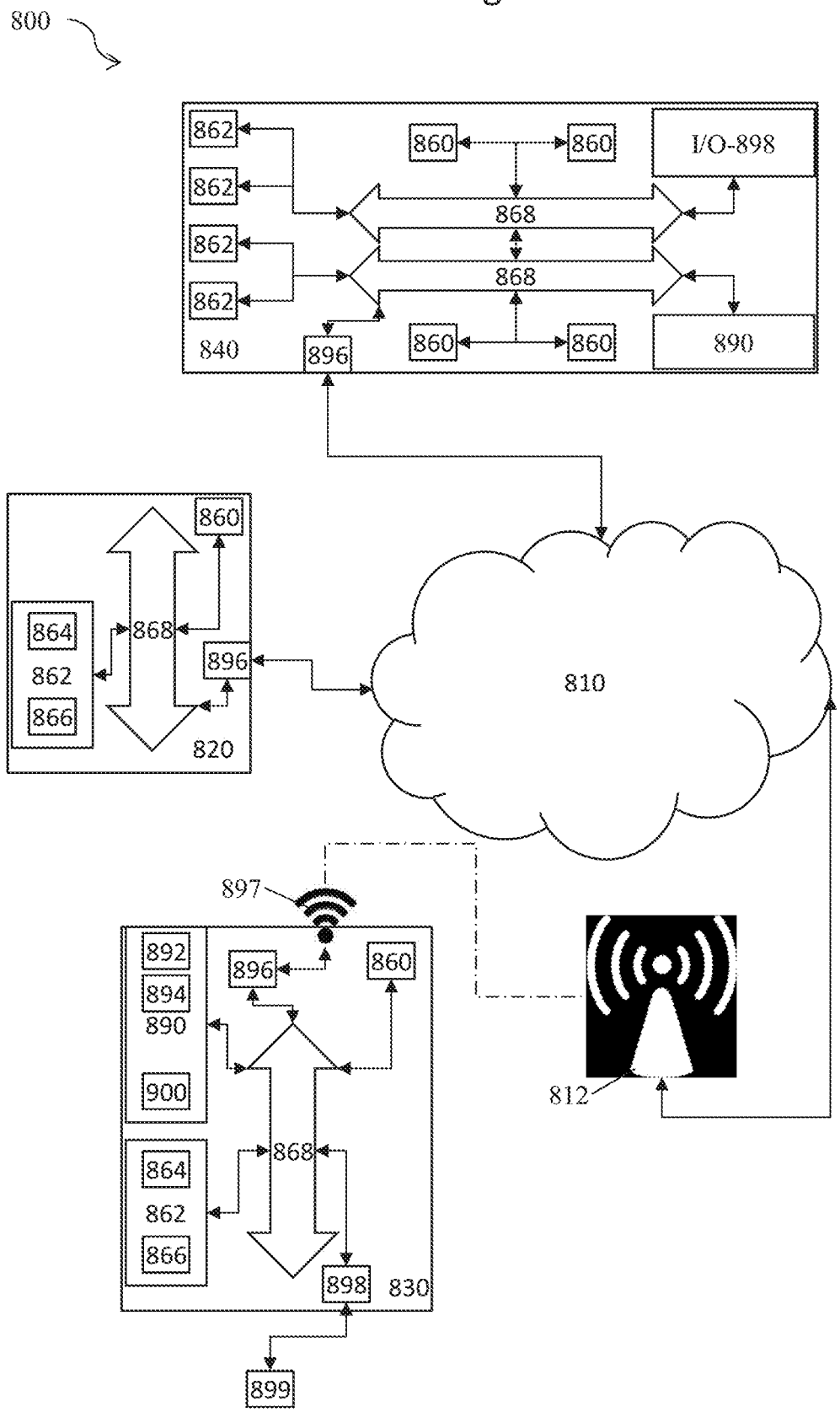
FIG. 1 is a schematic diagram of a virtualized computing system for embodiments of the invention.

The present invention provides systems and methods for providing and operating a customer loyalty and rewards platform including network-based and merchant-based registration and management, including mobile and electronic messaging, remote and local customer registration options, enrollment and credit, debit, and other electronic payment card account association therewith, as well as functions of providing promotional and/or discount offers, adding promotional and/or discount offer(s) to profile, adding cards, credit, debit, and other electronic payment card accounts or electronic payment accounts, redeeming promotional or discount offers, real-time automated functionality, providing data for a marketplace of vendors and customers, including account and activity data, providing a coalition network model, and combinations thereof. In describing the present invention and embodiments thereof, reference to a credit, debit, and/or payment card is directed to any suitable form factor representing the account, rather than merely a physical card per se, because the form factor may change, such as transition to, or addition of, a mobile wallet or functional medium representing the electronic payment account. The platform is sometimes referred to throughout the specification as the Spring platform or Spring.

The systems and methods of the present invention provide for connecting digital network-based environments with payment data, including a rewards platform and/or a loyalty platform for customers with merchants participating in the network. The present invention systems and methods solution provide merchants with ways to acquire new customers as well as a rewards program for existing customers. In one embodiment, any digital media provided over a network, e.g., online media provided over the Internet, is functional and operable to automatically load or input customer loyalty and rewards information to at least one electronic payment media, including incentives or promotions to encourage consumer action with the predetermined merchants for goods and/or services to be automatically electronically associated with at least one credit or debit card account, and/or electronic payment account of a corresponding consumer user.

Loyalty and Rewards Platform.

In contrast to prior art systems and methods for loyalty and rewards programs wherein each merchant has its own closed loyalty and rewards program, and wherein customers must take specific actions to enroll, the present invention provides for a loyalty and rewards platform including a multiplicity of otherwise unrelated merchants, wherein customers automatically enroll in a single loyalty and rewards platform that provides rewards across the multiplicity of merchants in the platform. In prior art examples, users earn points or a currency that is redeemable not at the merchant where the spend triggered the earn; by contrast to the prior art, the present invention provides systems and methods wherein users earn both a points currency redeemable outside that merchant and earn towards a cash back reward with the merchant at which the user spends. Thus, the present invention systems and methods provide an interactive "ecosystem" that leverages existing financial systems, networks, and infrastructure related to electronic payment, in particular (but not limited to) electronic payment cards, and existing customer behavior (making electronic payment by swiping a magnetic stripe containing digital representation of customer account data and other customer data associated with at least one electronic payment card, for wide scale implementation of a multi-merchant loyalty and rewards, discounts, incentives, benefits, and combinations of these programs. Notably, mobile payments, electronic wallets, etc., or any other form of electronic payment, may be used as well.

Advantageously, the present invention business methods transform customer payment information into marketing functionality information that enable automated performance-based digital promotions tracking and analysis. By way of example, the present invention systems and methods provide automated performance-based digital promotions by tracking customer activity compared with revenue delivered as a result of the promotions, as evidenced by customer electronic payments with merchants within the loyalty and rewards platform (member merchants), including factors such as payment amount, time, and location with respect to the customer spend with the member merchants. Furthermore, the present invention systems and methods include at least one database of customer electronic payment account and corresponding payment information, which is advantageously received from existing card networks, including authorization and settlement data, directly in real time or near real time, thus creating customer spend behavior information and patterns relating to them, including upstream pre-existing, which are transformed to target marketing opportunities with those customers. Merchant friendly targeting of customers to incentivize specific spend behavior includes all promotional media available to deliver targeted advertising, promotions, discounts, incentives and combinations thereof, to existing or past customers and to potential new customers in a plurality of formats and structures that are dynamic and that are customized to satisfy the merchant requirements for results that meet business goals or expectations. For example, a merchant typically does not know if a target customer is an existing customer unless upstream data on that customer is available. Incentive-based discounting by merchants is effective, but only for new customers or to reactivate stale customers. So upstream customer spend behavior and patterns are important and useful in structuring a targeting marketing project with the present invention because they include customer geography, spend behavior information, and provide self-reported automatic information (including zip code and time of business transaction with a given merchant, electronic payment card swipe location and time) that is transformed into a scatterplot or other visual or graphical representation with respect to up to about the past 90 days or less. The targeted marketing or advertising is also customer friendly inasmuch as the incentives extended to the customers are directly relevant to the customer based upon past customer spend behavior, so they provide incentives or promotions that are consistent or related to the customer interests, based upon comparison with the recent past spend behavior, and based upon relationship (active, stale and/or past but inactive, new and/or no relationship yet) with the merchant members of the loyalty and rewards platform.

The present invention further provides smart offer structures that are based on customer spend behavior and that align the business goals or objectives of the member merchants for stimulating and/or increasing customer activities in specific ways. For example, predetermined triggers are established for extending automated offers to the target customers that provide discount-based incentives that deliver yield management in patterns that improve the revenue of the member merchants according to predetermined times, days of the week, days of the month, etc., e.g., restaurant merchant members establish triggers to stimulate business on weekdays without existing high traffic, like Tuesdays. Alternatively or additionally, the present invention provides Smart Offer Structures that provide support for triggers that are selected from: time conditions, spend-level for a transaction conditions (i.e. above $X), spend-level for multiple visits at a merchant transaction/visit frequency or visit threshold conditions, inviting a contact to join the platform or a merchant rewards program wherein the contact is a social media contact and wherein in one embodiment the contact is invited to like the platform page or a merchant page as well as joining the platform or a merchant rewards program, joining the platform or a merchant rewards program, and combinations thereof.

Significantly advantageously, the loyalty and rewards platform of the present invention uses existing infrastructure for electronic payment and does not require any change in customer payment types or methods, which leverage existing customer payments without conscious steps or actions by the customers (no merchant codes or coupons need to be provided by the customers participating or enrolled in the platform at the time of purchase to engage the loyalty and rewards platform and member merchants incentives). So the customer unconsciously engages the loyalty and rewards platform each time an electronic payment transaction is provided at member merchants within the systems and methods of the present invention; the customer experience is essentially effortless and requires no additional steps other than purchase and electronic payment with merchant members. Furthermore, discrete interactions between customers and merchant members of the loyalty and rewards platform of the present invention are automatically transformed into continuous interactions without steps that are in addition to or extraneous to the purchase transaction by the customer. Merchant members have customer permission-based visibility into customer spend activities, behaviors, and therefore potential interests, which is essentially helpful for successful targeted advertising to generate more business with new and existing customers in predetermined ways. Therefore, customers' interests and merchant members' marketing goals are aligned to provide seamless, effortless interaction within the loyalty and rewards platform of the present invention.

Customer Enrollment.

The present invention provides for a customer to enroll multiple electronic payment cards or devices, including but not limited to credit cards, debit cards, prepaid cards, mobile wallet devices, mobile payment devices, and combinations thereof. Notably, with the present invention, in one embodiment, by way of example and not limitation, enrollment steps include: a user swiping a payment card through a card reader (whether separate from or co-incident with swiping the card to effect a payment transaction), taking a photo of the payment card or entering the number through an online form, including doing any of the above connected to or associated with a Tablet computer or mobile phone computer, and combinations of these options. There are a multiplicity of methods for customers to activate enrollment in the loyalty, rewards, and/or incentive platform of the present invention, including at least one of: providing a physical form factor for receiving inputs from customers at a merchant location; providing an interactive website with graphic user interface via a data and communications network (e.g., the Internet) for receiving inputs from customers at remote locations from the merchant locations; providing a physical marketing collateral at a merchant location, such as by way of example and not limitation, a tablet computer, a smartphone, a computer with display, etc.; automatically activating a customer enrollment by the system, wherein the enrollment is triggered by a purchase made by the customer using an electronic payment either at a merchant and/or via online (remote) purchase from a merchant within the network of merchants associated with the loyalty and rewards platform of the present invention; and combinations thereof. In the case of providing an interactive website with graphic user interface via a data and communications network (by way of example but not limitation, the Internet) for receiving inputs from customers at remote locations from the merchant locations, the website may be accessed by customers after they input a website URL, provide inputs on a merchant website with a link to a URL for registration and creating a customer profile, receive a text message or SMS with a URL link that directs the customers to a URL for registration and creating a customer profile, providing an email invitation to a customer with a link to a URL for registration and creating a customer profile or other interactive website enrollment or registration page; providing any other digital object online, including an ad with an incentive, and combinations thereof. A sign-up or enrollment incentive may be provided in addition to advertising or other promotion of customer enrollment in the loyalty and rewards platform.

In any case, the enrollment automatically provides for express, customer permission-based access to spend information across all registered electronic payment cards for any issuing bank, and for any card type (e.g., the associations providing electronic payment cards, including VISA, VISA, MASTERCARD, AMERICAN EXPRESS, DISCOVER networks for any issuing bank or financial institution). Because the automatic enrollment is independent of a financial institution and independent of any card issuer, the systems and methods of the present invention provide the first comprehensive multi-merchant, multi-electronic payment form (card, etc.) for loyalty and rewards platforms, including real-time or near real-time upstream and downstream data availability relating to customer spend behavior, thus meeting a longstanding, unmet need for this solution. The systems and methods of the present invention provide for customer spend data to be automatically obtained directly from the electronic payment card networks or associations (e.g., VISA, VISA, MASTERCARD, AMERICAN EXPRESS, AND DISCOVER); additionally or alternatively, data is acquired from issuers or processors of the electronic payment cards. Thus, the present invention provides the ability to take data at all from one or more of the associations. Also, the present invention provides the ability to take data from merchant processors or all the processors. With this, the loyalty and rewards platform database includes information and access to information from the electronic payment card or account authorization file or feed; this data is preferably aggregated and integrated by the servers and databases of the systems and methods of the present invention. Furthermore, the systems and methods of the present invention are applicable to function for all merchants that accept any type of payment cards and/or electronic payment, not only those that use a specific processor. That is part of what is a unique attribute of the present invention that provides a ubiquitous solution and marketplace or network configuration of merchants and customer users. In one example, those customers that use a given processor can enroll all card types, but only for the merchants that use that processor.

Other enrollment mechanisms for a consumer to enroll in the platform or in a specific merchant rewards program through the platform include: reading a card or card account number via a magnetic stripe reader, EMV, NFC, RFID, smart chip, etc., taking a photo of a card or account number, scanning a bar code, account number entry in a web browser or on a mobile app, selecting a button on a website or mobile app, automatic enrollment after selecting a single incentive offer or a group incentive offer presented on the platform site, a third party site, via a mobile app, email, MMS message, SMS message, or in response to a push notification, and/or via accepting an invitation and/or incentive via a social media or email contact or text message.

Enrollment Mechanism and Business Model.

The systems and methods of the present invention loyalty and rewards platform provides for automatic receipt of all data available to the associations relating to electronic payment card information, while the loyalty and rewards platform provides compensation to the one or more associations only when the loyalty and rewards platform generates revenue under its business model of providing targeted advertising to customers for member merchants. The member merchants preferably have customer-approved visibility to every customer spend event or activity, even though every customer spend event does not generate the redemption of the incentives provided by the member merchants to the target customers under the loyalty and rewards platform of the present invention. By having customer-approved visibility to every customer spend event or activity without having to compensate the associations for access to all of the data (and only providing payment when revenue is generated from the loyalty and rewards platform) the present invention has unique insight into more customer behavior that can inform the targeted advertising and incentives provided under the present invention, and attract more merchant members to participate, which in turn attracts more customer members to participate, thus creating a rapidly automatically growing and evolving loyalty and rewards platform or loyalty and rewards ecosystem that self-perpetuates growth without undue effort by any single member, whether customer or merchant member.

Any and all micro-mechanics of electronic payment device or payment card or payment card account enrollment are considered within the scope of the present invention, such as data entry by customer online or through software on a smartphone, tablet computer, computer, etc., magnetic strip swipe or other reader input at POS or magnetic strip swipe or other reader outside of POS specific to effecting only the consumer card account enrollment, chip and/or PIN, capture image of a card, or any PCI compliant manner, and/or any others described hereinabove, and combinations thereof. By way of example, the enrollment mechanisms include but are not limited to, a web-based API that provides for automatic enrollment with no latency, i.e., the real-time enrollment of an electronic payment card occurs with the customer using the card for a transaction with a participating merchant member, or the customer may register one or more electronic payment cards with an online enrollment with an interactive website, or onsite with a member merchant with a card reader form factor, and/or with an electronic form factor, such as a tablet computer, even without making a purchase at the time of enrollment. Preferably, whenever any payment is made through one or more of the associations or processor, whether cash (in any currency), credit, debit, etc. on electronic payment card accounts, that authorization file and settlement file and corresponding data is automatically provided to the loyalty and rewards platform of the present invention through a communications or data network to the database(s) and server(s) of the loyalty and rewards platform, whenever the customer member makes an electronic payment at the member merchant. The data includes authorization date, time, merchant identifier, location identifier, and combinations thereof.

The loyalty and rewards platform of the present invention provides rewards or loyalty and rewards points or other units to the customer member account, which is associated directly with any of the electronic payment cards of the customer member that are enrolled with the loyalty and rewards platform. The loyalty and rewards points or units are automatically attributed to the customer member account, and are applicable to spend with any and all merchant members within the loyalty and rewards platform in electronic form, without requiring any additional action, selection, or indication by the customer of how or when the loyalty and rewards points or rewards will apply, and to which merchants. Preferably, the loyalty and rewards points are convertible automatically into any incentive available on the loyalty and rewards platform at any time. The format may include automatic credit to the electronic payment card account, prepaid cards, etc., and is preferably "paperless", i.e., the system automatically indicates, tracks, and stores data on the incentives and points available to any customer at any time, and tracks redemption and/or cash credit to the customer accounts.

From business model standpoint, the present invention systems and methods further provide for a seamless settlement of the redeemed offer by providing for automatic debit or automatic payment by the merchant members accounts, as they provide permission to debit the merchant and/or processor account at the time a customer activates and redeems an offer provided by that merchant within the loyalty and rewards platform of the present invention.

Customer Activation of an Offer.

Preferably, real-time data is used to message customer members about offers from member merchants, including offers to join, earn and redeem loyalty and rewards points or units within the loyalty and rewards platform of the present invention. Following customer enrollment in the loyalty and rewards platform, the customer can see all merchant members associated with the system, search for offers and search for merchants of interest, for merchants within the network and also for merchants that are not yet included in the network. Activation of an offer is by click-select and automatic loading to the electronic payment card(s) associated with the customer profile following enrollment. The offer can be added to the electronic payment card automatically for automatic redemption, by the user "claiming the offer" through an action online such as clicking a link, the offer may be added with a purchase transaction (buy now and redeem later), pre-paid cards, the ability for the automatic redemption on a card, and/or a trigger activation of an offer may be provided online or through customer activity or proximity to a merchant member location.

Examples of different types of offers include a cash back offer, an advanced sale offer, and a credit eligible offer. A cash back offer is preferably an offer for a fixed dollar value of cash back when a user has activated the offer and meets all qualifying conditions. An advanced sale offer is, in one embodiment, an offer which is pre-purchased by the user. Notably, the advanced sale offer often redeems at higher rates since the user must pay for this offer upfront and the offer preferably has an expiration. A credit eligible offer is preferably a special offer which is purchased with currency from a Third Party Partner or a mall currency. In one embodiment, a credit eligible offer is supported by (1) an API granting a Third Party Partner user a fixed dollar amount of mall currency, (2) an API returning a list of credit eligible offers to be used by Third Party Partner, (3) an API allowing a credit eligible offer to be claimed, (4) an API showing details on how the mall currency has been earned and spent, (5) contacting an API to award the currency, (6) allowing the customer user to select available credit eligible offers, and (7) showing currency balance and details on a user interface.

Targeting rules for offers include targeting, by way of example and not limitation: everyone, existing members of the platform, non-members who have not joined the platform, spenders who have previously transacted through the platform, non-spenders who are members of the platform but have not transacted through the platform, lapsed members who have not transacted in the last X days, hours, minutes, etc. generally or at a specific location/store, and VIP members who have a hit a lifetime level of spending through the platform. The front-end system of the platform provides for implementation of targeting rules as well as tracking membership and summarizing transactional data.

Display rules govern whether an offer should be shown or activated. Redemption rules determine if an offer which has been activated can be redeemed based on a qualifying transaction. By way of example and not limitation, redemption rules include location (is the offer accepted at the store or location where the user transacted?), transaction date (is the offer still valid and not blacked out?), transaction time (is the offer being redeemed at the set time of the day?), and minimum purchase (is the transaction amount sufficient to redeem the offer?). Preferably, the redemption rules are enforced by the platform. The Third Party Partner mobile app and website would need to display and communicate these rules, so users are aware of the restrictions prior to transacting. Location specific offers typically require that location transactional data or real-time location data is transmitted to the Third Party Partner using identifiers readable by the Third Party Partner website and app. Location transactional data or real-time location data is communicated in a variety of ways, including but not limited to, via Global Positioning System (GPS), an IP address of a point of sale system, an IP address of an electronic device involved in a transaction, cellular triangulation, etc.

The present invention systems and methods also preferably leverage email marketing mechanisms, e.g., constant contact, etc. to connect customer behavior to customer action with member merchants. So preferably, all promotions in the loyalty and rewards platform of the present invention are provided in a digital format or on a digital "surface", that connect to downstream customer behavior and spend as evidenced by the enrolled electronic payment card transactions of the customers with the member merchants. By way of example and not limitation, the customer click-selects a digital advertisement online or presented in an email or website format, and load or input or import the corresponding digital incentive to a customer profile or account on the loyalty and rewards platform of the present invention (the Spring profile) and automatically load it to the electronic payment cards (or accounts) that are associated with that customer profile within the loyalty and rewards platform. Then, any subsequent electronic payment with the corresponding customer cards at the member merchant automatically provide for the redemption or discount associated with the digital incentive offered online by the member merchant.

In one embodiment of the present invention, automatic enrollment through a purchase transaction includes the steps of: the system receiving an electronic payment customer account number or identifier (including for example but not limitation, a credit card capture number); receiving a permission from the corresponding customer (user) corresponding to the electronic payment customer account number or identifier; receiving customer contact information (by way of example and not limitation, name, address, phone number, email address, and combinations thereof); automatically creating a customer profile from the information received; automatically enrolling the customer and corresponding customer profile as a participant (or member) in the loyalty and rewards platform. The present invention systems and methods provide for at least two ways for customers to join the marketplace or network: 1) when a user purchases something, whether an online e-commerce check out or a card present transaction at POS in a store, that transaction also is functionally equivalent to an automated enrollment (and importantly, because the user so indicates and provides a permission); 2) a customer user first joins through one of many potential entry points—for example at a first merchant, Merchant #1. After that, when the user simply pays with an enrolled card at another merchant in the network, that creates the potential for the user to "join" the rewards program of that #2-N merchant on an automatic, opt-out or opt-in basis. This is a very powerful way for all merchants in the network to build their rewards member list because normal swipes are functionally equivalent to joining to customers, if already in from somewhere else. Real-time notice to users based on authorization data (or data coming out of the POS) is important to make this work for the user when swiping and automatically joining thereby at merchant 2-N.

Notably, the present invention systems and methods provide for automatic customer enrollment of multiple cards (or electronic payment devices) of any card type, and/or from different issuing banks, following receipt of near real time authorization or copy of capture data from electronic payment transactions by the customer at the at least one merchant participating in the loyalty and rewards platform of the present invention. At least one primary account number associated with a customer is used for automatic enrollment with the loyalty and rewards platform; other cards or electronic payment accounts may be further included and associated with that customer profile based upon future transactions (and automatic inputting of alternate accounts at the time of the transactions for customers already associated with the loyalty and rewards platform). Customers may create a corresponding customer profile at the time of enrollment.

Optionally, additional method steps include: automatically associating the customer profile with at least one merchant registered within the loyalty and rewards platform of the present invention; automatically generating at least one advertisement, promotion, and/or incentive for the customer based upon patterns generated from customer behavior and corresponding association data that are stored in a database and analyzed by at least one server computer in electronic communication connection with the database. Significantly, no prior art enrollment methods provide for automatic enrollment of multiple cards of any card type and/or from different issuing banks, since the prior art systems and methods do not receive near real time authorization or copy of capture data.

The systems and methods of the present invention provide for activation of an offer (incentive, loyalty and rewards benefit, reward, and combinations thereof) extended by a merchant participating in the loyalty and rewards platform of the present invention to at least one customer, including at least one of the following steps: automatically adding the offer to the electronic payment account of the corresponding customer(s); automatically presenting an offer for the customer(s) to purchase and redeem later in association with at least one of the customer accounts identified or stored with the loyalty and rewards platform; and/or automatically crediting the account and/or triggering the offer when a customer makes a purchase of goods or services associated with the offer and/or the merchant associated with the offer.

Loyalty and Rewards Platform Communication and Data.

The present invention systems and methods provide for the ability to communicate with any customer member following enrollment by any means for any electronic payment card or device account associated with the customer member. The communications methods may be provided by email, text or SMS, native application on mobile and tablet computer devices, automatically through geographic location functionality and corresponding software, email CRM and marketing communications, etc. Advantageously, the presentation, targeting, communicating, tracking, reporting, analytics, offer types, redemption, and customer behaviors relating to spend compared with offers presented are included with the present invention loyalty and rewards platform communications and data associated with the customer electronic payment transactions. All methods of merchant offer discovery by the customers and/or promotion to customers is provided within the scope of the present invention. The data analytics and reporting may be provided to member merchants, to member customers, or to partners of the loyalty and rewards platform to facilitate assessment of success of the loyalty and rewards behavior corresponding to digital incentives provided by any means. Thus, the present invention uniquely provided direct correlation of targeted advertising in any electronic format to actions taken and to spend activity by the customers on a transaction basis and with respect to trends or behavior over time.

Track and Utilize Transaction Activity

Advantageously, the systems and methods of the present invention are operable to use both real-time transaction data, preferably in the form of authorization files or notification of authorization files, and latent transaction data, which is preferably in the form of clearing files or notification of clearing files. Transaction data is obtained from, inter alia, a server computer or cloud of a financial services provider, a point-of-sale, a server associated with a point-of-sale, or any other source including the authorization files or clearing files. Transaction data is used for targeting and sending messages and/or digital content, which provides for targeting or segmenting users based on transaction history to send a message or notification, including a promotion or offer, electronically to a user, via, by way of example and not limitation, email, text, mobile app notifications, an ad, an offer, or other digital content. The transaction history preferably includes history relating to merchants, services, goods, classes/types of goods, and/or classes/types of services. Preferably, these messages or notifications are sent by the network services tier, which is operable to send a message or notification to a consumer or merchant in the platform. In another embodiment, transaction data is used in real-time to send a message or notification electronically to a user via any of the methods listed above relating to the user earning a reward, incentive, or receiving an offer, as well as providing an opportunity for the user to provide feedback or a review. Transaction data is also used in real time by the platform to trigger the earning of an incentive (offer, reward, etc.). In contrast to merely just notifying the user about an incentive, this involves actually activating the incentive. Notably, the present invention also provides for the ability to use transaction data in real time to trigger the redeeming of an incentive (offer, reward, etc.). Transaction data is also used in real time to enroll a user into a loyalty, rewards, or offers program which is part of the platform or to send a message or notification electronically via any of the methods referenced above related to enrollment. Advantageously, a user enrolled in the platform of the present invention can join specific platform programs throughout the network on an opt out or opt in basis.

Spend Informed User Base and Spend Informed User Base Service(s).

Spend-informed user base or audience and spend informed user base service(s) includes any consumer user active with any form of digital surface or asset, including a web page, email, mobile application, text message, etc., where that activity by the consumer user can be informed by or services enhanced by that user's past or future spend behavior information using a payment mechanism or form factor including a payment card account (including account number) or functionally equivalent mechanism. Examples of use of previous "upstream" payment information include targeting certain messages or advertisements or content to the user based on such data. For example, the presentation of advertisements (ads) or other content to users varies based on user spend information and ability for platform to discern user status (e.g., to identify if the user is in a merchant rewards program or not, if the user has made a purchase or spend at predetermined merchant(s) within last predetermined number of days or not, whether the user spends a financial value above a predetermined amount or not, already in merchants email list or not, and combinations thereof; if the user has spent at predetermined geography scope, location(s), category or time, therefore a content is likely to be relevant to user; enable different pricing to merchant depending on character of user (e.g. new customer within last predetermined timeframe or not) and presentation surface; and combinations thereof.

An example of use of future or "downstream" spend behavior by consumer users includes any tracking of user spend behavior after interacting with content on digital surface.

In another use case, the platform provides an aggregated group of consumer users with platform-registered (or platform-enrolled) corresponding payment card account information, and the platform is operable for receiving by the at least one server computer, storing and analyzing in the database, the consumer users' spend data and product and/or services included in each purchase. A merchant client runs a non-digital marketing campaign or a digital marketing campaign that does not include direct click-stream tracking to the users' spend behavior. The comparative aggregate normalized spend behavior of various users groups and users before and after the campaign be reported and analyzed. Example: 1,000,000 users are enrolled in Spring in Chicago. 50K in a given merchant's rewards program. Merchant runs a radio campaign. The spend behavior of both user pools is tracked and analyzed to show "view through" or "hear through" vs. click through response.

Spend Informed User Base Service(s) should also include any service with a mechanism to credit value to users based on their spend behavior in relation to any marketing or promotion activity or service. For example, crediting a user $X because they took a certain action in relation to a promotion to that user.

Methods of Developing Spend Informed User Base.

Associated with Customer Use of a Payment Card Account.

The present invention systems and methods provide for consumer user sign up mechanisms with the platform that are automatically activated when the consumer user makes a purchase using an electronic payment card account, such as by way of example and not limitation, by making a payment for goods and/or services via a credit card having a magnetic strip at a point of sale (POS) device ("a card-swipe"). Currently, card-swipe works with the platform of the present invention when the consumer user has registered or signed up online or via a platform-enabled mechanism (e.g., a tablet computer located at a merchant that is registered or associated with the platform), subsequently the user makes a transaction at another registered merchant, and the consumer user is presented with a message on a graphic user interface of a display on the POS mechanism, that allows the user to activate another unrelated part of the platform ecosystem (e.g. at an unrelated second merchant's program). These steps may include an opt-out, opt-in or automatic (no message at all) basis.

The systems, methods, and platform of the present invention operate to allow the consumer user to register automatically remotely via different mechanisms and methods that functionally operate to "sign user up once anywhere in the network", i.e., to provide for the consumer user to register in a single instance within the platform from any one of a variety of methods, mechanisms, and/or activities that include a single purchase or spend by the consumer user at any of the registered merchants within the platform using the at least one consumer user electronic payment card account. By sharp contrast to the present invention, all prior art rewards programs require that users enroll multiple times at multiple merchants, and/or take more than one action to activate rewards or digital incentives with multiple merchants and/or multiple payment card accounts; they must re-enroll the user including their need to provide their payment card account number through at least a second specific subscription process or step(s).

Associated with Payment to a Business or Through a Service.

The present invention systems and methods provide that when a consumer user pays a merchant for goods or services, capturing users or audience for any service other than customer paying their bill for that transaction through any mechanism of card account number capture, and/or a way to communicate with user (e.g. through email or text), whether through user opt-in, opt-out or automatically (without explicit consent). So, for example, the way customers pay through prior art tablet POS payment system (e.g. SQUARE or other similar providers, including BREADCRUMB, GROUPON POS, SHOPKEEP etc.), would not allow the service to then convert those customers into users of some other service e.g. a rewards or loyalty program, unless they sign up a different way; this is a longstanding problem with the prior art. The present invention provides for automatic capture of a customer user's payment card account information and/or capture of a customer user email address or text number for a mobile phone or smartphone, followed by and/or associated with automatically generating and sending a message at the at least one server computer over the network to the consumer user's mobile device, wherein the message indicates that the user can opt-in or out of joining the platform automatically. Preferably, the systems, methods, and platforms of the present invention extends to and includes any and all other payment card acceptance vehicles or mechanisms (e.g. VERIFONE terminals, conventional POS, payment for something online on a website, etc.).

Conversion of Payment Card Accounts on File.

Many e-commerce companies have large user bases who have purchased something through that company's website and given permission to maintain that card on file. Notable examples include online music stores (e.g., APPLE ITUNES), e-commerce marketplaces (e.g., GROUPON, LIVINGSOCIAL, AMAZON), digital payment systems (e.g., BRAINTREE and their VENMO e-commerce service that allows sites to share this permission), and the like. For example, if you buy something on a transportation app (e.g., UBER) and provide a card on file, you can buy something through a lodging app (e.g., AIRBNB) without providing a new payment card, but just using the one in the digital payment system (e.g., VENMO) enabled service.

Preferably, the systems and methods of the present invention provide for the automatic conversion of these payment-card-on-file accounts into electronic payment card accounts enrolled in a service that enables or utilizes spend informed users, as described herein, and/or registered with the platform of the present invention, which is not described, disclosed, or used in the prior art. By way of example, the following use cases are illustrated for the present invention.

When a consumer user purchases something, the consumer user spend or purchase activity with a payment card account, the system co-incidentally and automatically is enrolling the payment card account and providing a permission to terms of use or privacy policies that are a Spend Informed User service. Whether opt in, opt out or automatically. Once a consumer user has registered with the platform of the present invention, including providing at least one electronic payment card account and a profile, if there is a card-on-file, separate from a purchase transaction, the consumer user provides a permission, such as opt in, opt out, or automatically, to include the other payment card accounts, such as the card-on-file.

Scheduling App+Card Linked Offer.

The present invention provides the system with the ability to present or accept or use any advertisement or marketing content to a consumer user that may be accepted and linked to their electronic payment card account through or in association with or adjacent to their use of any appointment booking or scheduling application. For example and not limitation, the method steps of: making a reservation at a restaurant using a restaurant table-finding app (e.g., OPEN TABLE or similar web-based application), or making a reservation at a health or beauty provider using SalonBooker.com, SpaBooker.com, SpaFinder.com, or LifeBooker.com or similar web-based application. Either of these method steps that provide for making an appointment or scheduling a reservation automatically provide the functionality of sign up for the user with the systems and methods of the present invention. Additionally, a timewindow based incentive that is conditional upon taking an action or making a step such as scheduling an appointment or reservation using a predetermined website-based application from a remote communications device may be provided, e.g. dine Tuesday after 5 p.m. and receive $20 off your bill. Enrollment also occurs according to one embodiment of the present invention in connection with making an order for goods or services, by way of example and not limitation, ordering food delivery, food pickup, a ride from a transportation app (e.g., UBER, LYFT), a taxi, or any other order for goods and/or services.

Protect Products that Monetize.

Digital incentives are operable automatically within any of the at least one consumer user payment card accounts registered with the platform by the consumer user and/or associated with the consumer user profile on the platform. Digital incentives may be provided as a flat rate discount, a flat rate for predetermined products or services in specified, predetermined, and/or quantity, a discount rate as a percentage for total spend or purchase at at least one merchant registered within the system to participate in the platform of the present invention. For example, a digital incentive may provide the consumer user to save $10, save 10%, and/or save $10 or 10%, on the next purchase at predetermined merchant(s) of the platform.

Digital incentives created by and associated with the platform, systems, and methods of the present invention are provided to consumer users can be activated many ways, based on many conditions or automatically, for example, a click-select action by a customer user in a GUI of a website or mobile app GUI automatically activates a digital incentive associated therewith.

Digital incentives (DIs) can have conditions, restrictions, and/or limitations required for their redemption automatically on the consumer user's payment card account(s) registered with the platform and/or associated with the consumer user profile stored on the platform database. By way of example and not limitation, automatically triggering the automatic redemption by satisfying conditions, restrictions, and/or limitations associated with the digital incentive occurs in the following types of scenarios: purchase amount or spend of X value (in a currency) is required to trigger the DI, a predetermined number of visits within a predetermined time frame to a predetermined merchant or merchants are required to trigger the DI, a transaction for purchase or spend must occur within a predetermined time window defined by a start time, or a start time and an end time (e.g., beginning Tuesday after 5 p.m., or Tuesday between 10 a.m. and 2 p.m., etc.), only a limited quantity of items or instances of services are available, customer user must have a certain status (e.g., has not yet completed a transaction with at least one predetermined merchant in last predetermined number of days, or is or is not a member of merchant's rewards program or on their email list), a pre-purchase is required (and then the DI works automatically through use of that or any payment card on the consumer users' profile or platform account, an advance sale product or service for a predetermined merchant as agreed upon in advance, and combinations thereof.

None of the prior art publications and/or commercial providers or promoters of deals provide for any mechanism to electronically link to or integrate with a payment card or with a payment card account for consumer users. In those prior art references, users purchase a deal using a payment card such as a credit card used online for completing the purchase, but any aspect of redemption, including tracking and crediting, is not managed through the user's payment card account, as with the platform, systems and methods of the present invention. The present invention systems, methods, and integrated platform operate to promote a deal or other incentive to consumer users, have consumer users purchase it, or otherwise activate it including through a click-select or other input or event, and/or with a device or mechanism as described herein), and have its presentation and redemption in relation to the corresponding transaction with the merchant associated with and receivable of the deal or incentive, and provide for automatic administration and management of the redemption through the consumer user payment card account.

By way of additional detailed description of the platform, systems and methods of the present invention, included in the functionality and operation for providing for any mechanism to electronically link to or integrate with a payment card or with a payment card account for consumer users, the following illustrative steps, components or features are provided: the purchase or spend behavior of consumer users evidenced by data from the consumer user payment card account(s) is preferably tracked, analyzed, and/or reported, which then provides for significantly improved targeted content and targeted advertisement that is data-confirmable by the purchase or spend behavior of consumer users and the corresponding granularity of the data from their payment card accounts. Additionally and advantageously, consumer users payment card account mechanism is operable to convey value to the user, for example by automatically applying an electronic financial credit related to an incentive to the consumer user through one of their payment card accounts registered with their profile within the platform of the present invention.

Multi-Merchant or Multi-Visit Incentive Products.

The virtualized computing and network-based platform, systems, and methods of the present invention function to provide consumer users with incentives that are merchant-agnostic, i.e., they may work at more than one merchant or more than one visit. For example, in an alternative embodiment, platform is configured so that the consumer user having a registered consumer user account with at least one consumer user payment card account associated therewith, and having a user profile within the platform, when a consumer user pays a predetermined amount $X and receive an incentive worth $X multiplied by Y, which generates a credit for the multiplied digital incentive (up to a maximum or cap that is predetermined), wherein the multiplied digital incentive value usable in $X increments for each transaction at any merchant in the platform's network. Following the steps of purchasing or otherwise activating via click-select or other GUI in a website or mobile app, a consumer user can visit a platform-registered merchant (digitally online or physically in a merchant location) and automatically receive a digital incentive in a predetermined amount (e.g., $10) and this repeats until up to a maximum predetermined amount or cap (e.g., $200, which is 20 multiplied by $10) worth of digital incentives are aggregated or used. In an alternative embodiment, platform is configured so that the consumer user having a registered consumer user account with at least one consumer user payment card account associated therewith, and having a user profile within the platform, pay $X and receive $X as digital incentive whenever the consumer user visits merchant A until the end of B time period. For example, once activated by purchase or otherwise, a consumer user as patron of a restaurant (merchant A) automatically receives the digital incentive each time they transact within the predetermined time period B. There are other permutations of multi-merchant and multi-visit digital incentive packages that can be formulated; preferably, merchant users of the platform select predetermined digital incentive packages offered by the platform after their registration to participate as sponsoring merchants for a merchant subscription service fee in one business model implementation of the present invention, and/or for a customized digital incentive package having a corresponding customized fee.

The present invention systems, methods, and platform provide for automated customer loyalty and/or rewards programs that function on, through, and/or in association with payment card accounts of consumer users, preferably those consumer users that are registered to participate in the platform, and who have a customer profile and have registered at least one consumer user payment card account, thereby providing for automated and integrated functionality with any activity for payments of those at least one consumer user payment card account. Thus, the spend behavior evidenced by the activity for payments of those at least one consumer user payment card account is provided automatically and stored within the database(s) associated with the platform and the at least one server computer of the system, illustrated in FIG. 1. The spend behavior includes at least the amount of the purchase and detailed information about the goods and/or services included in each purchase, date and time of purchase, location of purchase (or indication of online website- or mobile app-based purchase), and combinations thereof. The platform for targeted digital incentives of the present invention provides for spend or visit based programs where the consumer user earns a digital incentive for spend behavior, wherein the spend behavior related digital incentives are selected from the following activities: spend at the merchant directly associated with the initial digital incentive (a first merchant), spend at other merchants, earn a reward at the first merchant, earn another reward currency, such as a notional value currency. Notional value currencies are useable by consumer users at one or more merchants affiliated within the integrated platform for marketing, advertising, and management of digital incentives with more than one otherwise unrelated merchants who are participating within the platform. Also, points based currencies redeemable at various places or for various goods and services.

The systems and methods of the present invention also function to provide consumer users the ability to enroll multiple payment cards in their profile and have spent on any of them aggregate up to their benefit on the profile level.

In a business model application of the present invention, the platform access is provided in exchange for payment by consumer users and/or merchant users for subscription-based services which allow access and profile management and maintenance during the subscription services period. In one example of the business method model, each of the consumer users pays a subscription fee on a periodic basis (e.g., monthly) for access to incentives (offers and rewards) and privileges useable at platform-affiliated or registered merchants.

Marketing Products Connect to Customer Rewards Program.

A differentiator from the prior art is that marketing incentive products provided by the present invention platform, systems and methods that merchant clients or registered merchants with the platform use to advertise to potential new customers, also drive customer memberships in their rewards program in a seamless and integrated manner, without requiring additional steps, documentation, or registration by the customer, since the consumer user registers with the platform of the present invention, creates a single profile, registers at least one customer user payment card account with the platform, and is automatically registered for all participating merchant members and their merchant rewards programs. For example, if a business sends an audience a $10 incentive, those potential customers from that audience that accept the digital incentive, register with the present invention platform in a single registration as described herein, and automatically and immediately receive the benefit of that digital incentive, and are automatically enrolled in that merchant's rewards program without requiring a redundant, or second registration step or action by the consumer user, according to the present invention. Thus, the present invention provides for consumer user interaction with the platform, and the ad or marketing product digital incentive received and used by the consumer user provide for automatic enrollment and registration in merchant-specific reward programs or membership listing or other mechanism of any kind that allows merchant to have access to that consumer user's spend behavior data and/or to communicate with them (e.g. through email or otherwise) in the future regarding advertising, digital or other incentives, awards, rewards, coupons, and combinations thereof, and to track the efficacy of those communications by comparison with the corresponding consumer user spend behavior data, including trends, patterns, confirming specific actions with respect to communications in time, frequency and type of spend, and combinations thereof.

Protecting Access to the Payment Data.

The platform, systems and methods of the present invention protect access to the payment data from any and all payment data sources, including but not limited to card networks (e.g., VISA, MASTERCARD, AMERICAN EXPRESS, DISCOVER), payment processors associated with merchants, financial institutions and card issuers, Point of Sale (POS) and card acceptance terminals (such as terminals from VERIFONE payment transaction company), and any combinations thereof.

Methods the Facilitate Redemption of an Offer or Incentive Through a Payment Card Account.

Prior art provides for many consumers to purchase offers from distributors, like e-commerce marketplaces GROUPON or LIVINGSOCIAL, wherein redemption is managed through the presentation of a voucher by the consumer to the merchant. In most cases, this process is manual, and use a physical paper voucher to present to the merchant for receipt of the goods and/or services. In prior art electronic vouchers, consumers present an electronic voucher through a GUI representation of the voucher, e.g., a mobile app, for example an app for e-commerce marketplace GROUPON. Prior art methods also provide for merchants to manage redemption through a device provided by the distributor (e.g., e-commerce marketplace GROUPON), however this method still requires a manual entry or other input, such as by scanning a bar code; another process provides for a device provided by the distributor at merchant locations at the POS that employs proximity-based detection if a user of a mobile app is present, (e.g., an app for e-commerce marketplace GROUPON), and if so, it facilitates redemption of the electronic voucher.

By contrast to the prior art, the present invention systems and methods facilitate redemption of offers and incentives ("deals"), including those provided by third party distributors (such as e-commerce marketplace GROUPON), by allowing consumer users to link the offer to their payment card account. Advantageously, the present invention provides for a transaction at one merchant to activate an incentive, offer, or reward redeemable at a second merchant in the platform. The two merchants optionally have an agreement under the platform for these "referral" incentives, offers, or rewards. Incentives, offers, or rewards are also issued according to one embodiment of the present invention in connection with making a reservation and/or making an order for goods or services, by way of example and not limitation, ordering food delivery, food pickup, a ride from a transportation app (e.g., UBER, LYFT), a taxi, or any other order for goods and/or services. There are several methods providing for redemption of offers and incentives and for managing redemption. By way of example, a consumer user purchases an offer through a deal distributor (e.g. online marketplace AMAZON LOCAL), wherein the deal is provided by a third party on behalf of a merchant; the system provides an electronic voucher by transmitting a message or presenting on a GUI of a computer display or mobile communications device, such as a smartphone, wherein the consumer user receives an electronic voucher including a code or link having an identifier; the consumer user, via a website interactive GUI or mobile device app, enters the identifier if already a member of the platform, or if not a member first registers or joins the platform; the system automatically associates or links the offer or deal represented by the inputted identifier with the consumer user profile on the platform, and with any enrolled payment card accounts associated with the platform; the redemption is automatically executed by the platform of the present invention with the next transaction by the consumer user with the merchant using an enrolled payment card account. In another example, the method steps are similar to the first example described above, however, the user at the time of presentation of the offer or deal to the merchant has not yet linked the offer to their payment card account; in this example, the system accepts the identifier via at least one input mechanism or device at the merchant location, physical and/or virtual; in one embodiment, the consumer user inputs the identifier in a tablet computer that presents platform, with or without branding or identifier of the merchant's customer rewards program; this overall redemption facilitation mechanism is also used to track customer spend behavior and data capture, and provides a way to communicate with the consumer user in the future even if the merchant does not have a structured rewards program. In this use case example, the consumer user enrolls in the platform by providing a communication attribute (by way of example and not limitation, email, and/or phone number for text message) and electronic payment account number or identifier (e.g., enrollment is activated by the step of providing input via swiping on a card reader or magnetic strip mechanism, touch or proximity activation mechanism, smart chip, etc., or other mechanism including but not limited to providing a photo or digital image of the user); an action is taken to link the presented offer to the users Spring account, for example, in an automated method with code entry, bar code scan, QR code scan, or a just a button or GUI interactive selection to "Link Offer"; thereafter, the consumer user completes a purchase transaction with the merchant using an enrolled payment card account, and the platform administers redemption as described hereinabove. Another use case example provides for the merchant not to utilize this platform redemption mechanism to manage the crediting portion of the redemption of the incentive, but instead deducts the value of the incentive from the customer's transaction at the time in-store. So, in this case, the platform does not automatically manage the redemption or crediting of the incentive back to the consumer user's payment card account. But since the consumer user is enrolled then the platform will automatically track and report their payment behavior with their payment card account so that the platform and the merchant may track customer spend related to the redemption transaction and downstream. Notably, in addition to enabling redemption by linking an offer to the payment card account, the merchant also automatically through the platform obtains a member in its customer loyalty or rewards program and/or database and the consumer user obtains the benefits of this membership.

Another redemption mechanism provided by the present invention is the combination of a payment card account mechanism with a software application to a specific "item-level" product or service. Notably, the prior art payment card account data streams on their own do not identify the exact item or product purchased for any given transaction. The present invention provides for automatic redemption of these specific item-level transactions which are specific to a product or service, through the various mechanisms described herein. By way of example and not limitation, one category of mechanisms provides for a member of the merchant staff to confirm a purchase by the user of the eligible item, product, and/or service through a predetermined, platform-supported mechanism, such as activation of a code, button, functional identifier, virtual button, GUI input identifier, active icon, etc., on a tablet computer or consumer user's mobile communications device or smartphone software application (app), etc. Another category includes platform integration with an item level data source, such as the merchant's POS or branded loyalty platform; preferably, the systems and methods of the present invention provide for automatically creating a multiplicity of customer user accounts on the platform wherein the merchant has aggregated its proprietary customer user account information from a loyalty program, a rewards program, a customer mailing list, etc. by importing the aggregated data by the at least one server computer and/or database associated with the systems, methods, and platform of the present invention.

Yet another redemption mechanism provided by the present invention is redemption based on location (is the offer accepted at the store where the user transacted?), transaction date (is the offer still valid and not blacked out on the given date?), transaction time (offers can be setup to be good at only set times of the day), minimum purchase (is the transaction amount sufficient to redeem the offer?).

Description Of The Figures

Referring now to the drawings in general, the illustrations are for the purpose of describing a preferred embodiment of the invention and are not intended to limit the invention thereto.

FIG. 1 illustrates an exemplary virtualized computing system for embodiments of the present invention loyalty and rewards platform. FIG. 1 is a schematic diagram of an embodiment of the invention illustrating a computer system, generally described as 800, operating within a communications network 810 and a plurality of computing devices 820, 830, 840. In one embodiment of the invention, the computer system supporting the platform of the present invention 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital devices 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices; distributed mobile communication devices, in particular wireless network mobile computer communication devices including but not limited to smartphone devices and tablet computers are preferred at the time of the present invention for use by consumer users as described herein for interfacing with the platform. The components shown here in FIG. 1, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 1, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage device 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800. A database is preferably included in the system and connected with at least one server computer of the system described, wherein the database stores consumer users' spend data, including product and/or services for each purchase made with registered electronic payment accounts, information about which are also stored on the database.

It is also contemplated that the computer system 800 may not include all of the components shown in FIG. 1, may include other components that are not explicitly shown in FIG. 1, or may utilize an architecture completely different than that shown in FIG. 1. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The present invention provides for advertising network and "spring-loaded" ad units. These flow even if the user is not signed up, with or without the card on file. They may flow if a user is signed up, whether online and cookied electronically, and in signed-in state or not. This provides a mechanism for gaining new members, financed by the promoting merchant's funding of the incentive and payment for the media.

The present invention provides for all capabilities that online advertising networks have, plus additional payment capabilities, including but not limited to targeting, advertisement serving, etc. Prizes and games may also be included.

Figure 2:
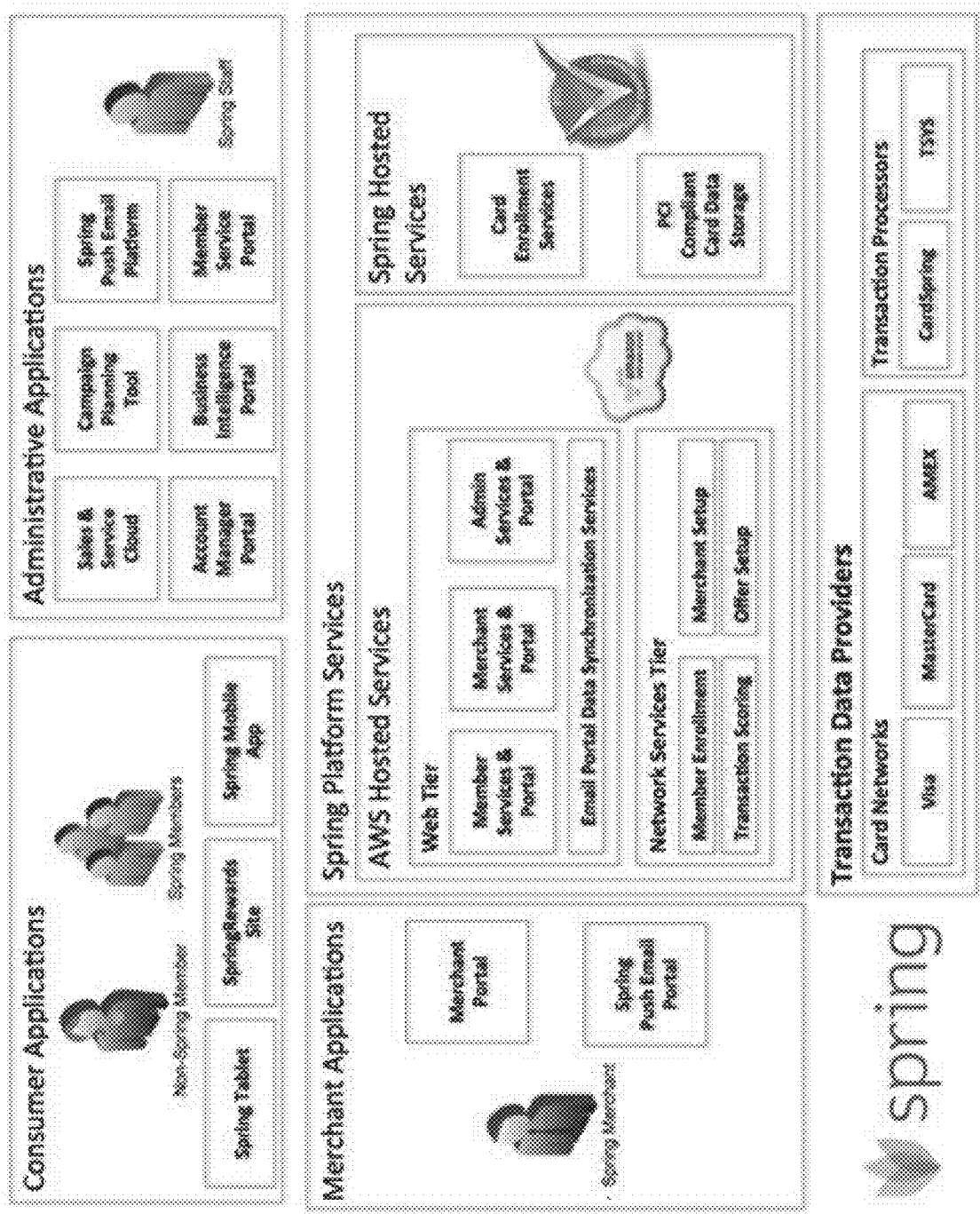
FIG. 2 is a schematic diagram of one embodiment of the invention.

FIG. 2 illustrates a schematic diagram of components of the invention illustrating the consumer applications, merchant applications, administrative applications, platform, hosted services, a web tier, card enrollment services, network services tier including member enrollment, transaction scoring, merchant setup and offer setup modules, portal data synchronization services, consumer users, merchant users or members, transaction data providers and transaction processors. FIG. 2 illustrates one embodiment of the present invention for illustrative purposes only; it is an example implementation of the present invention system, methods, and platform and is provided for illustration purposes and is not intended to exclusively limit the claimed invention. The following description corresponds to FIG. 2 schematic diagram.

Spring Consumer Applications are responsible for enrolling new members and engaging with them. The Spring Tablet is a fast and simple to use Member enrollment application. Tablets are native iOS apps written in Objective-C, typically installed on iPad Mini 2's. The Tablet uses ID Tech Uni-Mag 2 card readers and advanced DUKPT (Dynamic Unique Key per Transaction) encryption algorithms that guarantee secure communication with Spring's Card Enrollment Services. Encrypted card data is transferred to endpoints in the Spring Data Center and decrypted by a Key Appliance from StrongAuth. The card reader preferably uses an audio jack of the tablet or a lightning cable adapter to connect to the tablet. Upon payment information being received at the tablet via a card reader, an EMV reader, manual entry of payment information, or any other payment method referenced above or known in the art, encrypted payment information is added to a queue and sent over a network to a platform database on a remote server computer. The queue solves for issues where the tablet or the platform database does not have internet connectivity.

The tablet is preferably configured to accept customer enrollments remotely into different merchant reward programs and to capture different data about the consumer and/or information about merchant staff who promote sign-ups via the tablet. In another embodiment, the tablet is configured to request additional data associated with enrollment and membership including but not limited to a mobile phone number, account password, date of birth, and/or merchant specific questions (favorite brand, team, etc) that can be used for personalizing future marketing messages. In yet another embodiment, the tablet is configured to enable a staff code to be transmitted to the platform database to incentivize merchant staff members to enroll consumers in the Rewards program. A shift mode for the tablet is used in one embodiment to cause all enrollments for the remainder of the shift to use the staff code. Alternatively, the tablet prompts the merchant staff member to enter the staff code after each customer enrollment. Preferably enrollment data includes identifying customer information such as email address, credit card, merchant location where the enrollment occurs, tablet device identifiers, and staff identifiers.

Tablet computers capture and transmit Member emails, card tokens and merchant enrollment data to the Spring Platform. The SpringRewards.com web site (aka Member Portal) allows consumers to sign-up for Spring, enroll their credit or debit cards, join Merchant Rewards Programs, Claim Cash Back Offers and Gifts, Purchase Advance Sale Offers, Invite Friends, View Offer Reward, and Transaction Status, and Modify their profile. The responsively designed web site is hosted in the cloud (e.g., at web hosting service AWS) and built in Backbone.js, Bootstrap, HTML, CSS and object-oriented programming languages (e.g., RUBY, JAVASCRIPT). SpringRewards.com is supported by a RESTful set of web services written in an object-oriented language (e.g., RUBY). Event driven member SMS and email messages are delivered through cloud communication platforms, including TWILIO and AMAZON SIMPLE EMAIL SERVICES (SES).

Spring Mobile Apps include Native ANDROID and IPHONE Mobile Apps for Members. These Apps provide push notifications, geo-location based searching and geo-targeted offering capabilities. These native apps are built using APACHE CORDOVA, HTML, CSS and object-oriented programming languages (e.g., JAVASCRIPT). Spring Administrative Applications enable Spring staff to manage the Spring Platform and Operations.

Spring has customized Sales & Services Clouds and integrated them with the Spring Platform. As Merchants and/or Offers are closed through the sales process they can be added to SpringRewards.com with a push of a button via custom integrations built in APEX code.

Spring Members may open Service Cases or use Live Chat directly from SpringRewards.com, which places these into the platform's Service Cloud.

Campaign Planning Tool: the system supporting Spring Marketing generates predetermined and/or custom offer sets for each Spring Member for use in various campaigns using a rule based relevancy engine. The custom offer sets are determined by scoring all available offers using a custom rule engine that looks at Geographic Data, and Consumer Behavior, Recency and Frequency data to rank each offer. Offer sets can then be published to Spring's Push Email Platform via the Campaign Planning Tool. The Campaign Planning Tools are built in an object-oriented programming languages (e.g., RUBY) and run in the cloud (e.g., AMAZON WEB SERVICES (AWS) cloud services).

The platform (Spring) Push Email Portal allows the platform (Spring) to deliver mass promotional mailings to Spring and Merchant email lists using the MyEmma platform. The Spring Platform integrates with MyEmma in real time via an API that provides membership data for targeting and segmentation. Opt-in and opt-out data is also synchronized in real time. Campaign response data is also synchronized with Spring's Merchant and Account Manager Portals.

Data Synchronization Services are built in to be integrated with the system and methods of the present invention and platform as described hereinabove.

The Account Manager Portal allows Spring Staff to lookup Spring Merchants and review key Membership, Program and Campaign business Metrics.

The application may be hosted in the cloud at AWS and built in Backbone.js, HTML, CSS and object-oriented programming languages (e.g., RUBY, JAVASCRIPT).

The Business Intelligence Portal application provides Spring Staff with pull and push reporting of key operational and business metrics. The Spring Business Intelligence Portal is built on the Logi Analytics platform.

The Member Services Portal allows Spring staff to troubleshoot customer issues and perform basic customer service functions. The application is hosted in the cloud at AWS and built in Backbone.js, HTML, CSS and object-oriented programming languages (e.g., RUBY, JAVASCRIPT).

Merchant Applications include a Merchant Portal, which allows Spring Merchants to review key Membership, Rewards Program and Campaign business Metrics.

The application is hosted in the cloud at AWS and built in Backbone.js, HTML, CSS and object-oriented programming languages (e.g., RUBY, JAVASCRIPT).

Spring Push Email Portal. The Spring platform supports Merchants who wish to deliver their own Newsletter or Communicaton mailings using the MyEmma platform. The Spring Platform integrates with MyEmma in real time via an API which provide membership data for targeting and segmentation. Opt-in and opt-out data is also synchronized in real time. Campaign response data is also synchronized with Spring's Merchant and Account Manager Portals.

Spring Platform Services include a Web Tier wherein all Consumer, Merchant and Administrative applications are supported by a variety of web services hosted in the Cloud, preferably at a webhosting service, such as AMAZON WEB SERVICES, and is preferably built in an object-oriented language (e.g., RUBY). The Web Tier is also hosted on one or more server computers in one embodiment. The Web Tier provides data and services to power platform websites, Wi-Fi Captive portals, tablet kiosks, mobile apps, third party partner sites, and other enterprise sites. The Web Tier also handles consumer communication via emails and texts (SMS, MMS, etc.). Preferably, the emails and/or texts are automated. The Web Tier is preferably in communication with at least one remote consumer device, a WiFi portal provider, ISP, a third party partner site, and any other enterprise sites.

Network Services Tier includes the platform website, SpringRewards.com, and the Web Tier is integrated with a back end set of services collectively referred to as the Network Services tier. The Network Services tier is preferably on one or more remote server computers or is hosted on the cloud. The Network Services tier provides integration of the Spring Platform with external transaction providers and financial services parties having card and account data, such as card networks VISA, MASTERCARD, AMERICAN EXPRESS, CARDSPRING and TSYS. These services enroll Members and Cards with the external partners, and are responsible for receiving and scoring any type of transaction which is processed through the external partners, including card swipe, EMV, NFC, RFID, account entry, mobile payments via apps, or any other type of transactions involving cards. The services receive notifications from these partners once a transaction has occurred. One embodiment of receiving and scoring a transaction processed through the external partners includes the merchant POS or online portal sending an authorization request to the external partner, the external partner authorizing the transaction, the merchant POS or online portal sending a transaction file to the external partner with enrollment data or rewards, incentive, or offer redemption data, and the external partner sending the enrollment data or rewards, incentive, or offer redemption data and/or transaction data to the Network Services tier of the platform for processing according to the rules of the platform, including enrollment the account in the platform and/or verifying the enrollment data with the external partners. The Network Services tier is preferably built in JAVA, using the Vert.x application framework. The Network Services tier handles communication with data partners, including but not limited to, merchants, financial service providers, and a WiFi portal provider or ISP, and is responsible for card enrollment and processing transaction notifications from data partners, enforcing redemption rules, and issuing statement credit instructions.

Data is distributed and synchronized across the tiers via messaging, preferably real-time or near real-time messaging.

Partner transaction notification files are preferably sent once a day and contain information for all settled transactions received at the partner for that business day. The files are preferably transmitted via SFTP to a partner specified SFTP server setup during the on-boarding process. The files are preferably tab delimited or tab-separated. The files preferably include a merchant ID, a consumer ID, a card token, a transaction time, a transaction amount, and a transaction ID.

Spring Data Center: Card Enrollment Services are a special class of Network Services and are hosted in the Spring Data Center for PCI Compliance. Card Data is kept encrypted from point to point and stored in a security key appliance from StrongAuth. Card Data Services communicate with transaction providers during the enrollment and un-enrollment processes.

Card Data Services communicate with transaction providers during the enrollment and un-enrollment processes.

Figure 3:
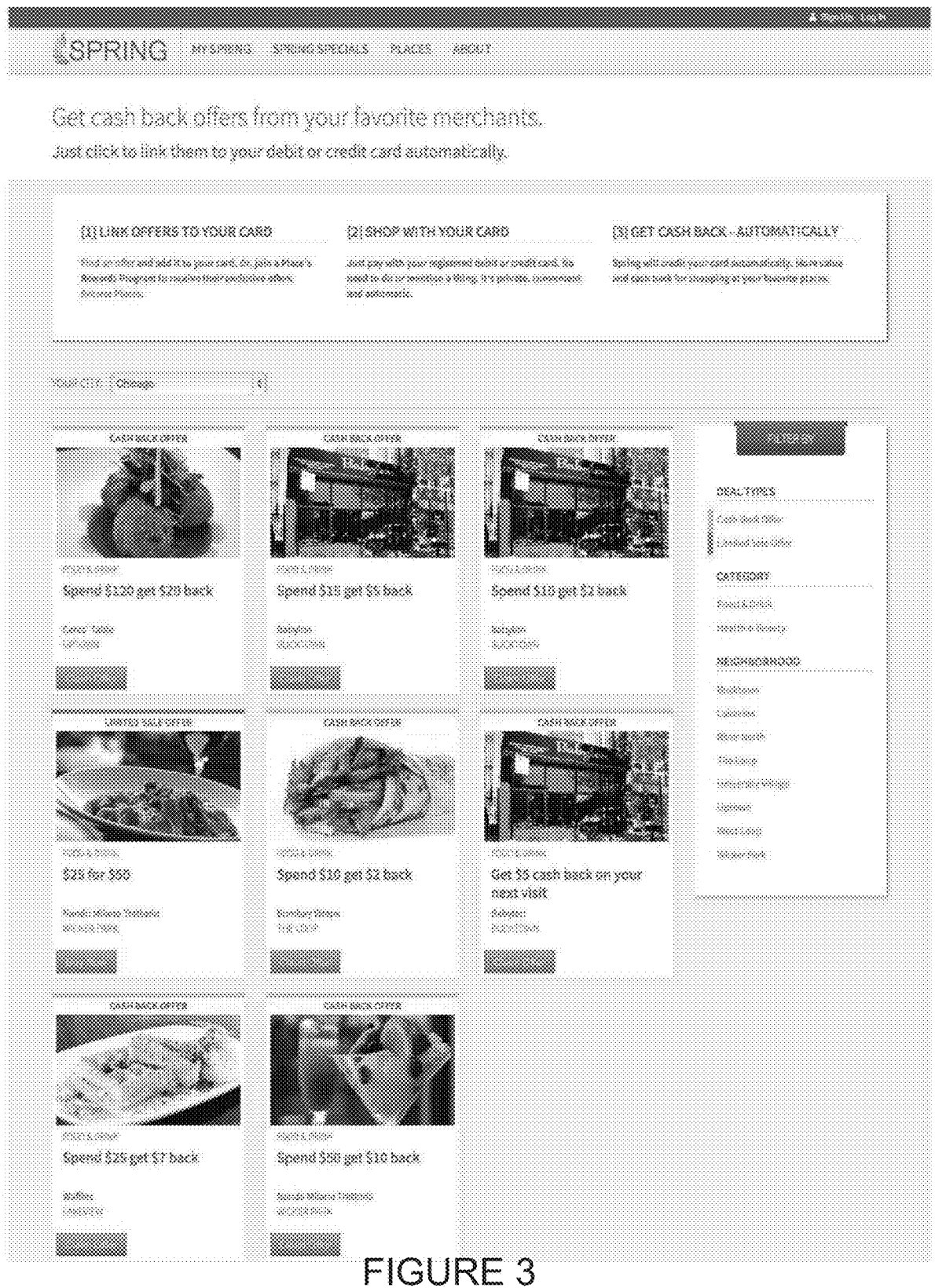
FIG. 3 is a graphic user interface diagram of an embodiment of the invention.
Figure 4:
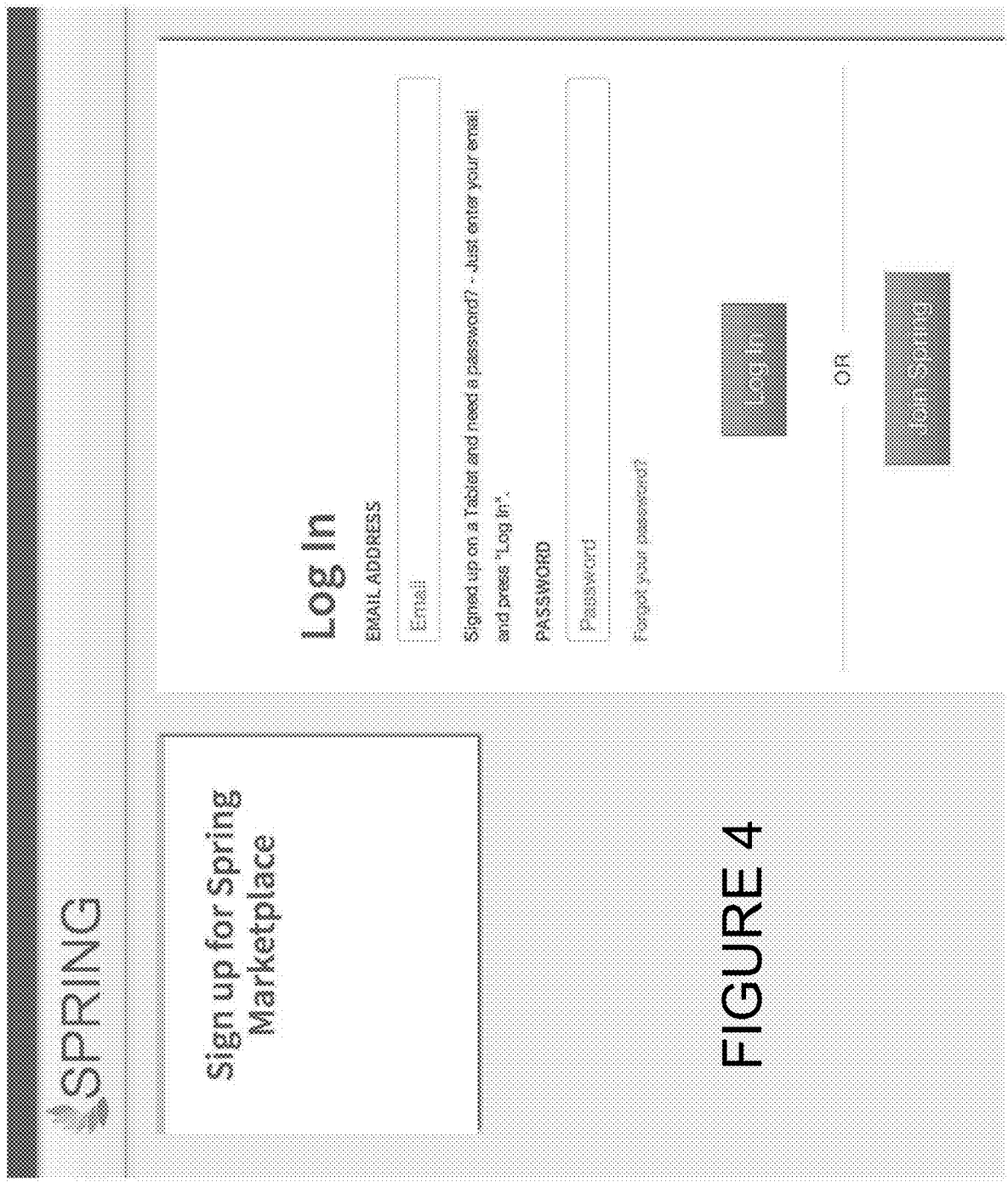
FIG. 4 is another GUI diagram of an embodiment of the invention.
Figure 5:
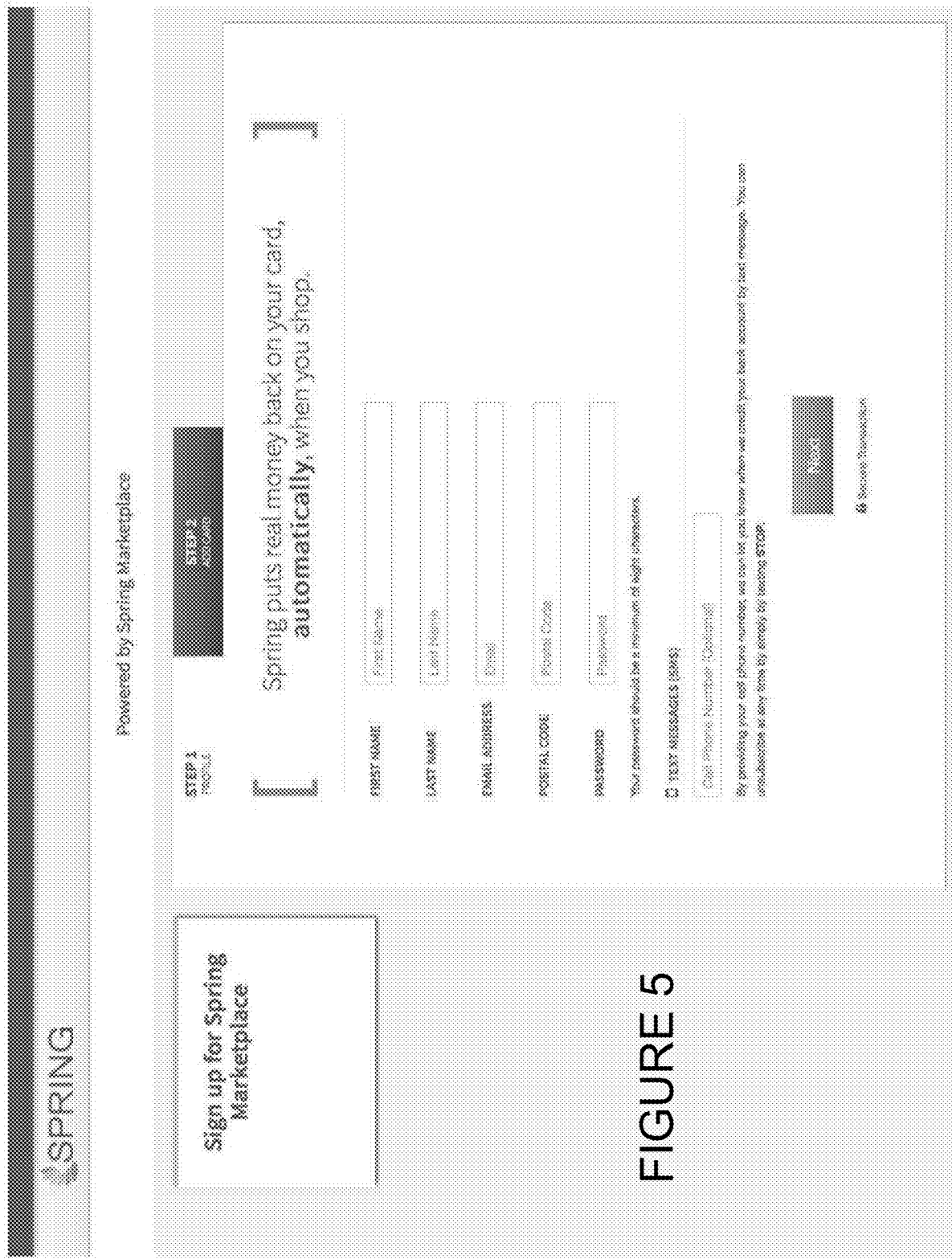
Figure 6:
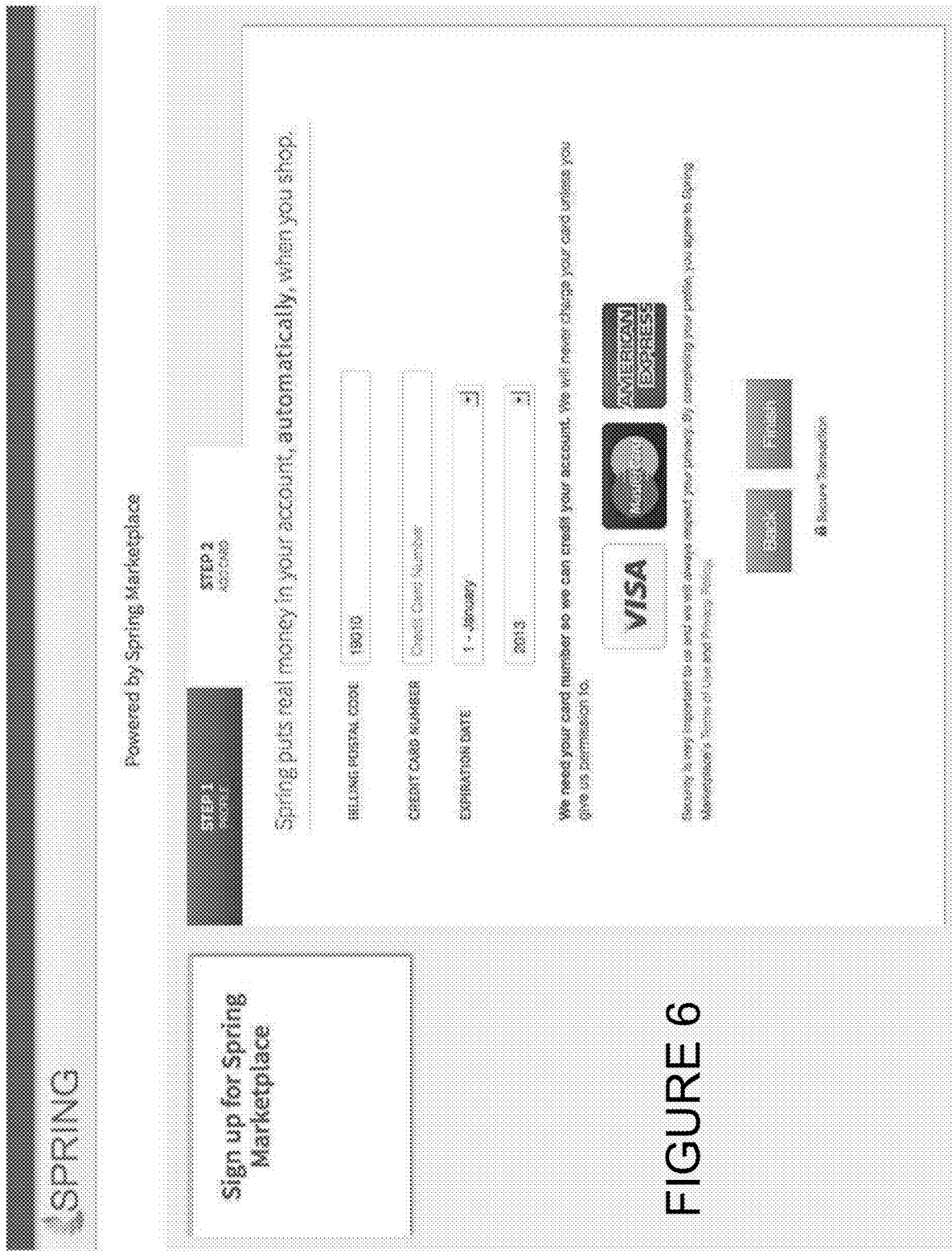
Figure 7:
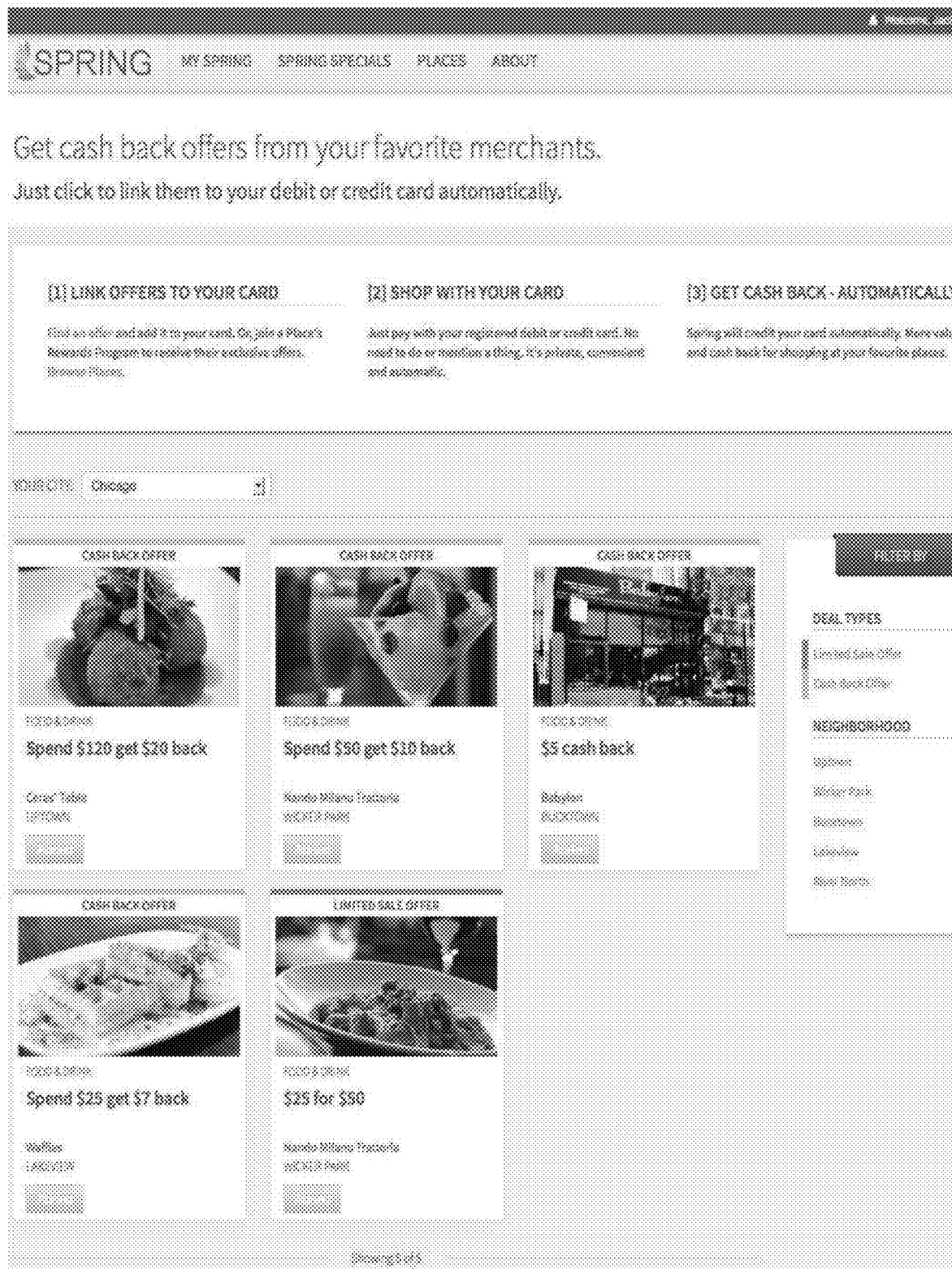
Figure 8:
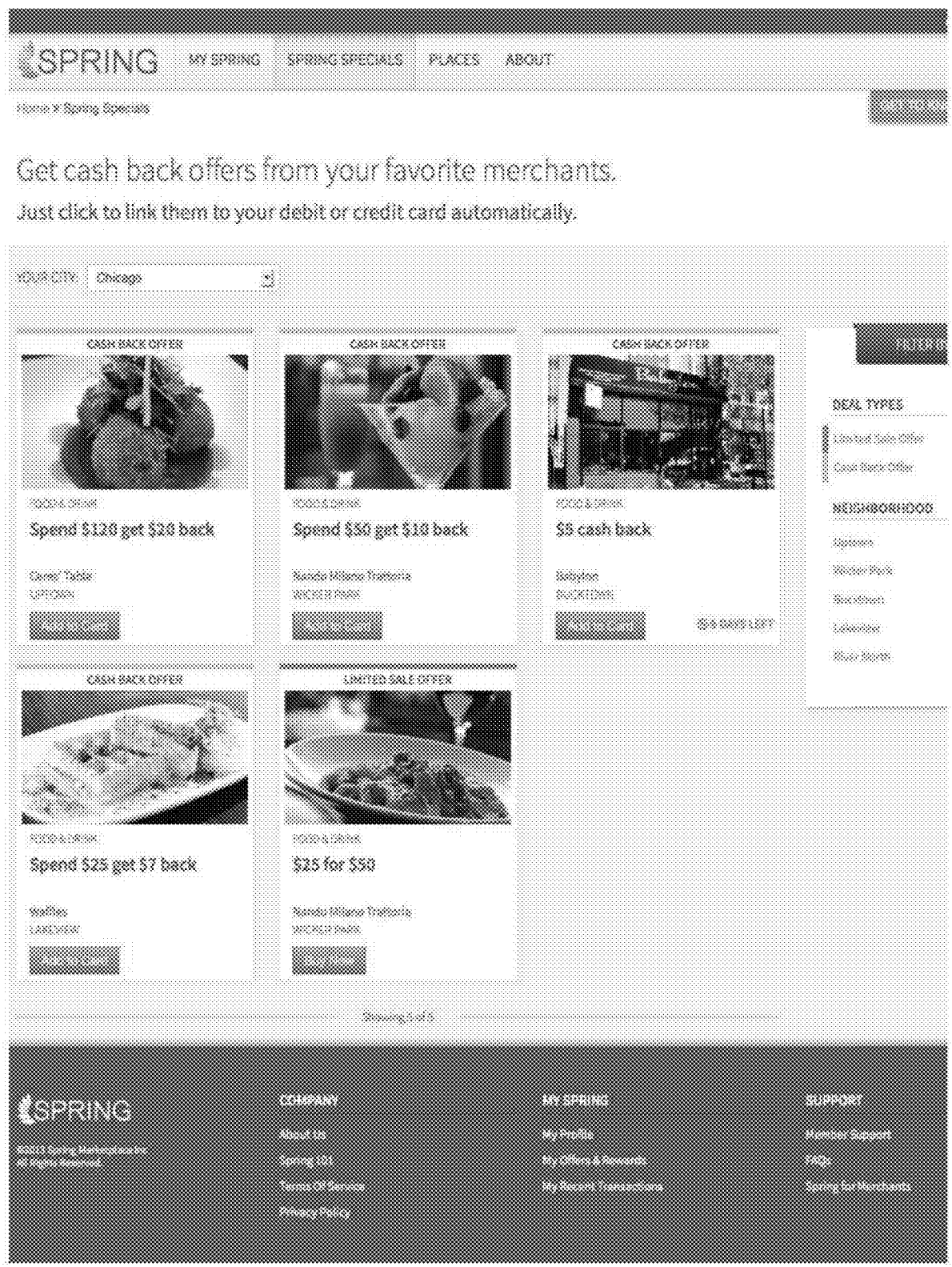
Figure 9:
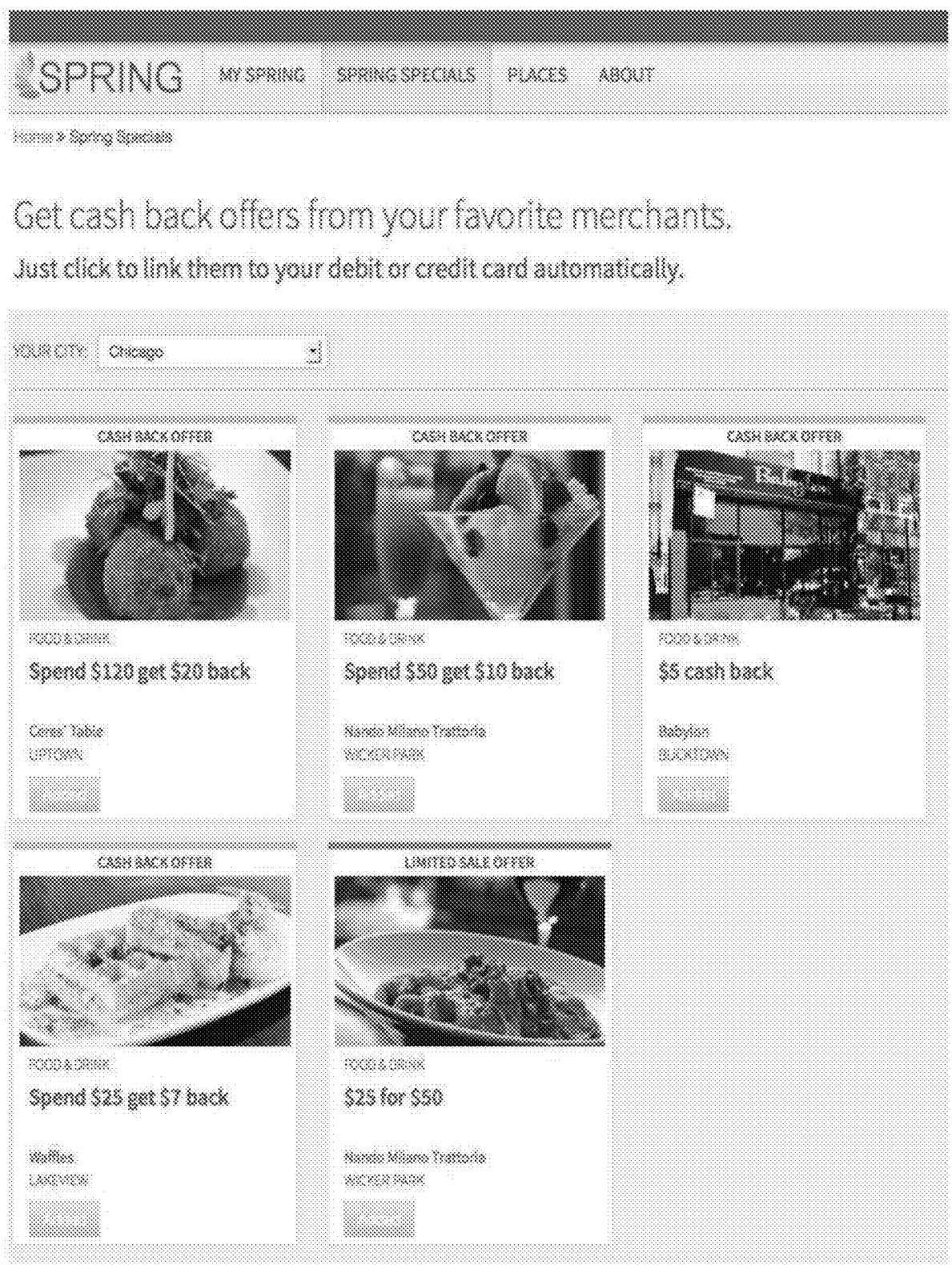
Figure 10:
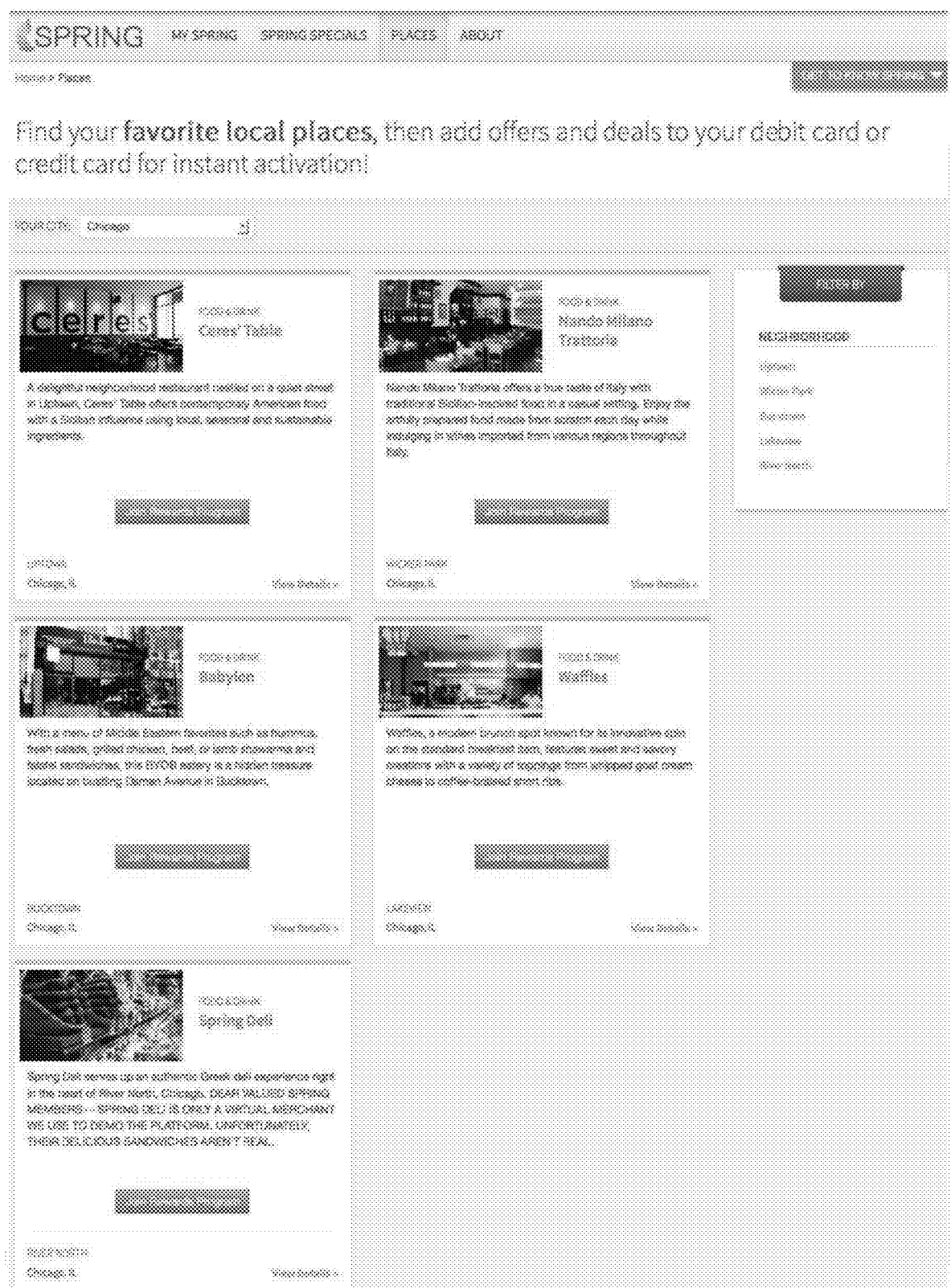
Figure 11:
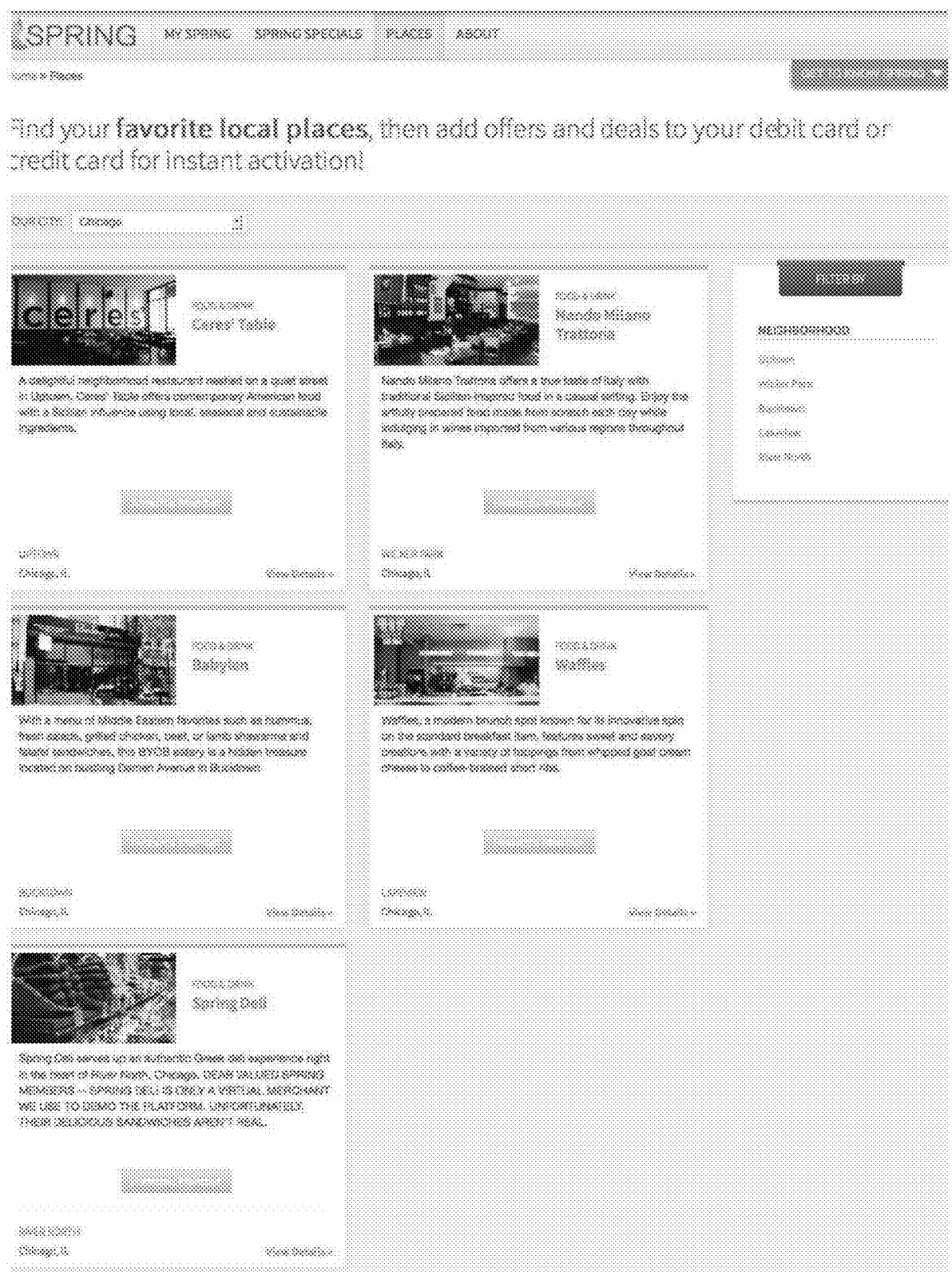
Figure 14:
Figure 15:
Figure 16:
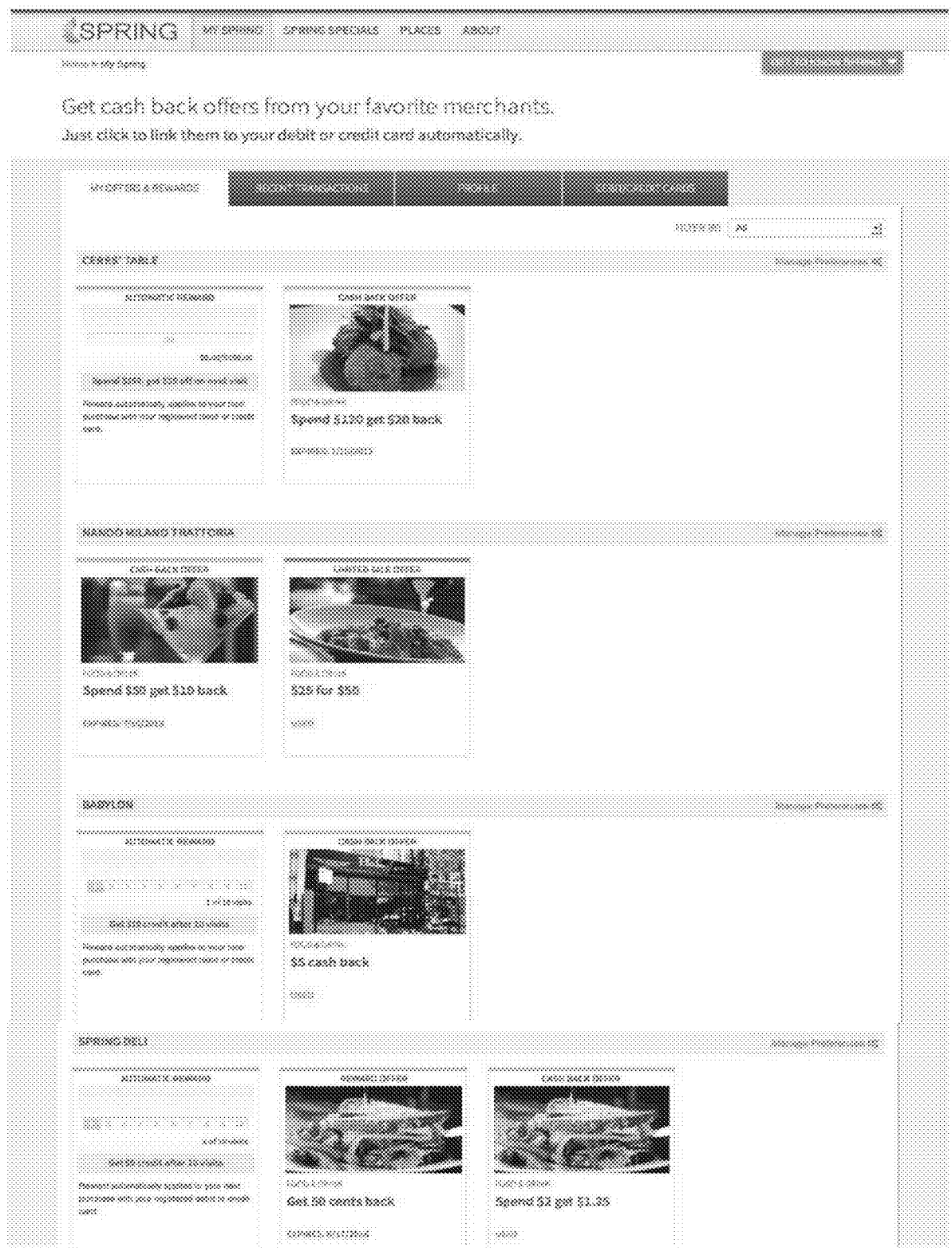
Figure 17:
Figure 18:
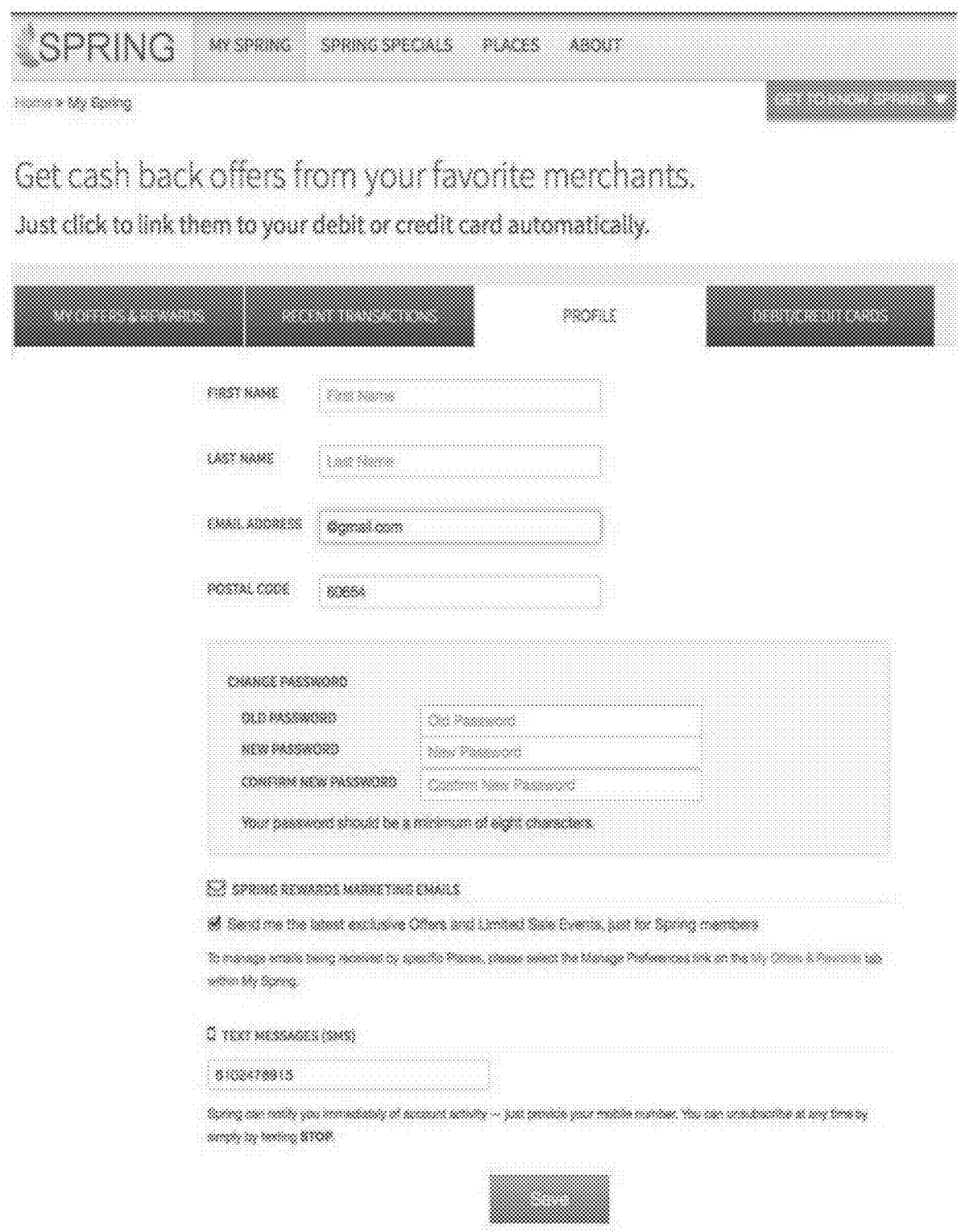
Figure 19:
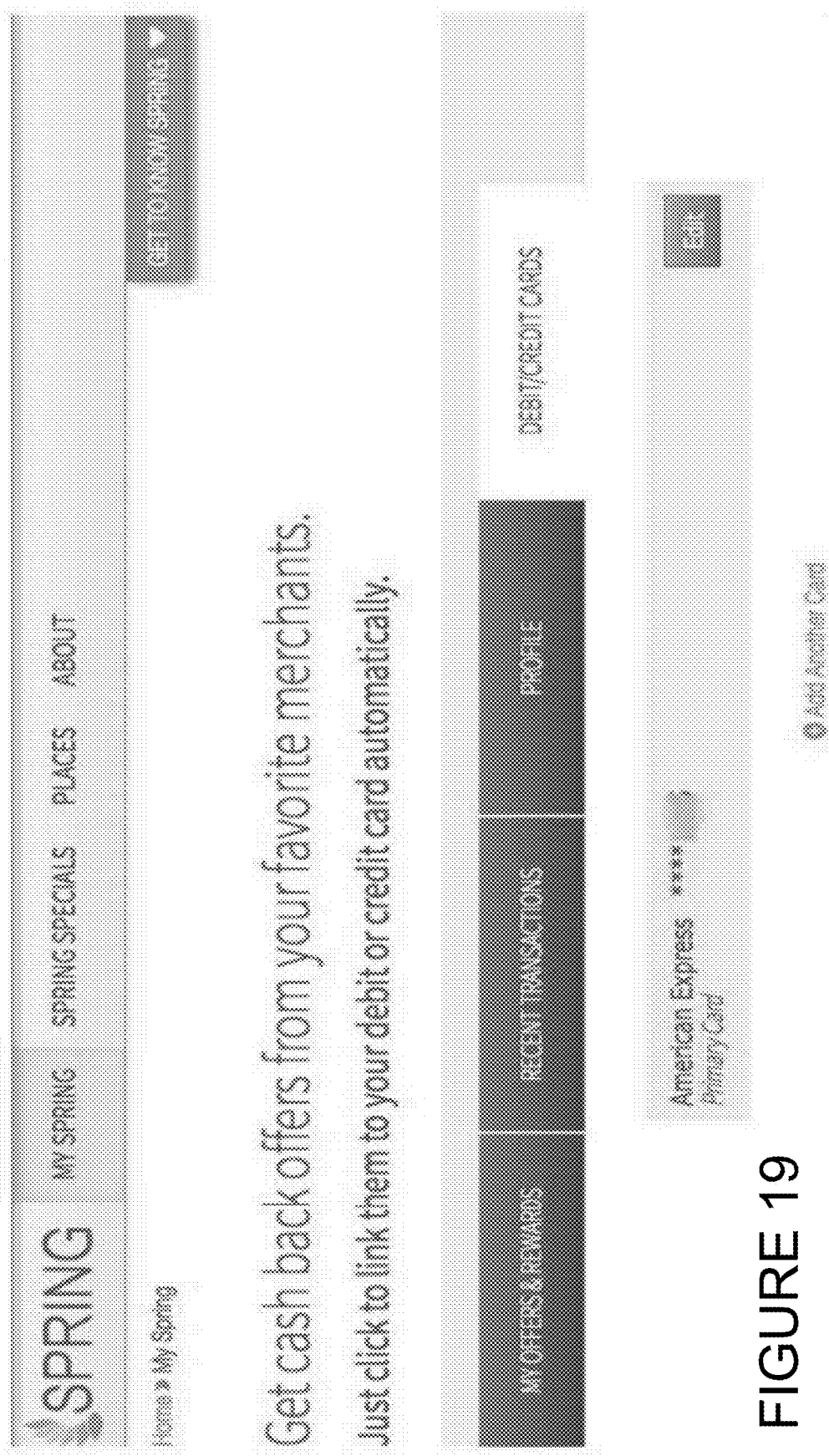
Figure 20:
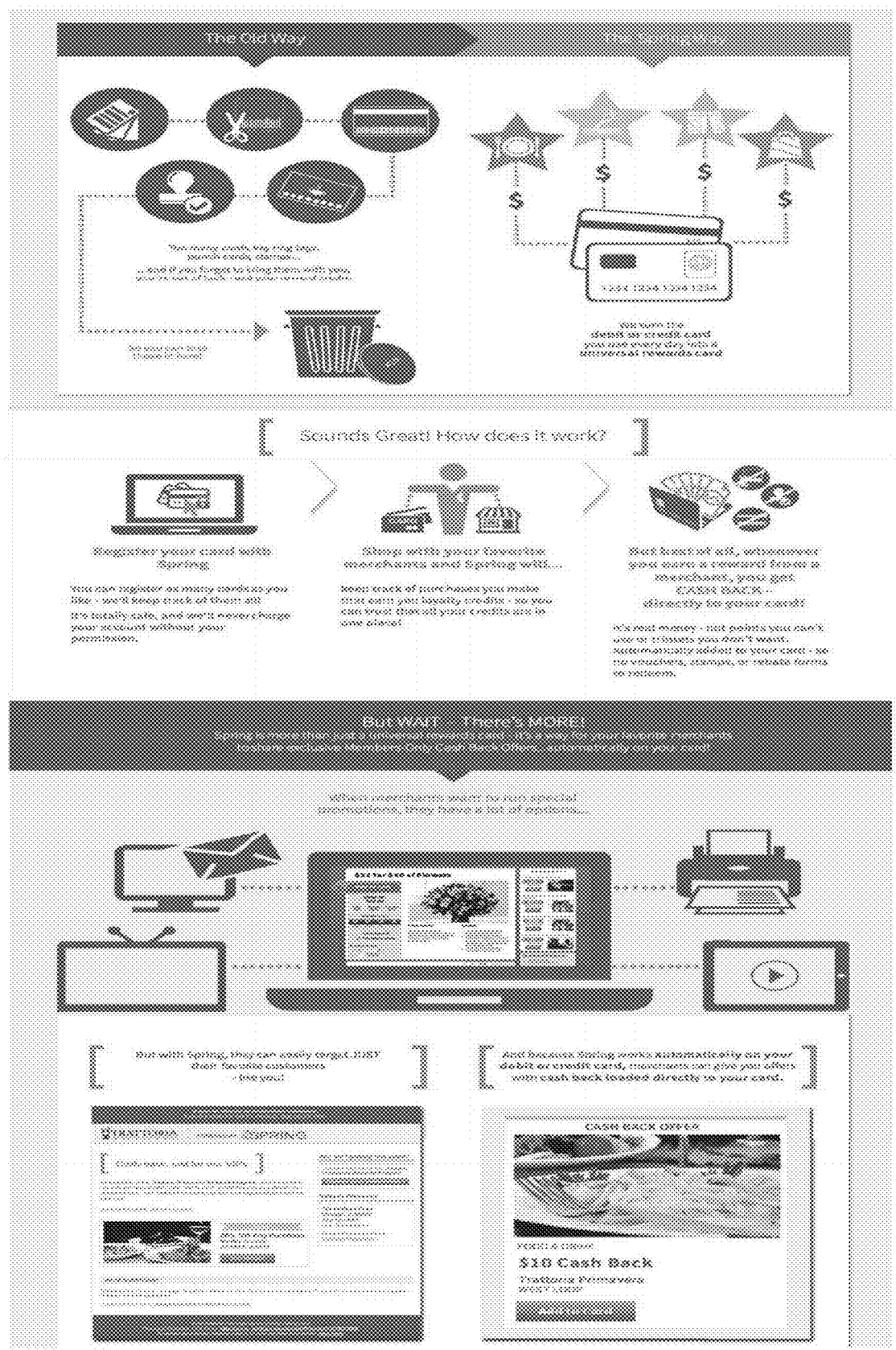
Figure 21:
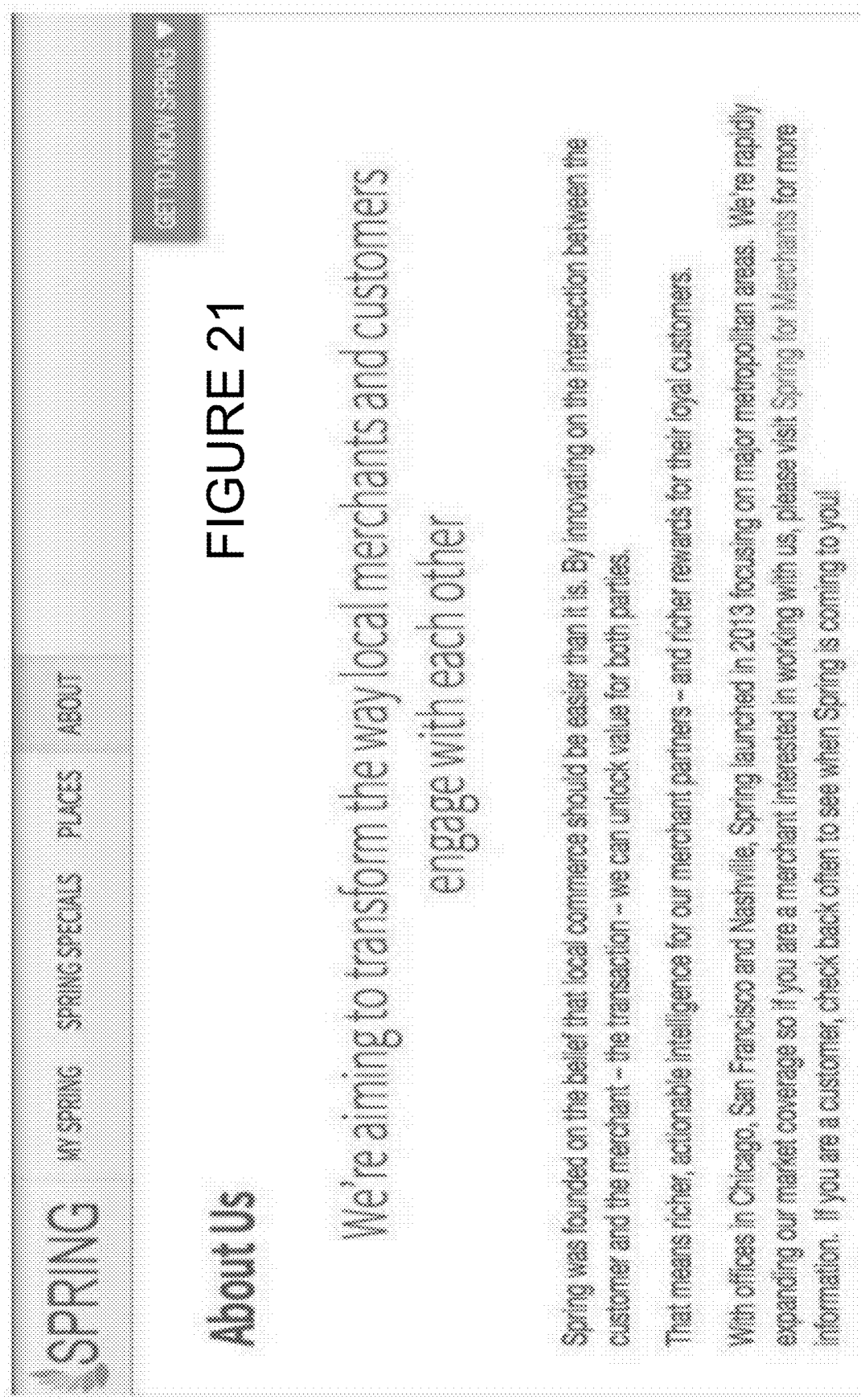
Figure 23:
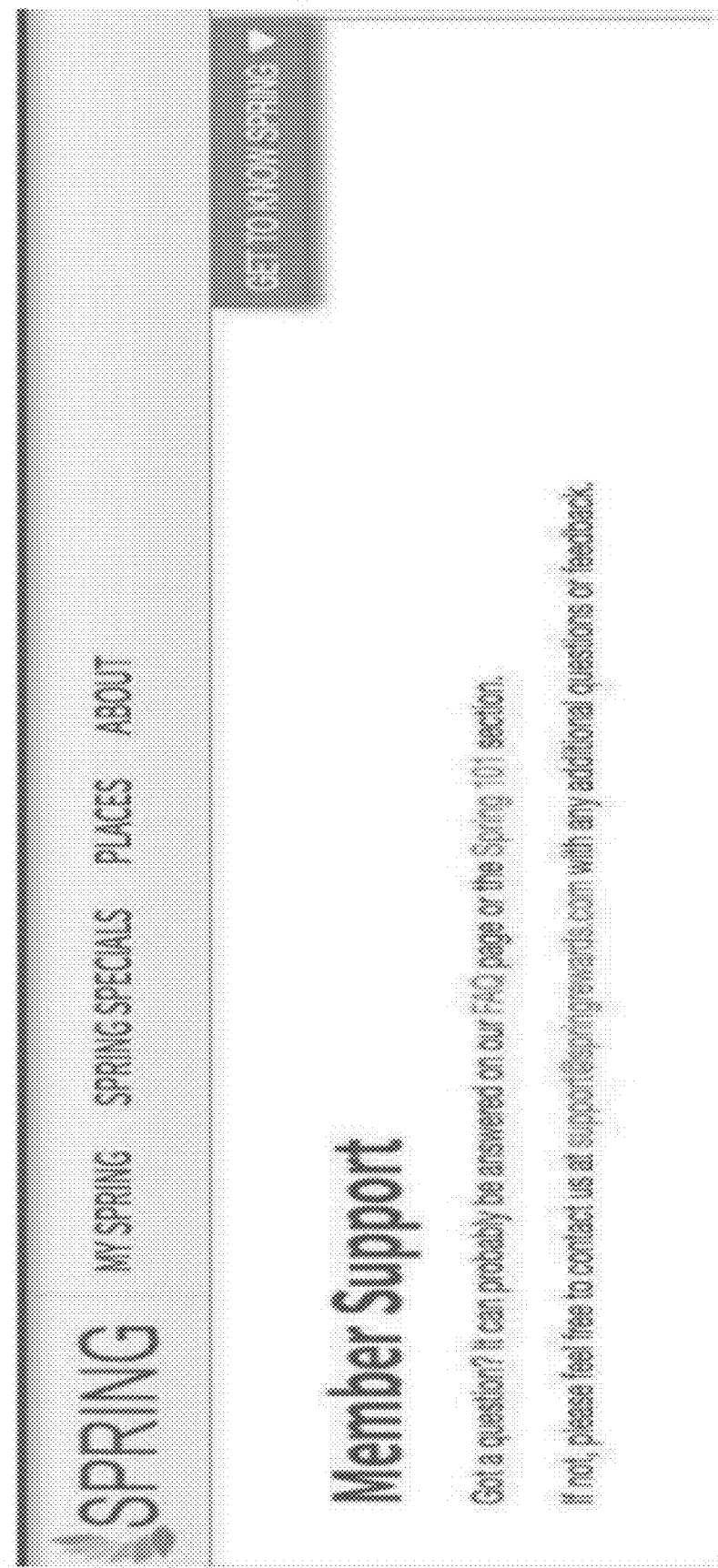
Figure 24:
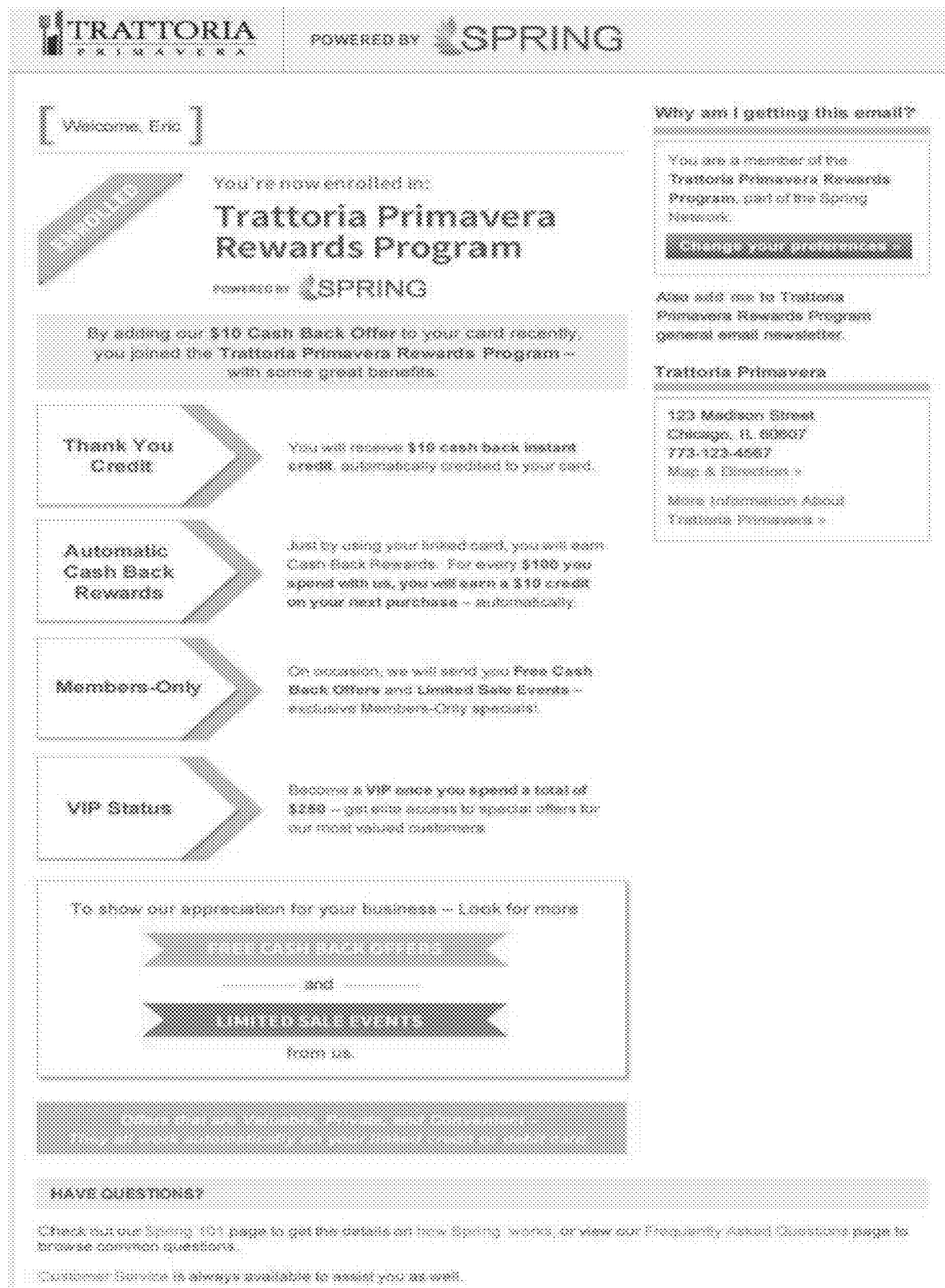
Figure 26:
Figure 27:
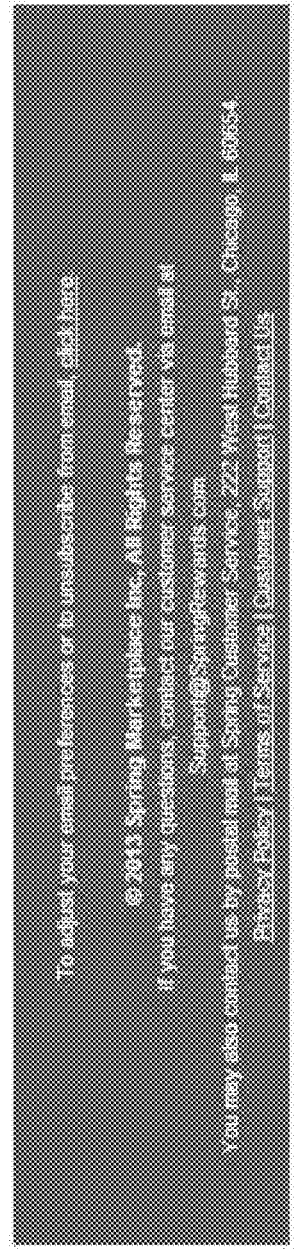
Figure 28:
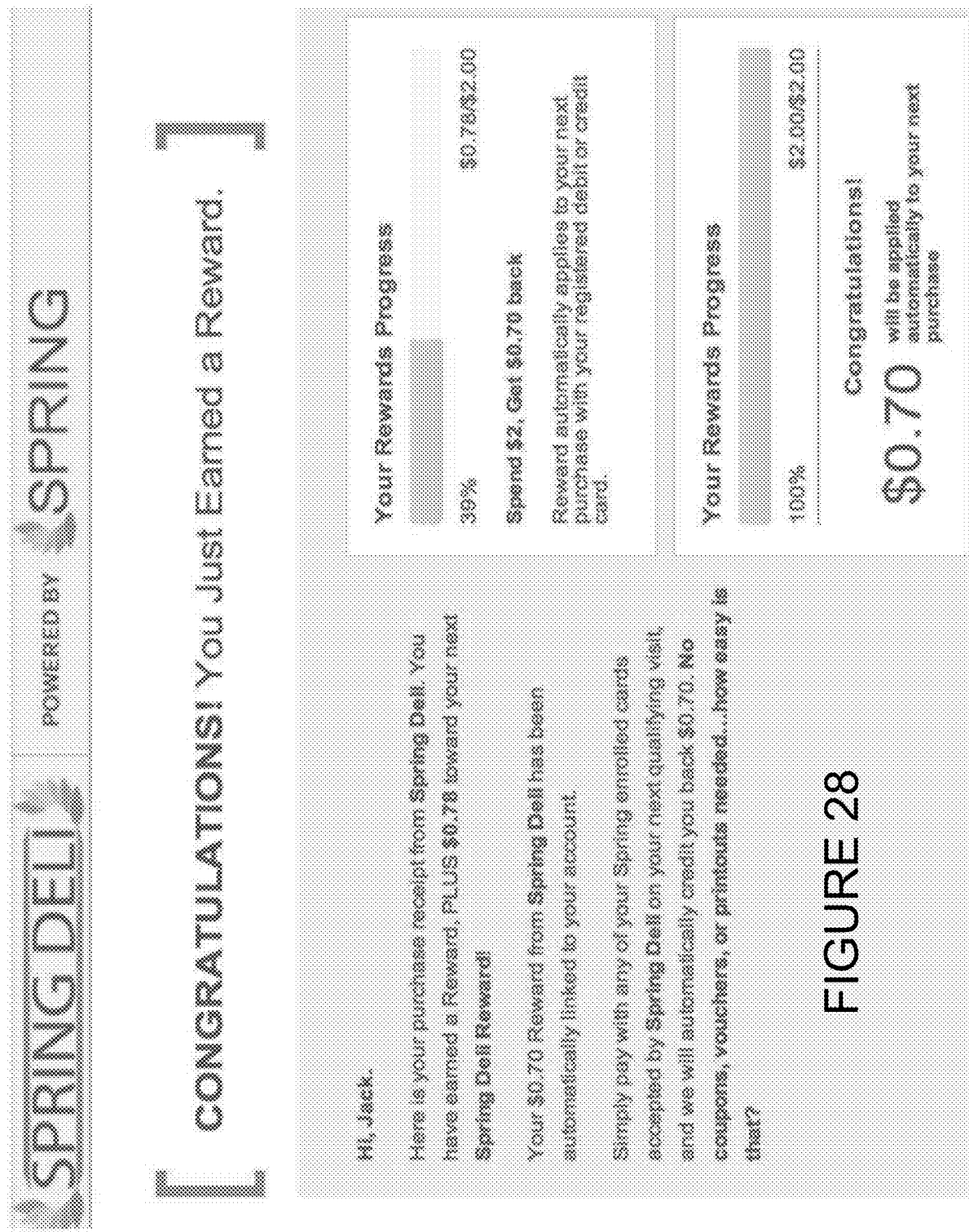
Figure 29:
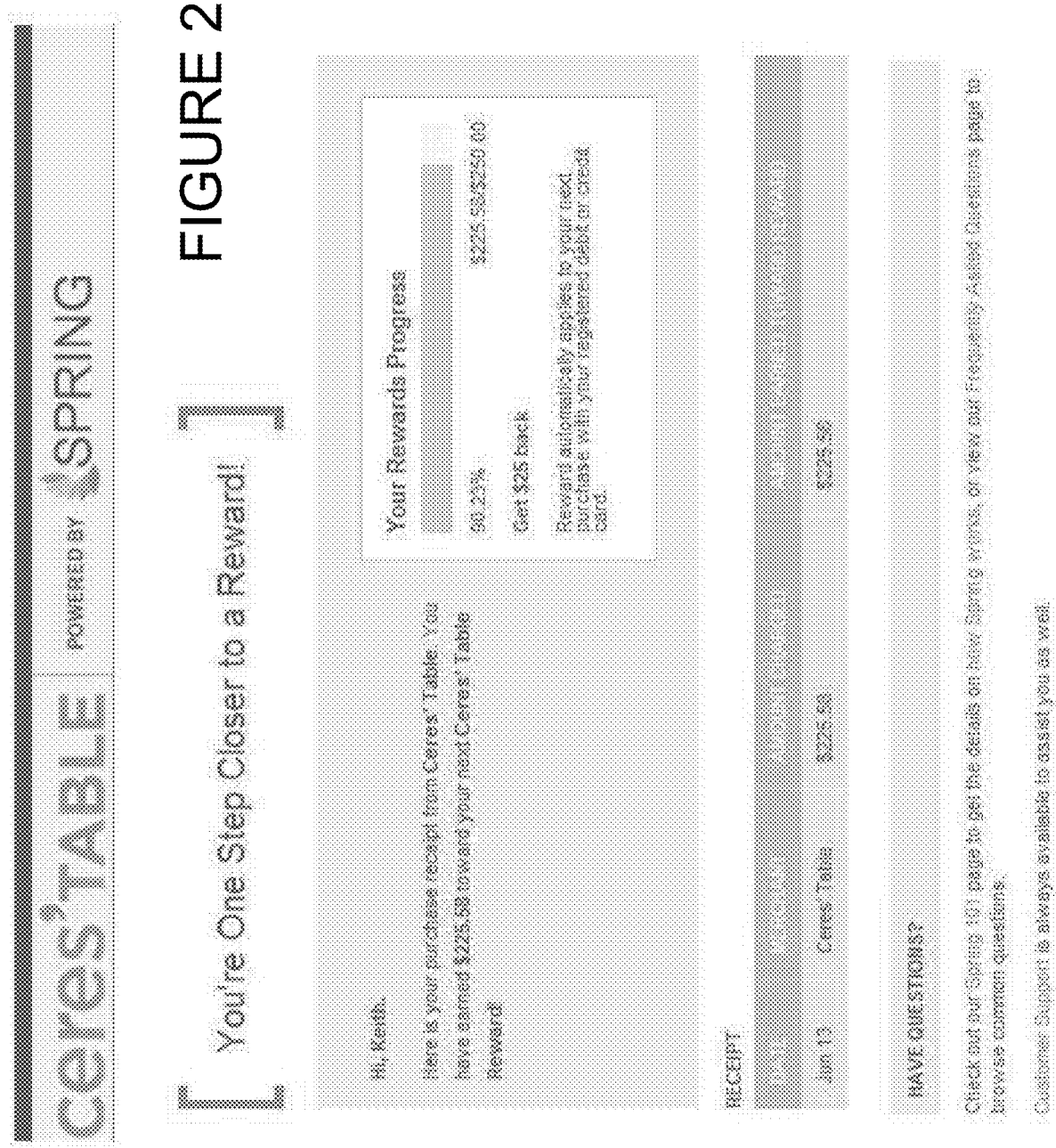
Figure 30:
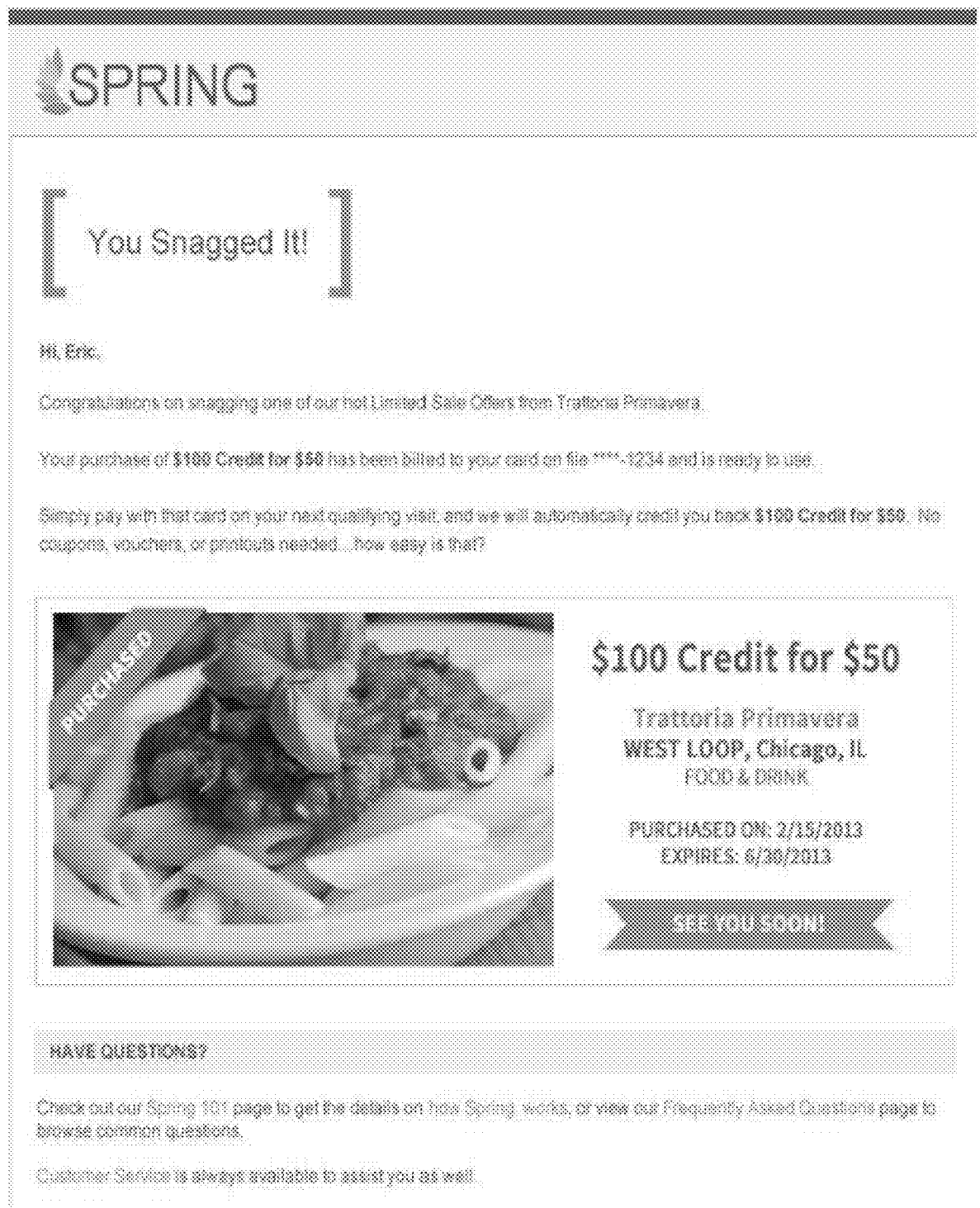
Figure 31:
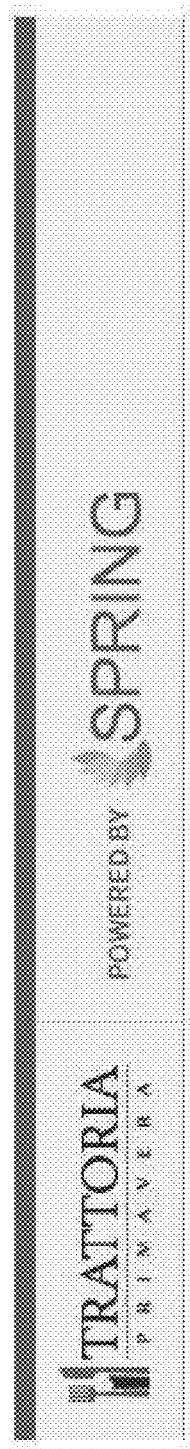
Figure 35:
Figure 36:
Figure 38:
Figure 39:
Figure 40:
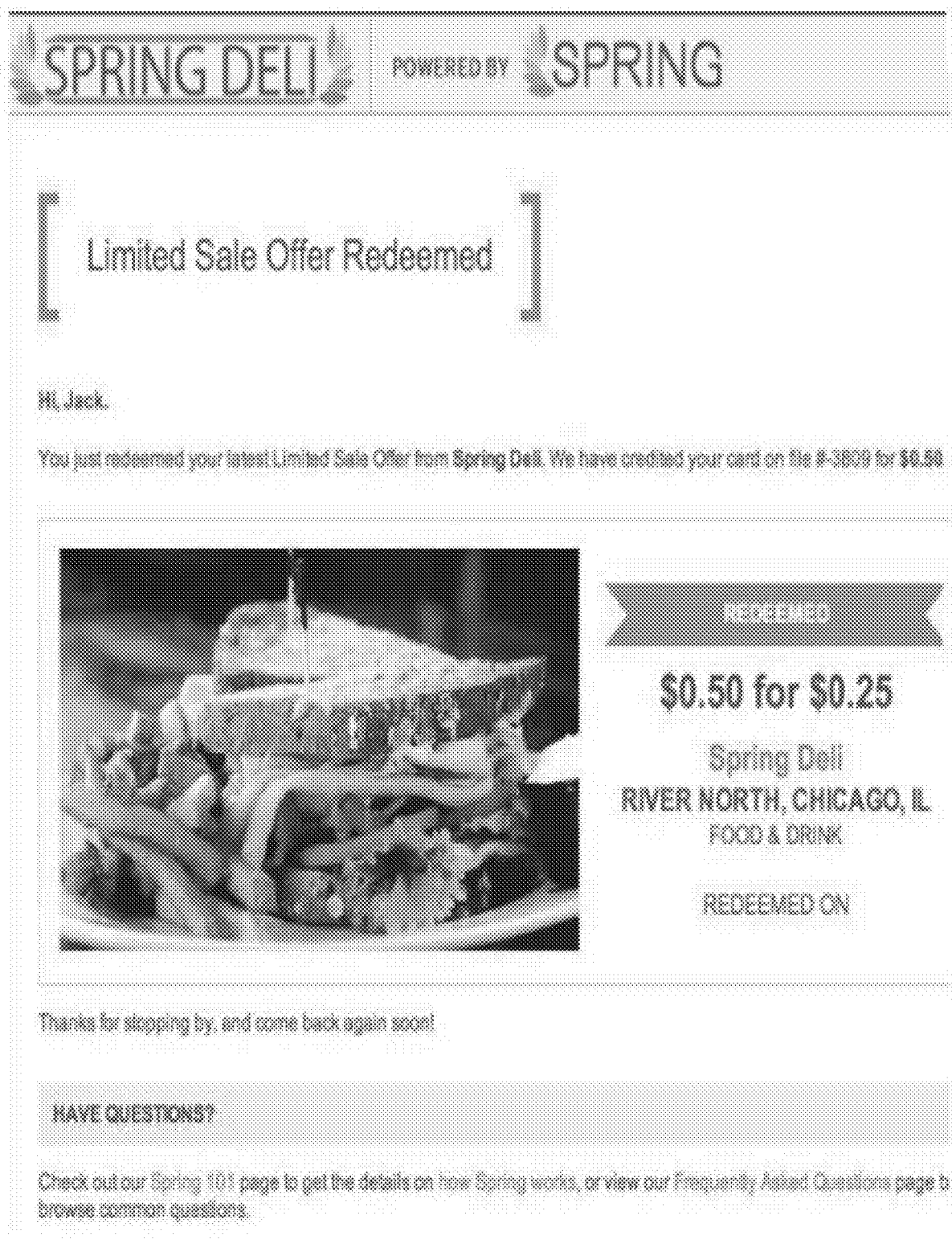
Figure 41:
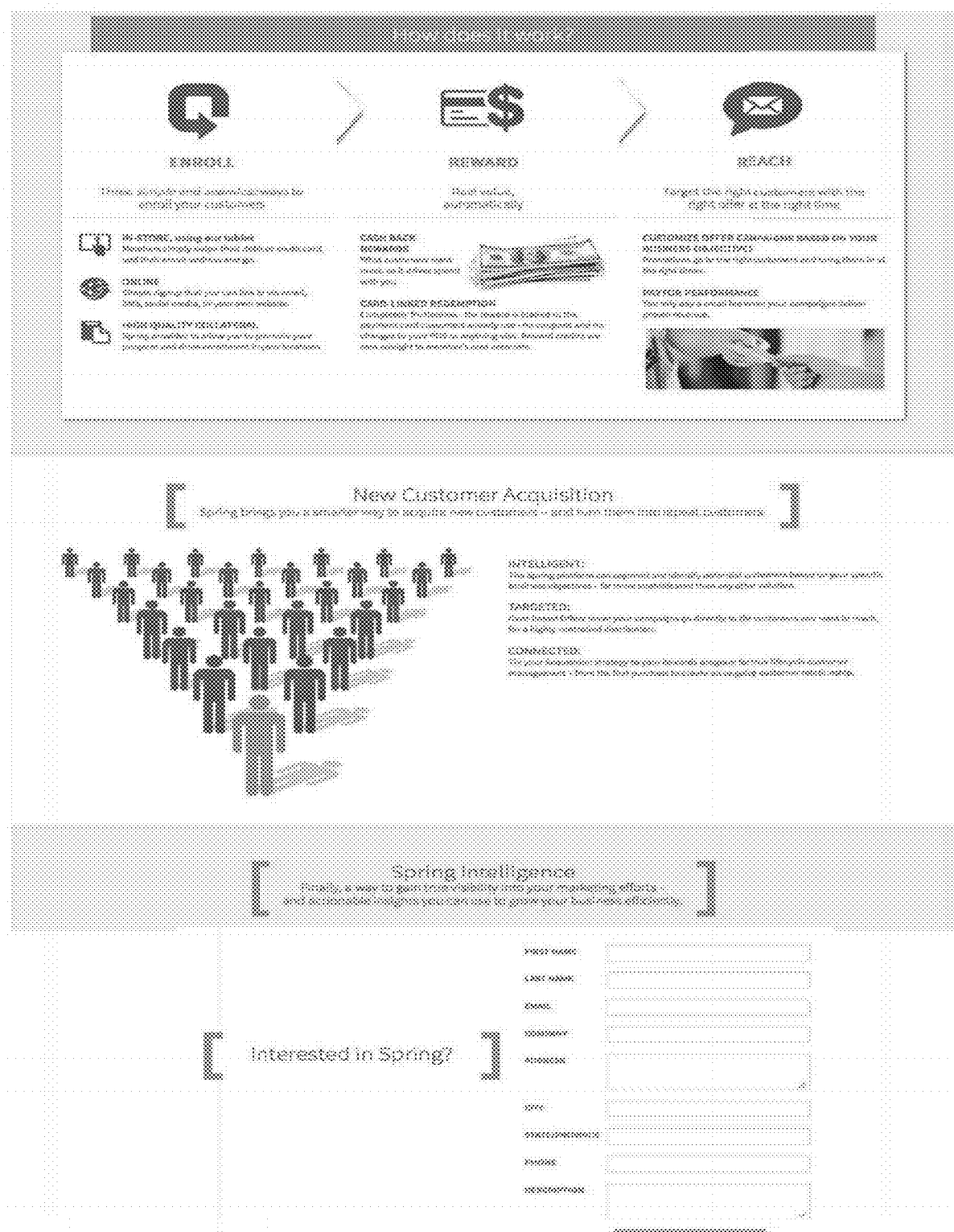
Figure 43:
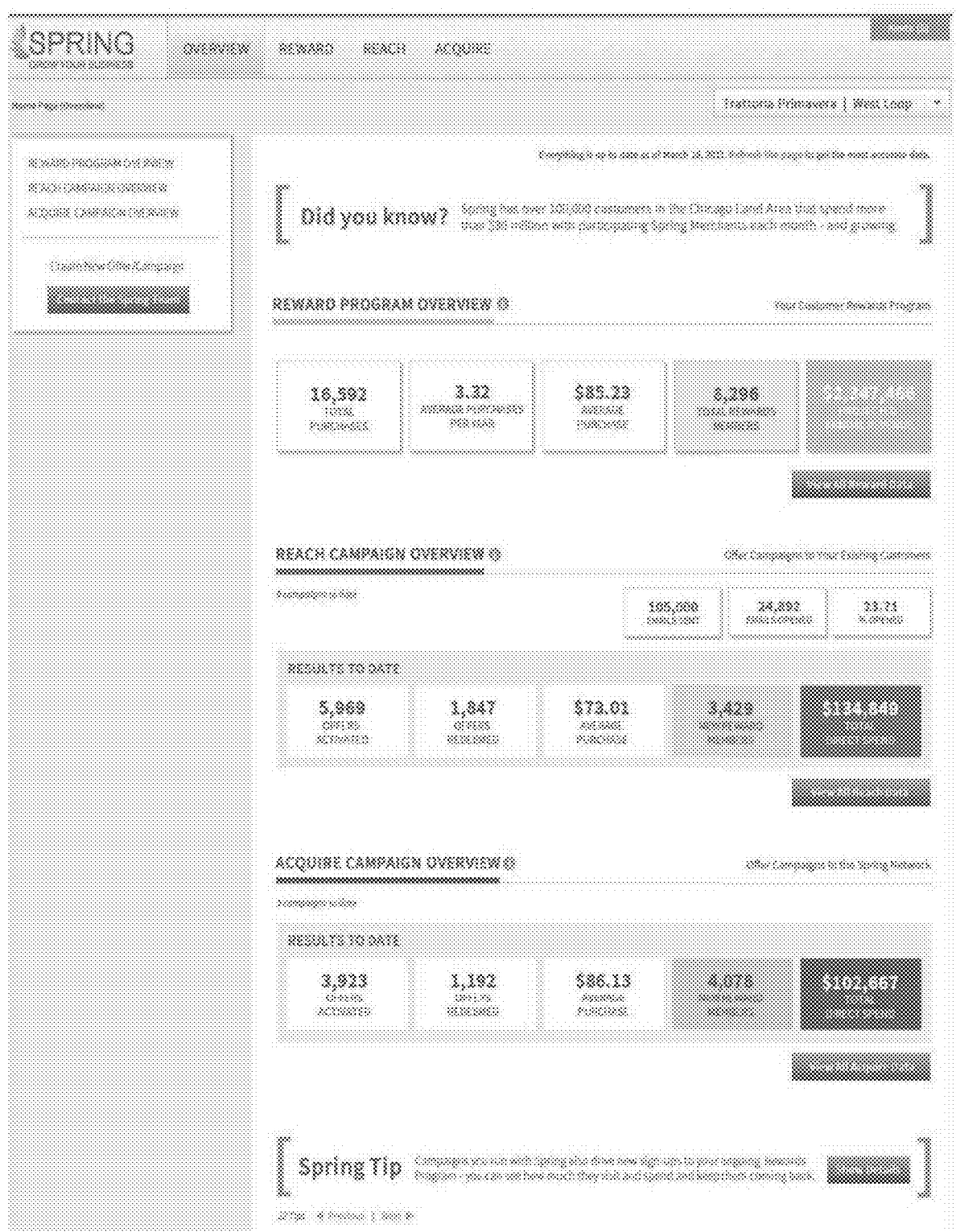
Figure 45:
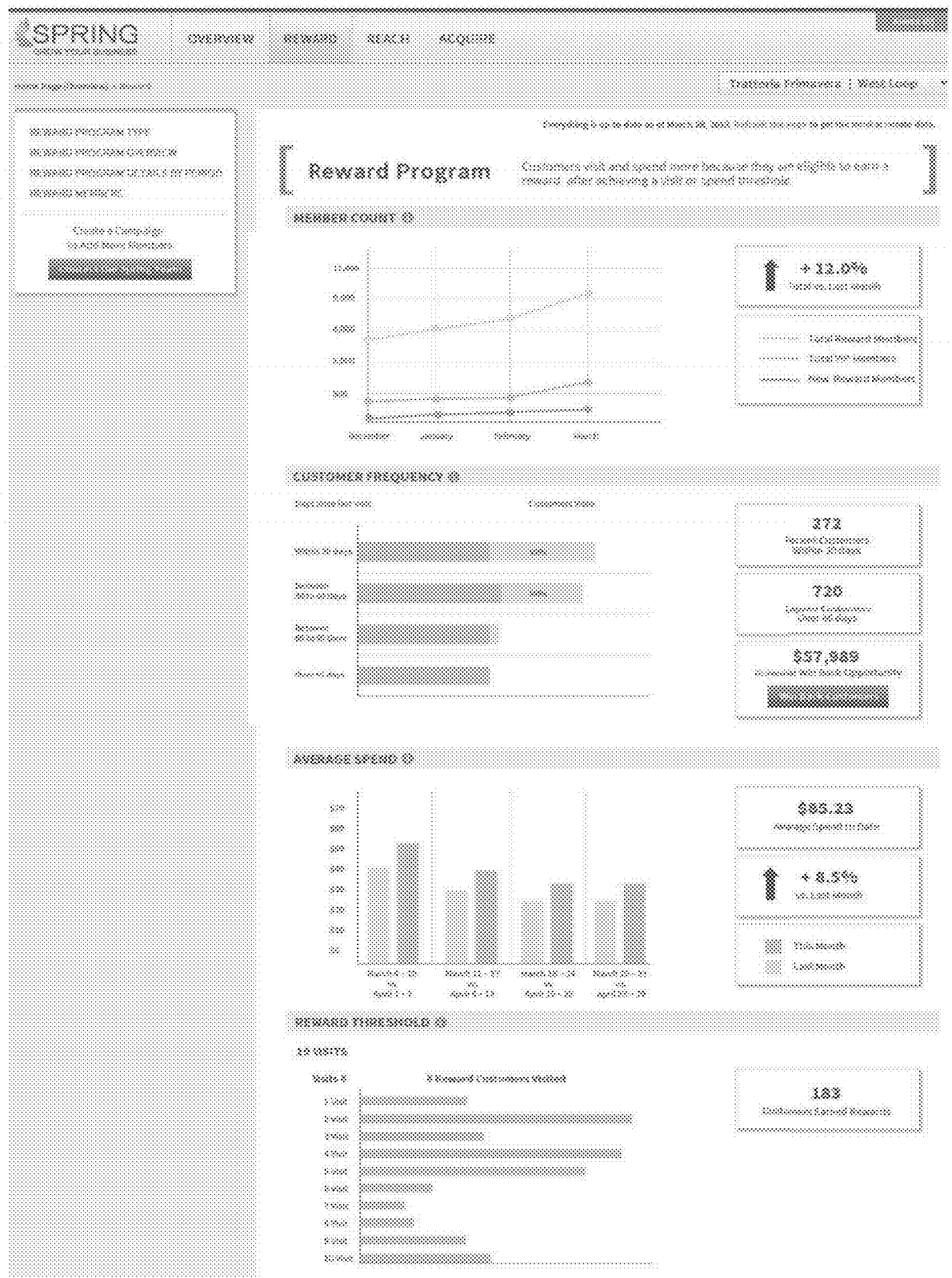
Figure 46:
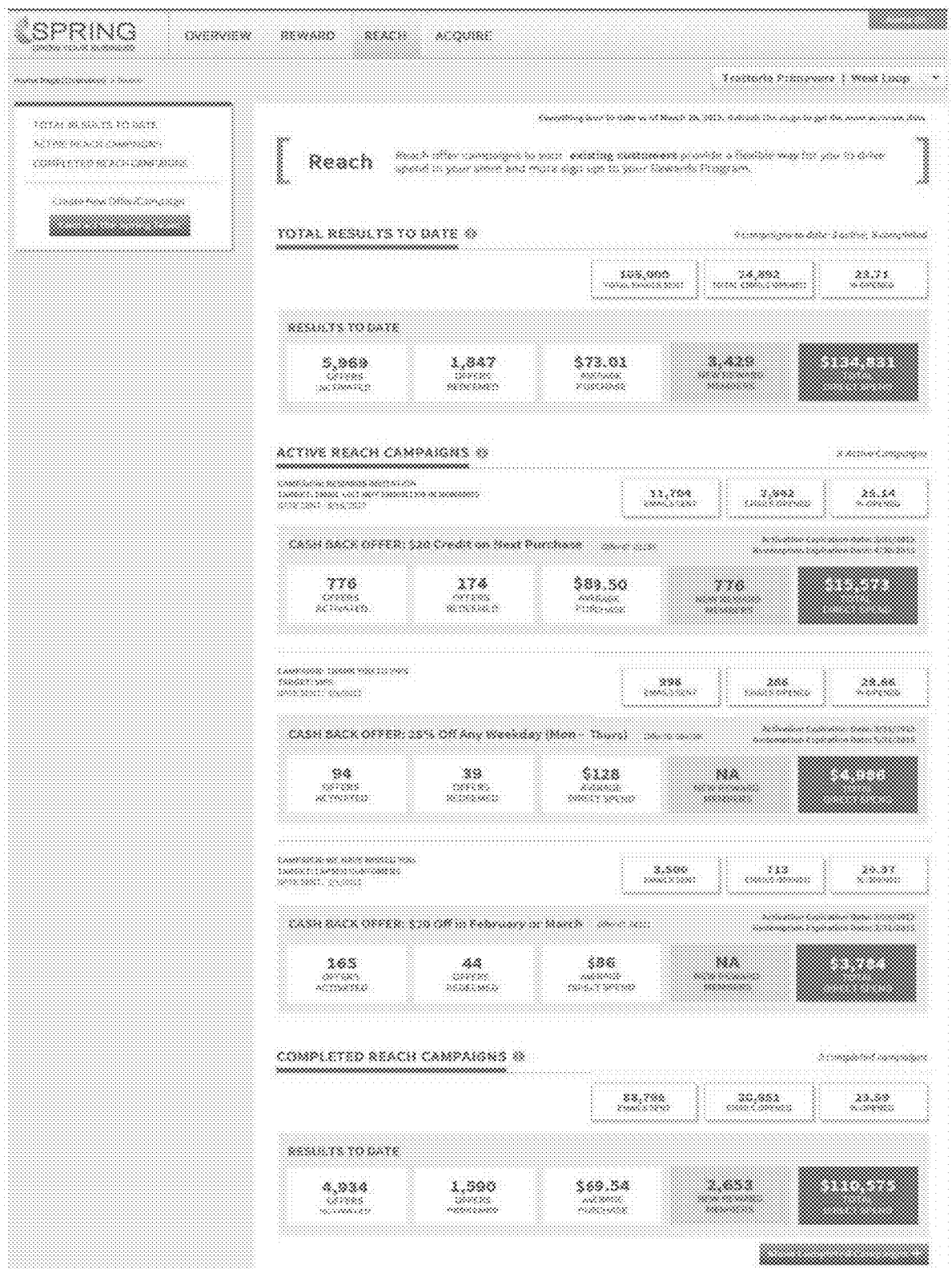
Figure 47:
Figure 48:
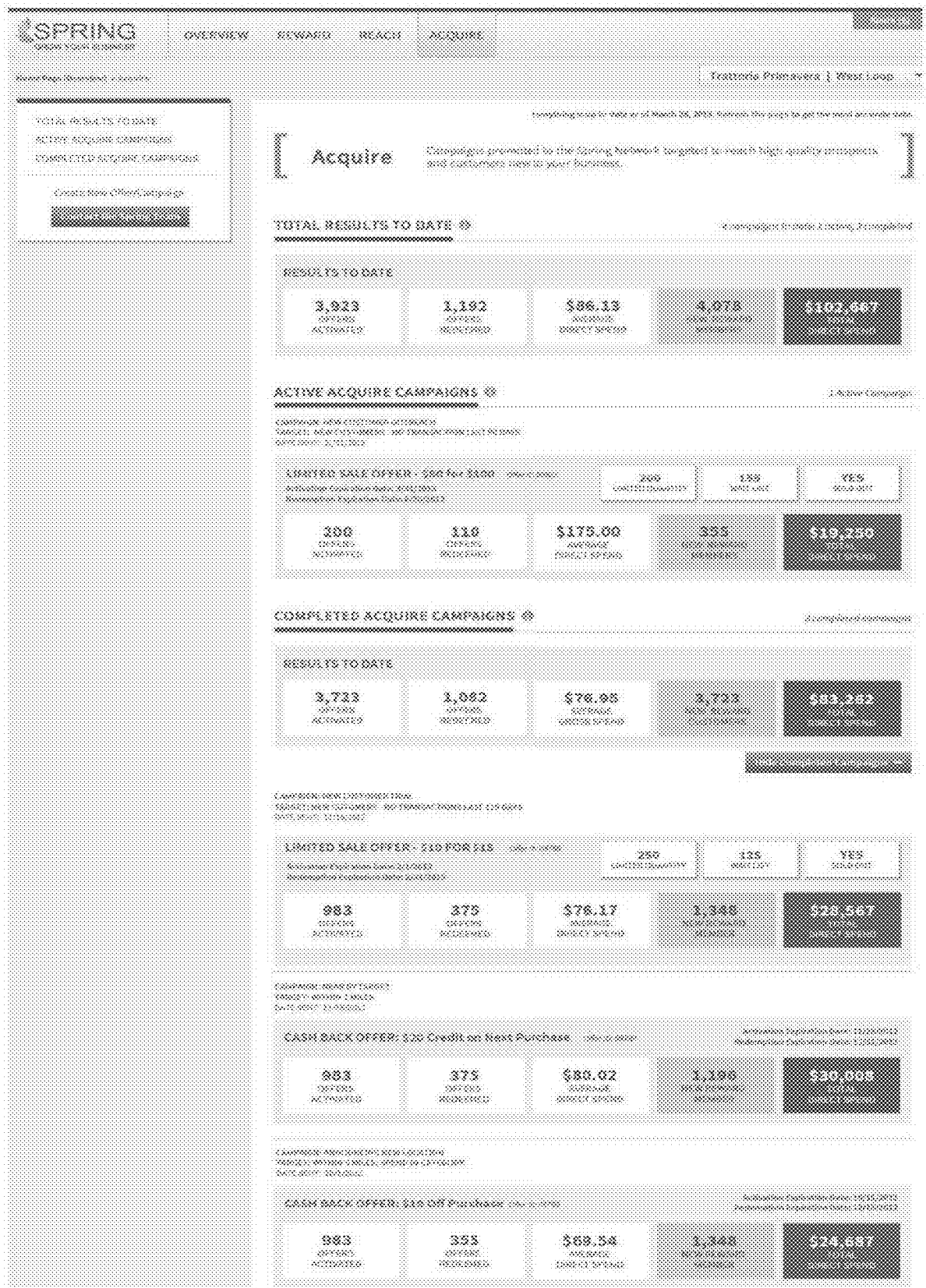
Figure 49:
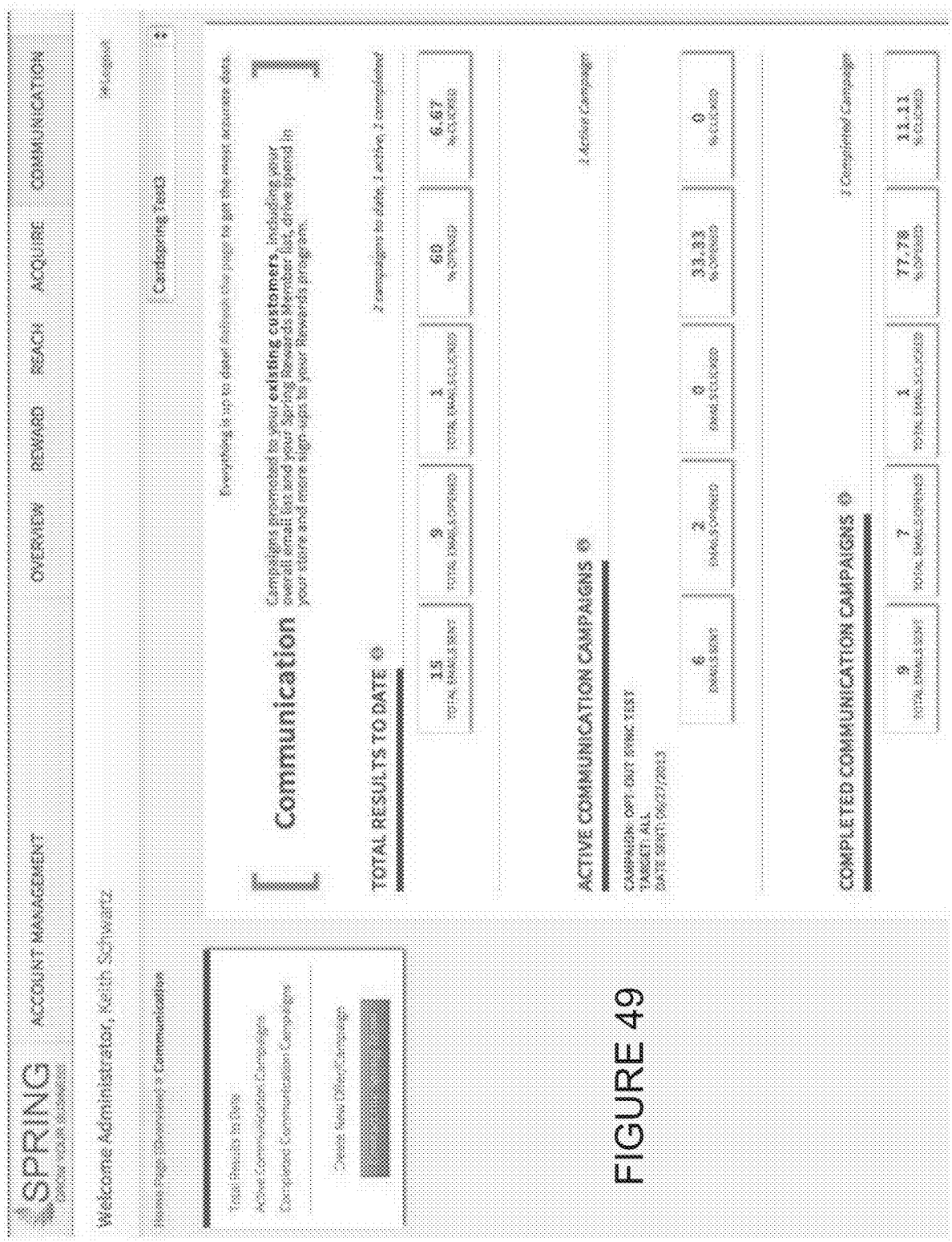
Figure 50:
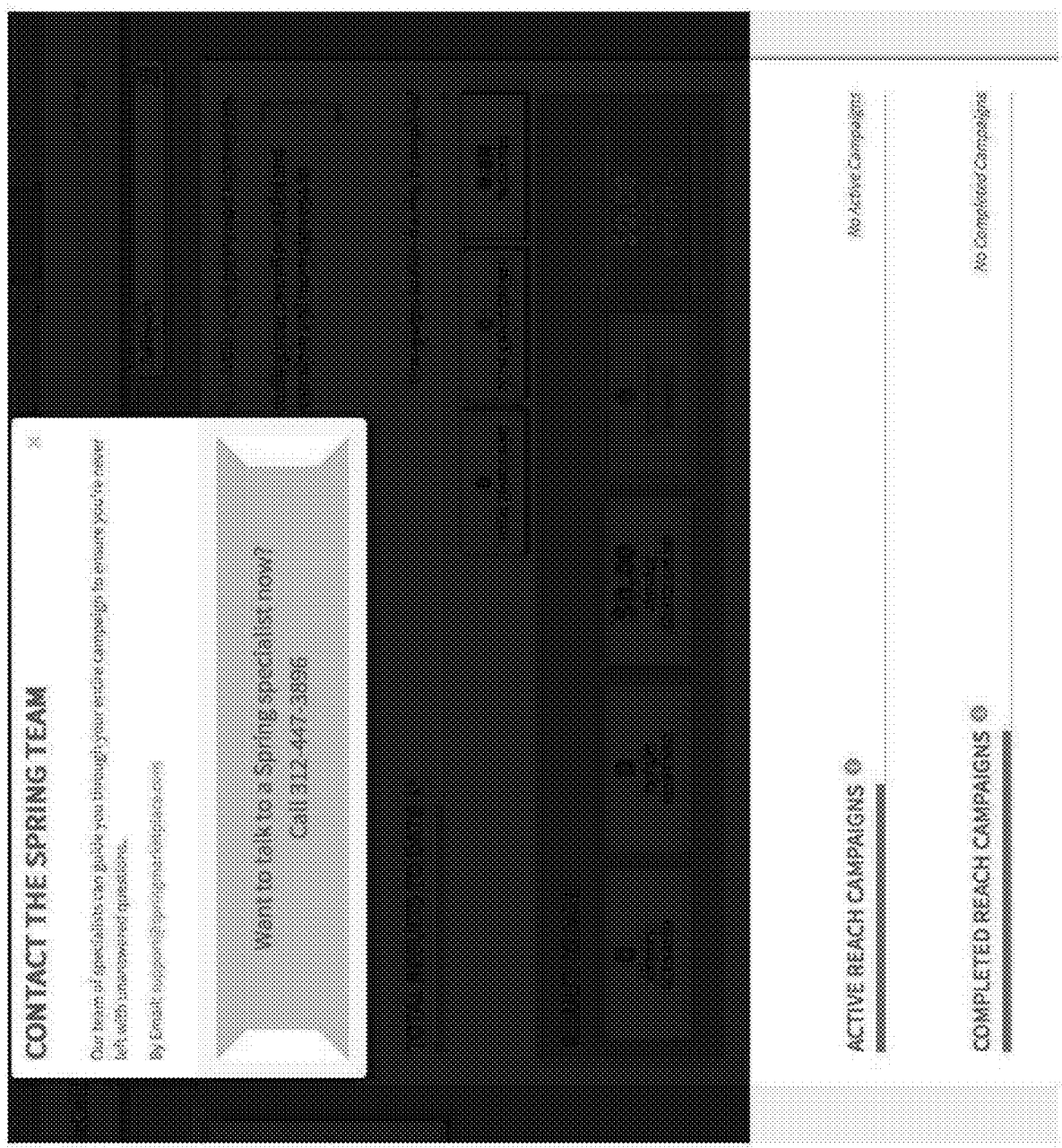
Figure 51:
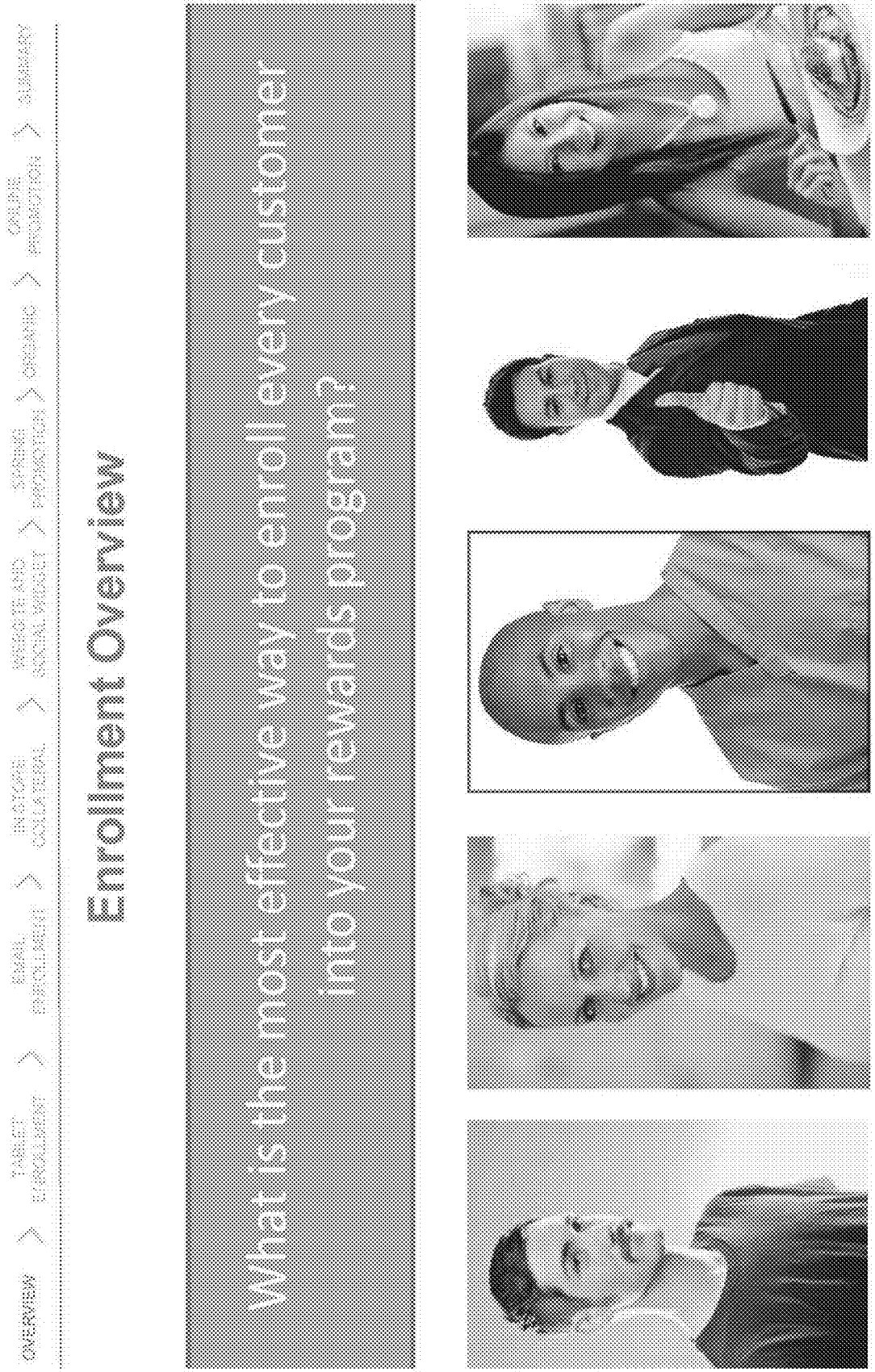
Figure 52:
Figure 53:
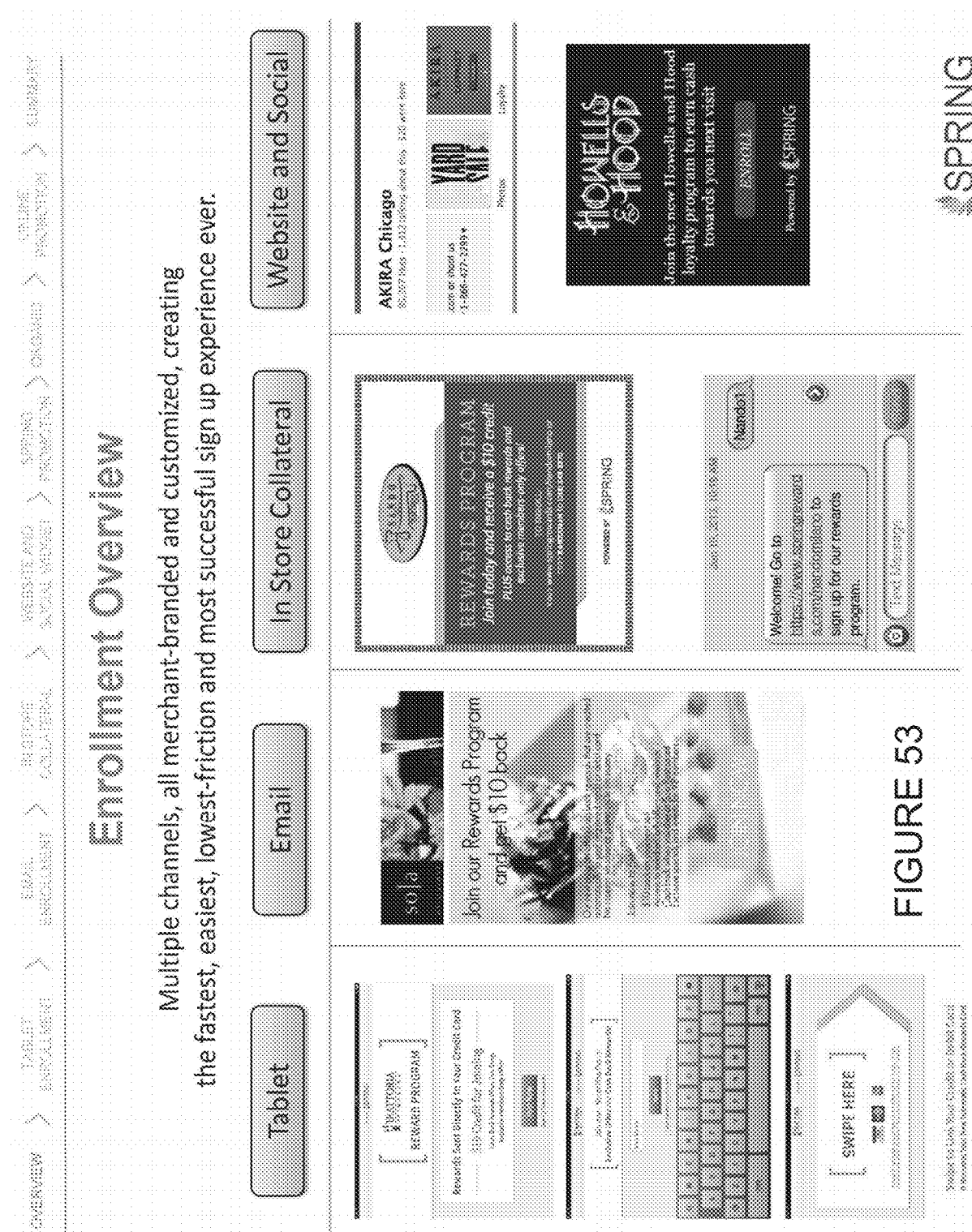
Figure 54:
Figure 55:
Figure 56:
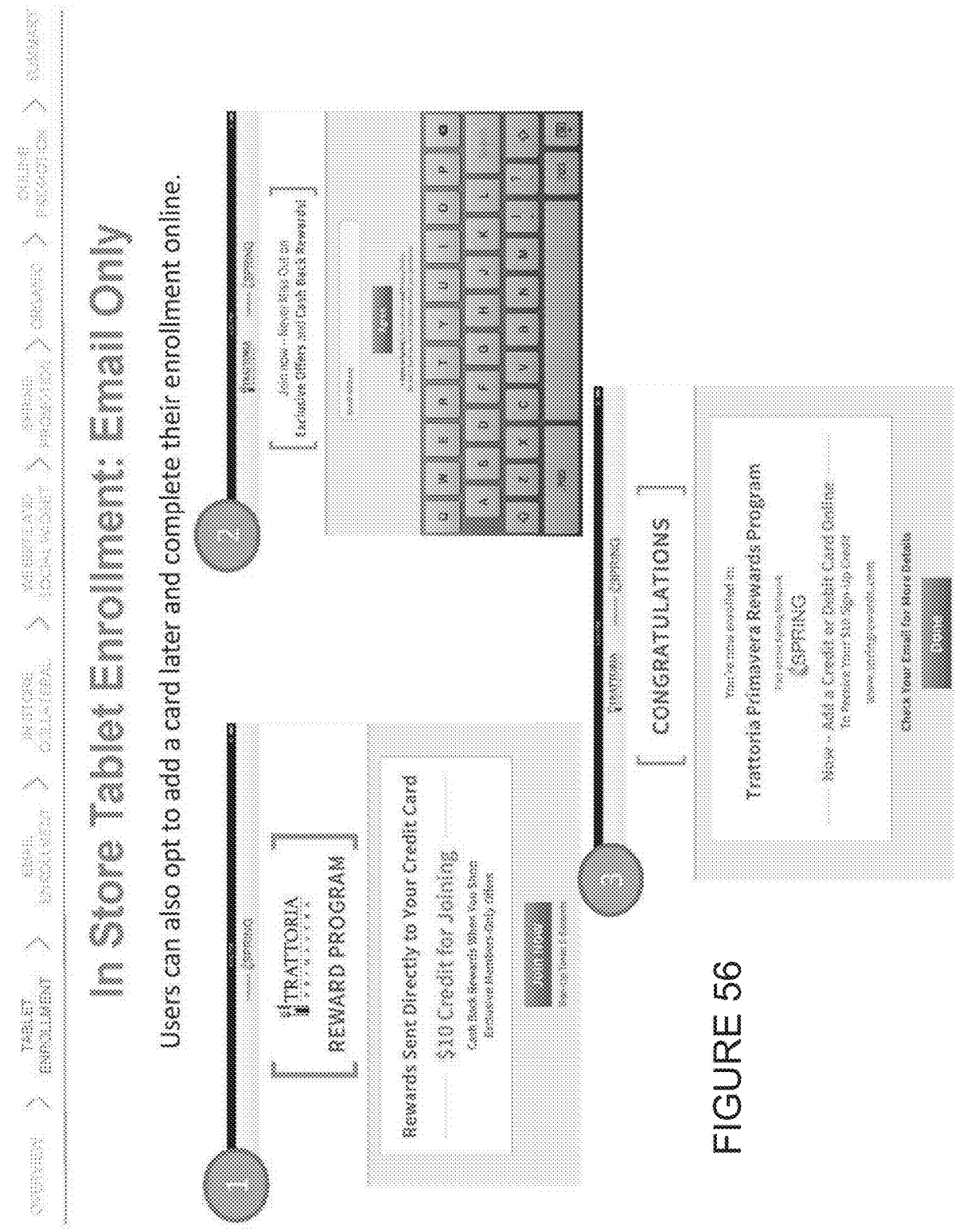
Figure 57:
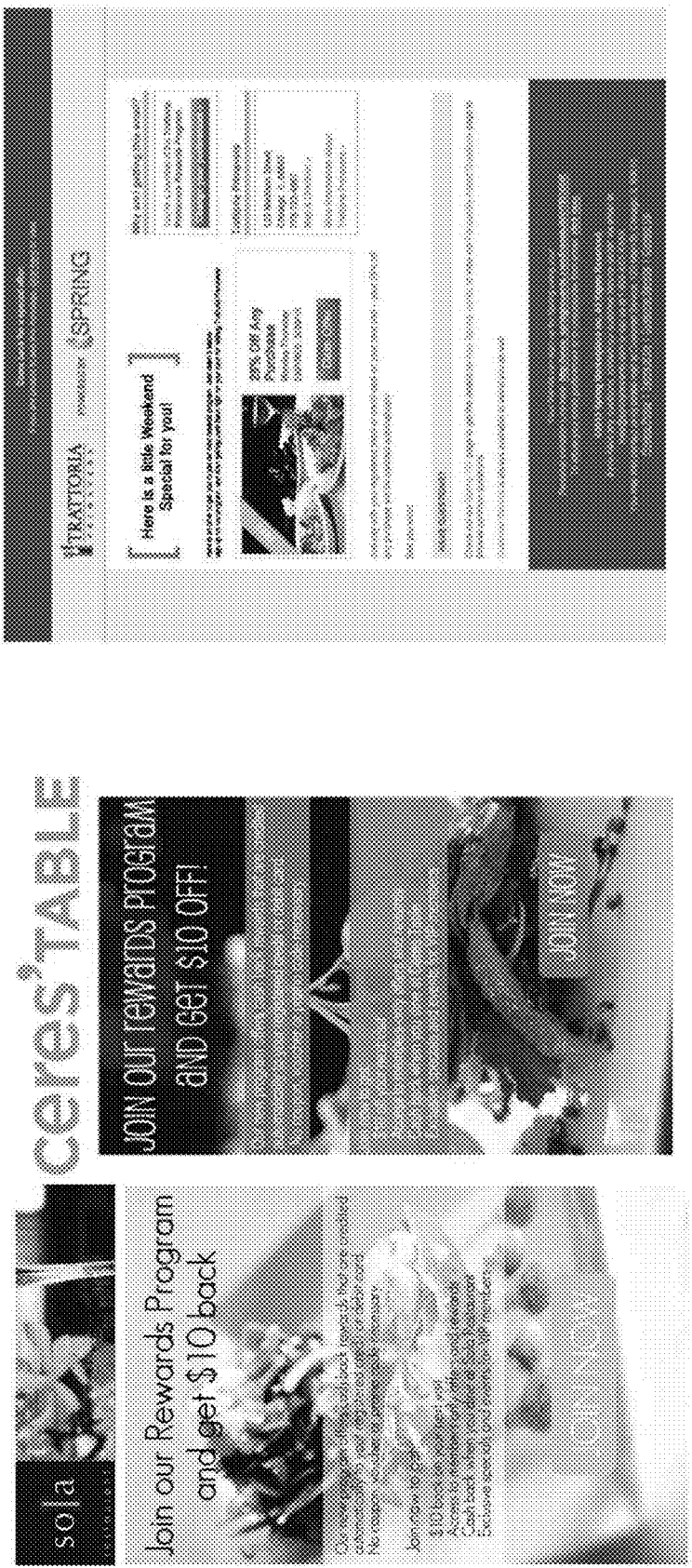
Figure 58:
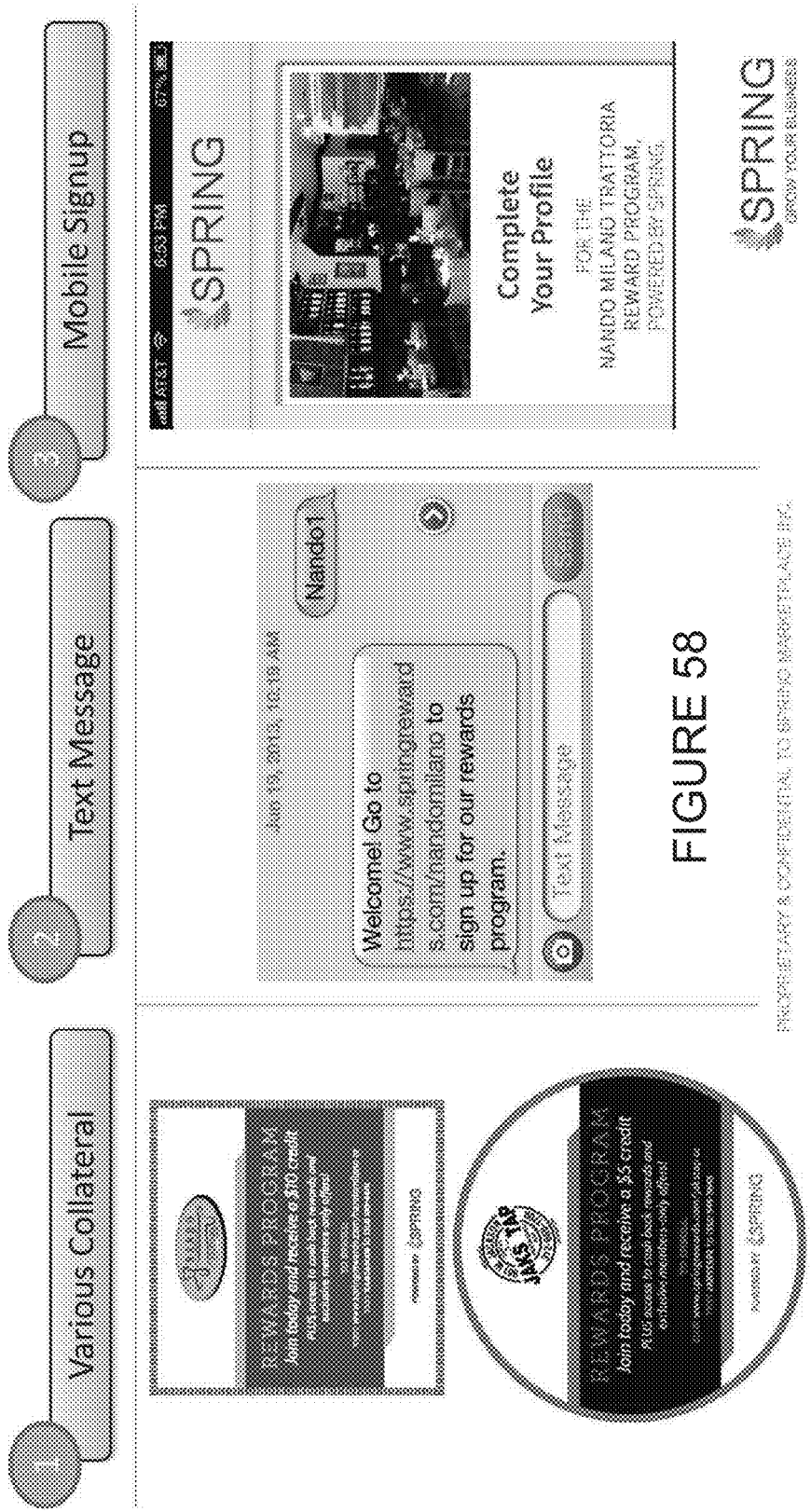
Figure 60:
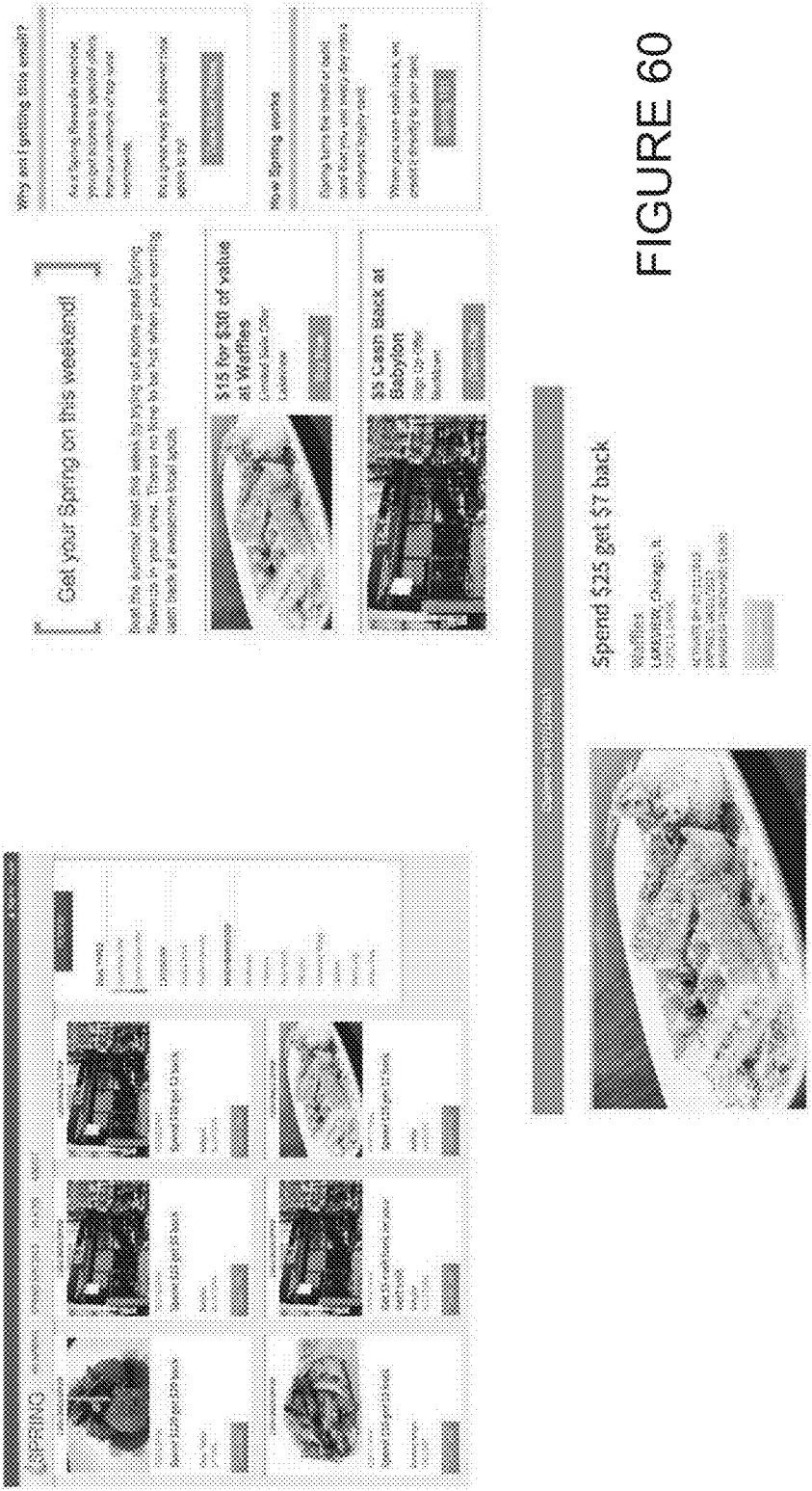
Figure 62:
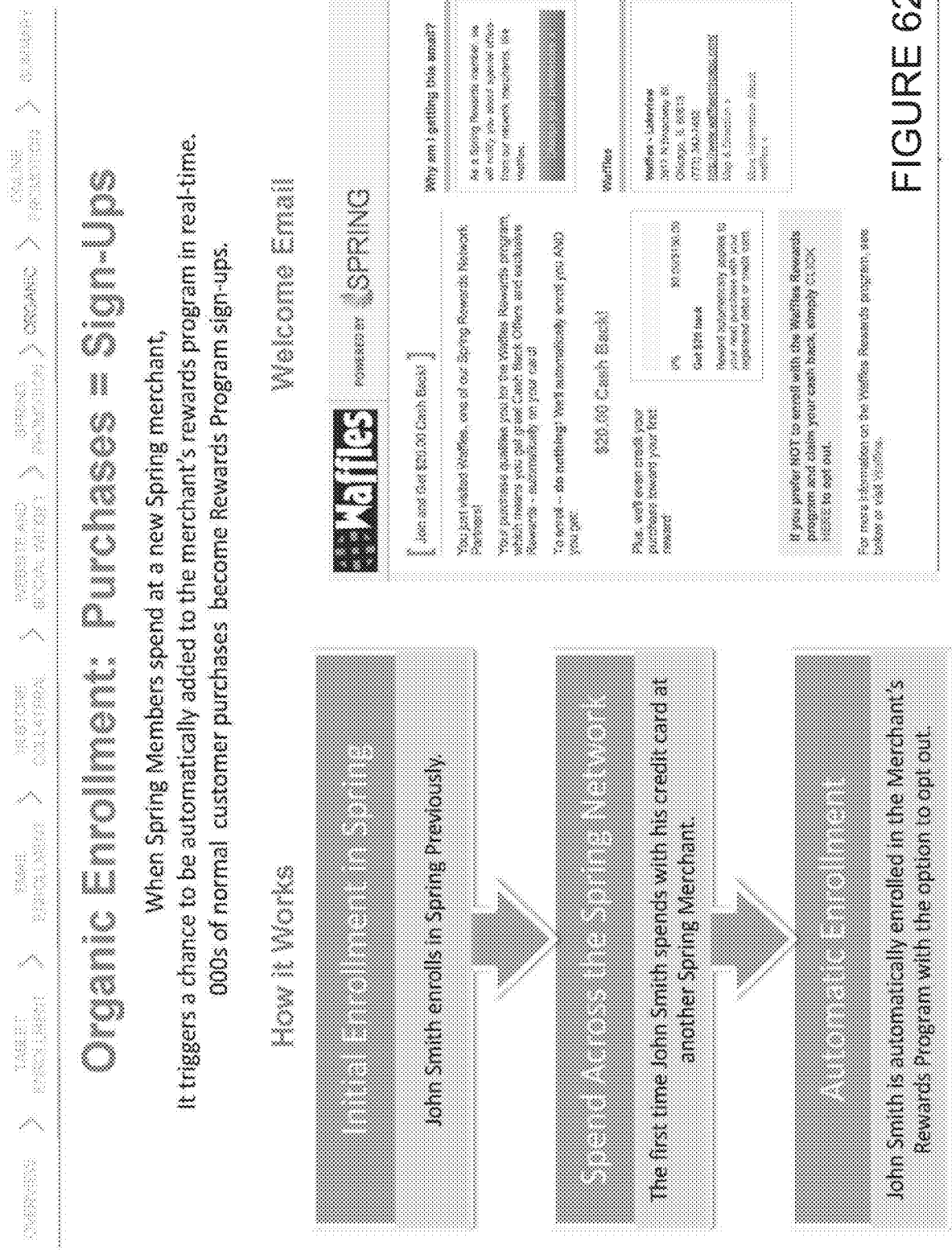
Figure 63:
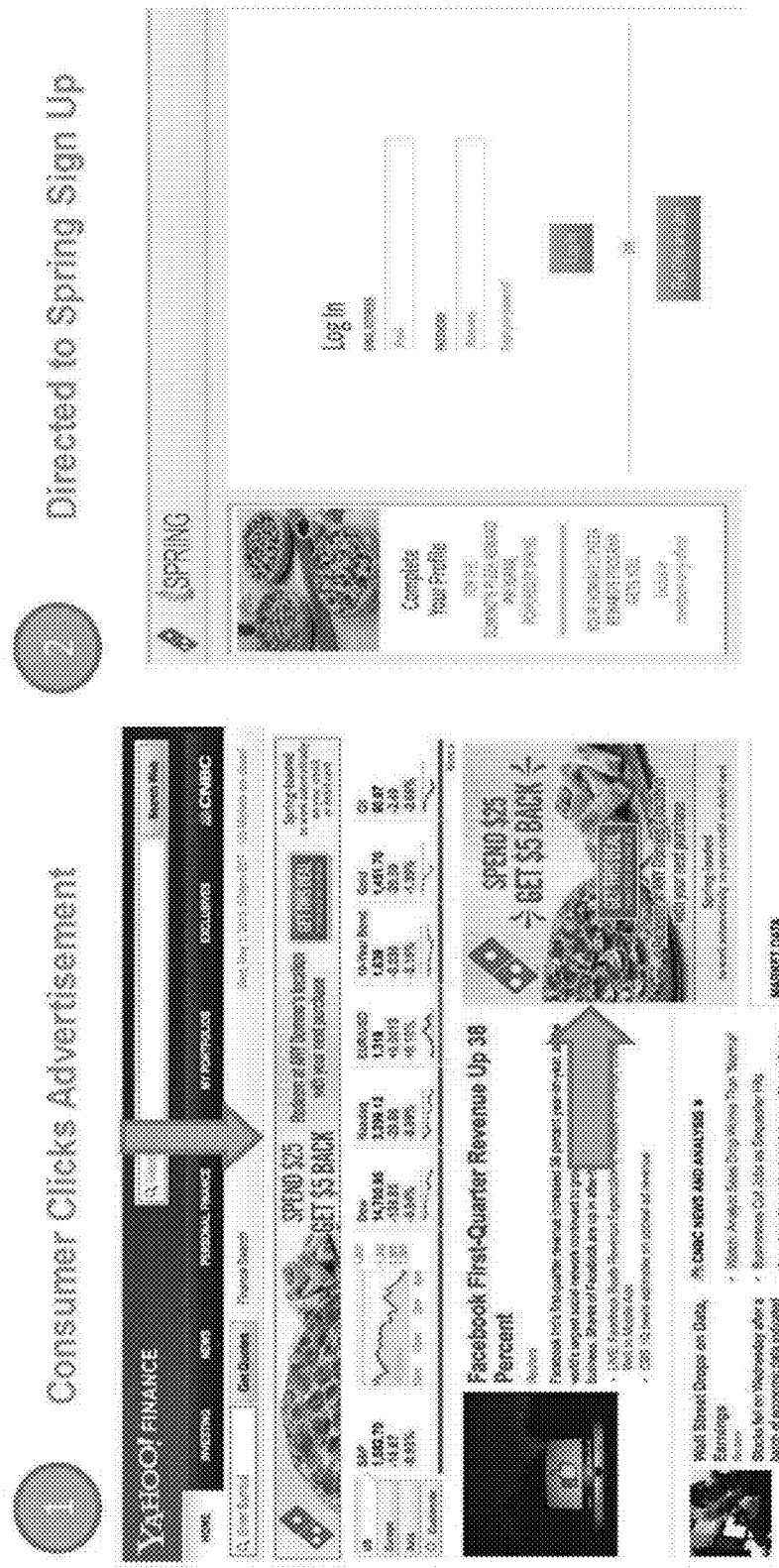
Figure 64:
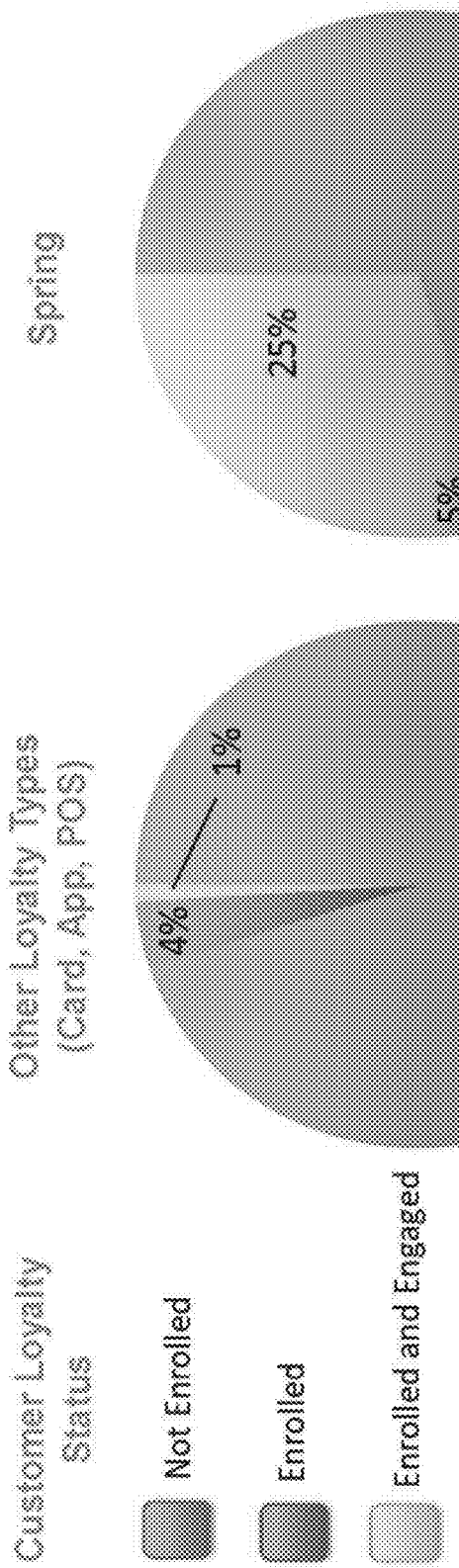
Figure 65:
Figure 66:
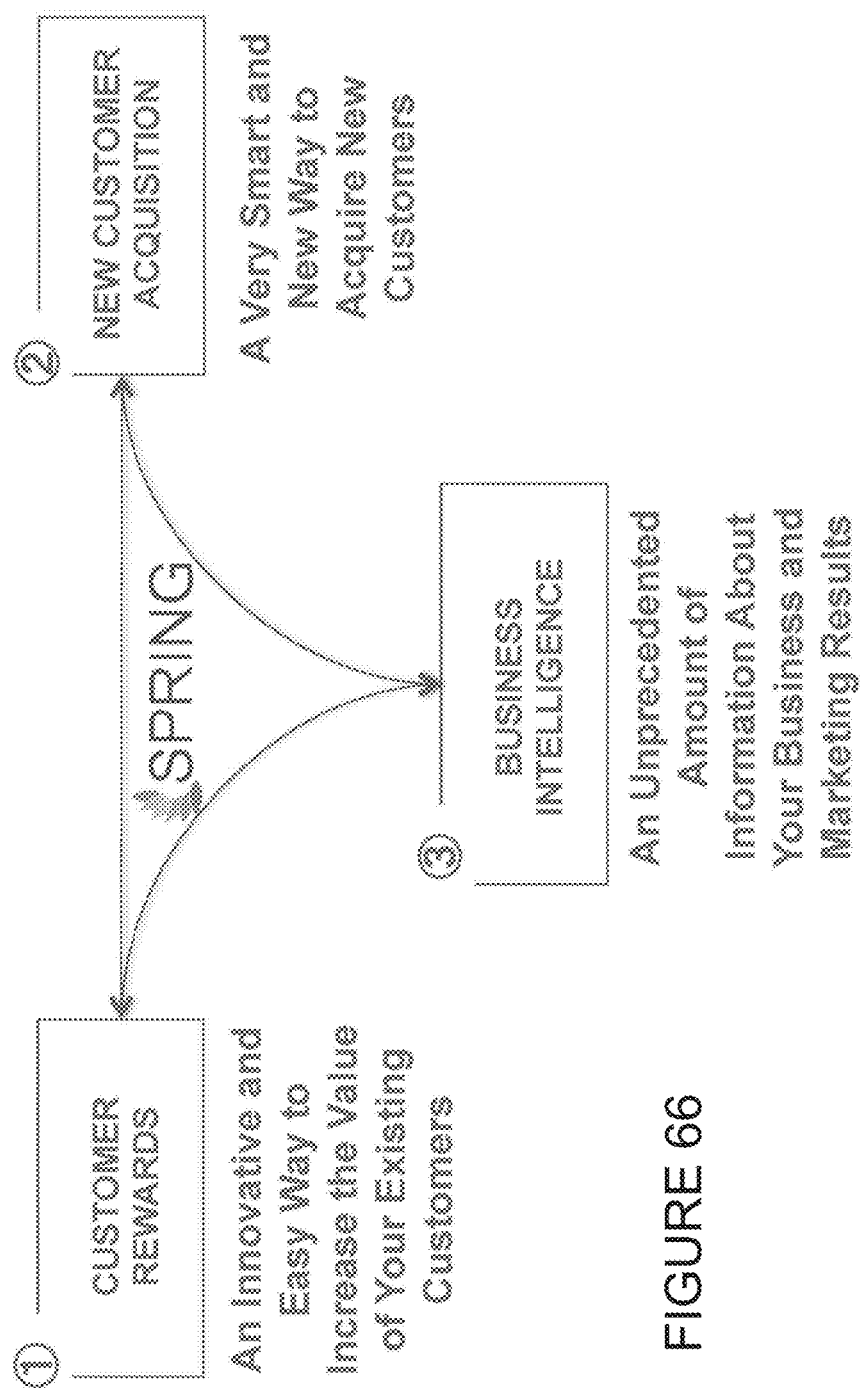
Figure 68:
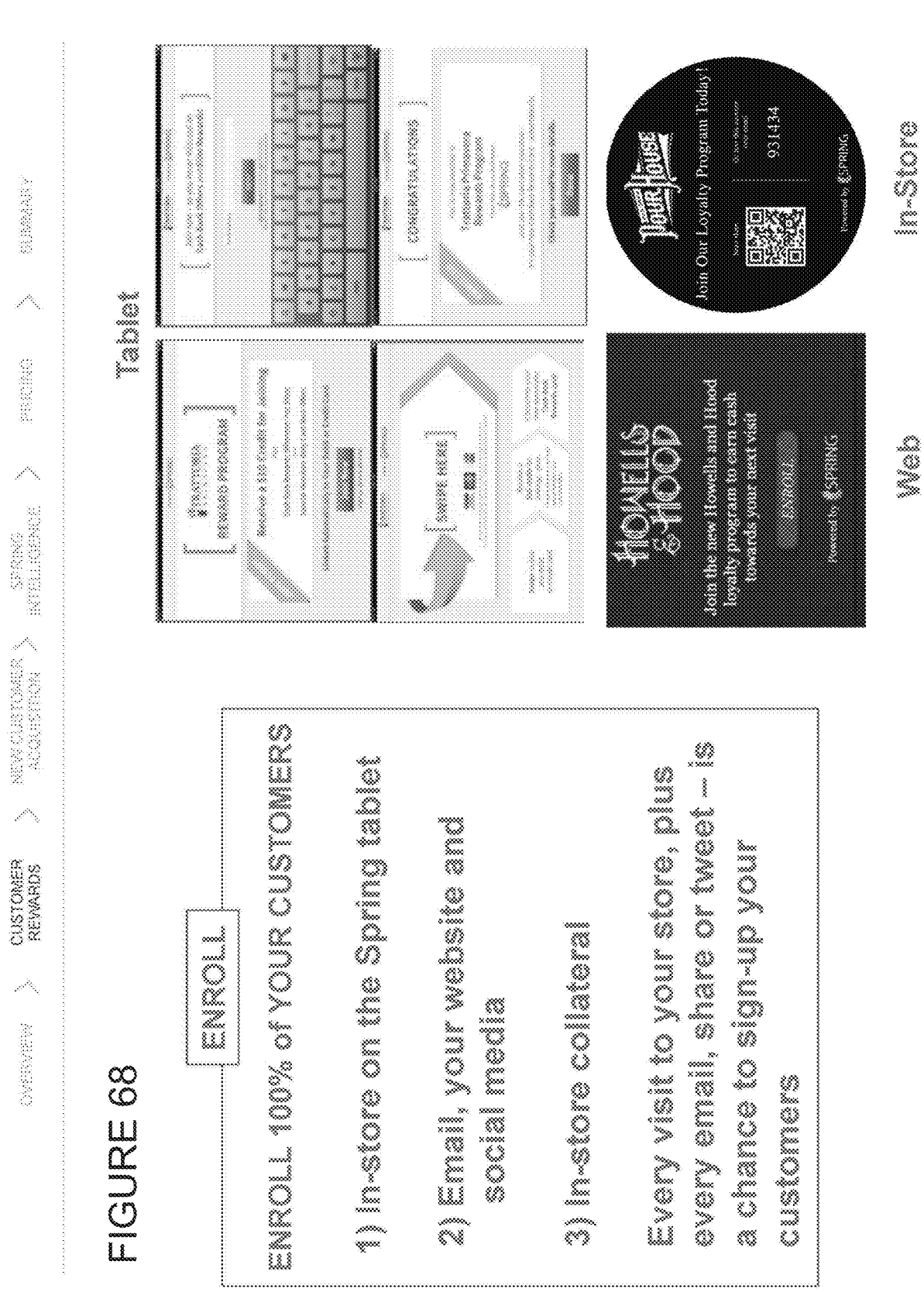
Figure 69:
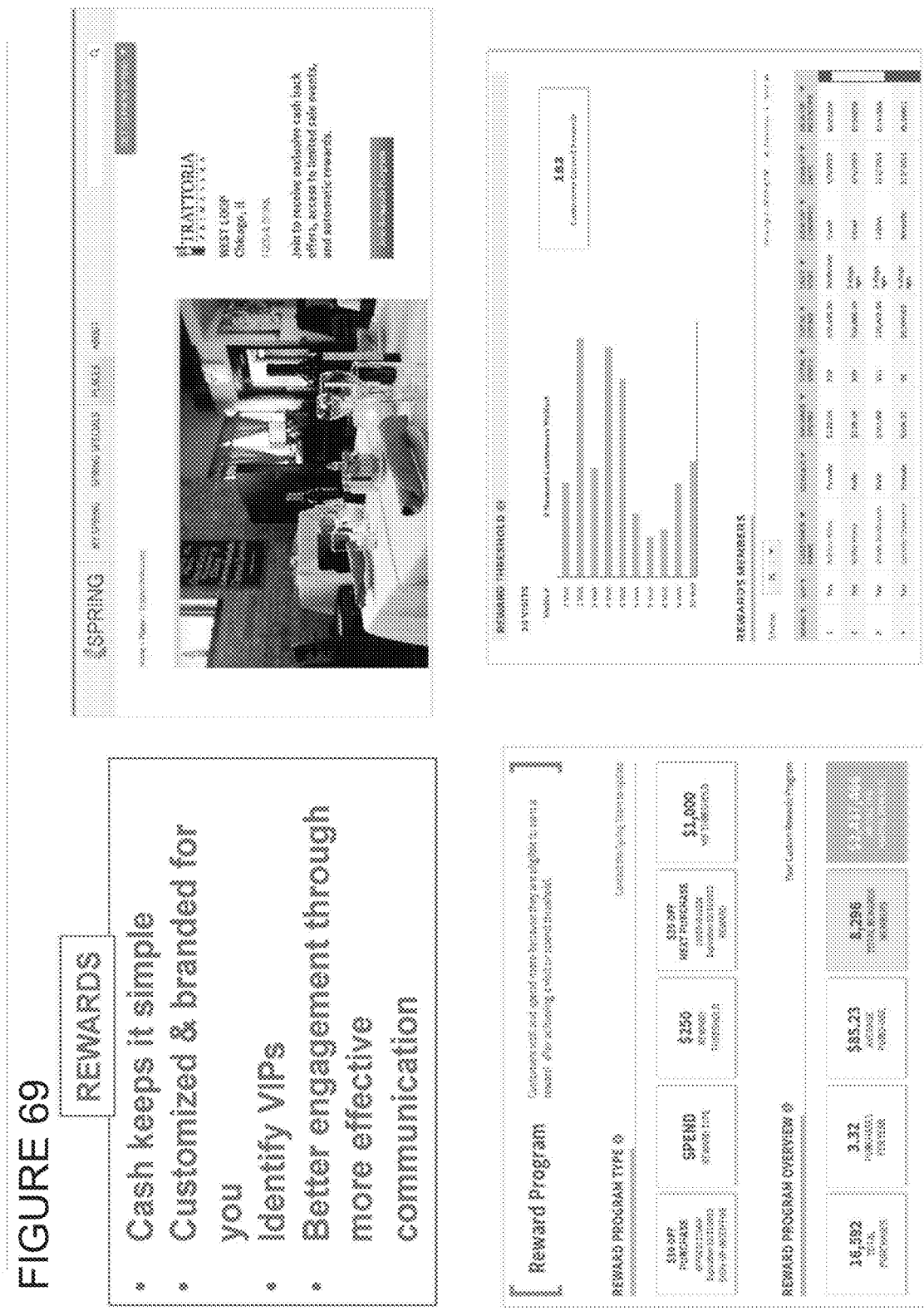
Figure 72:
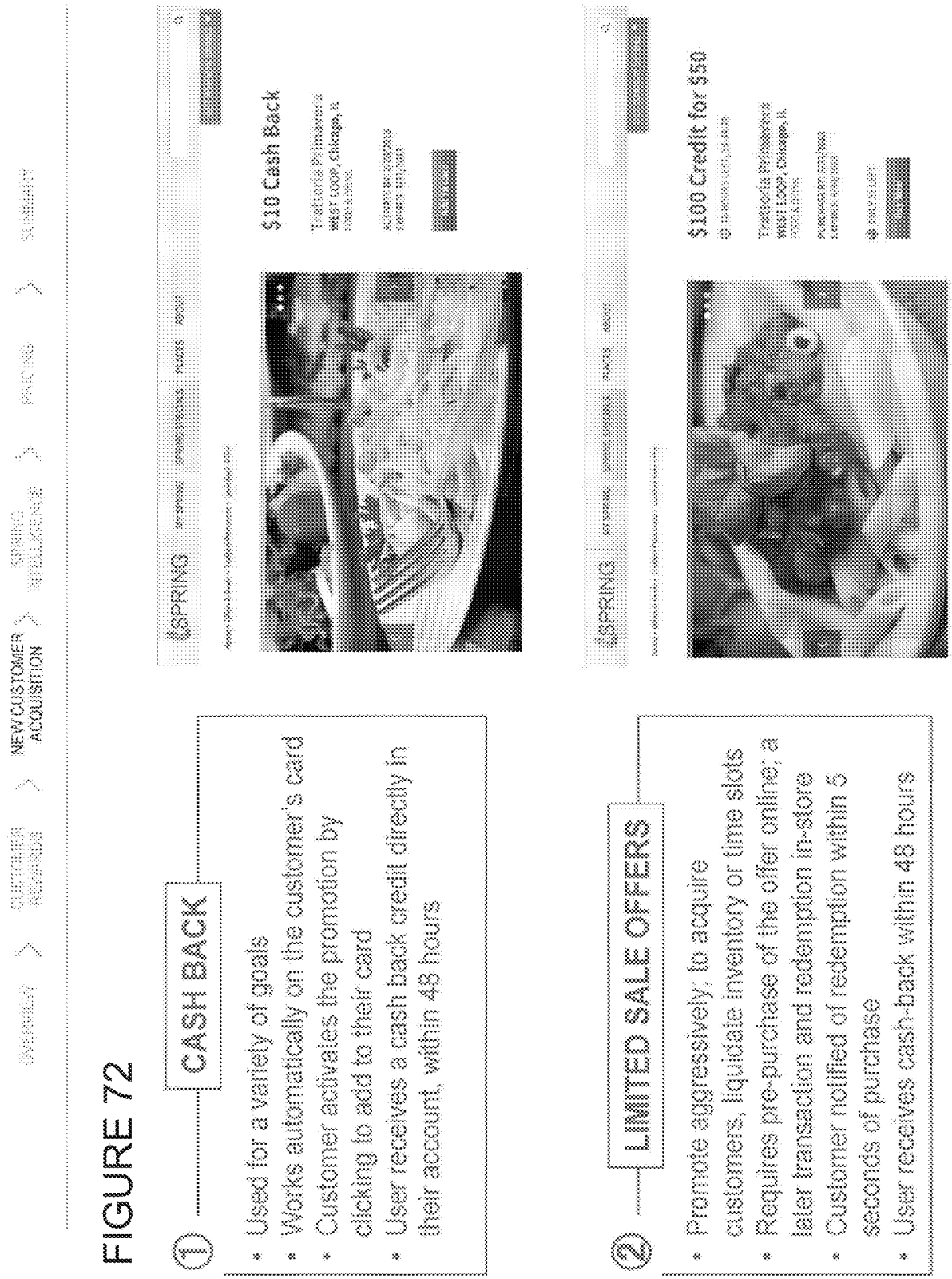
Figure 74:
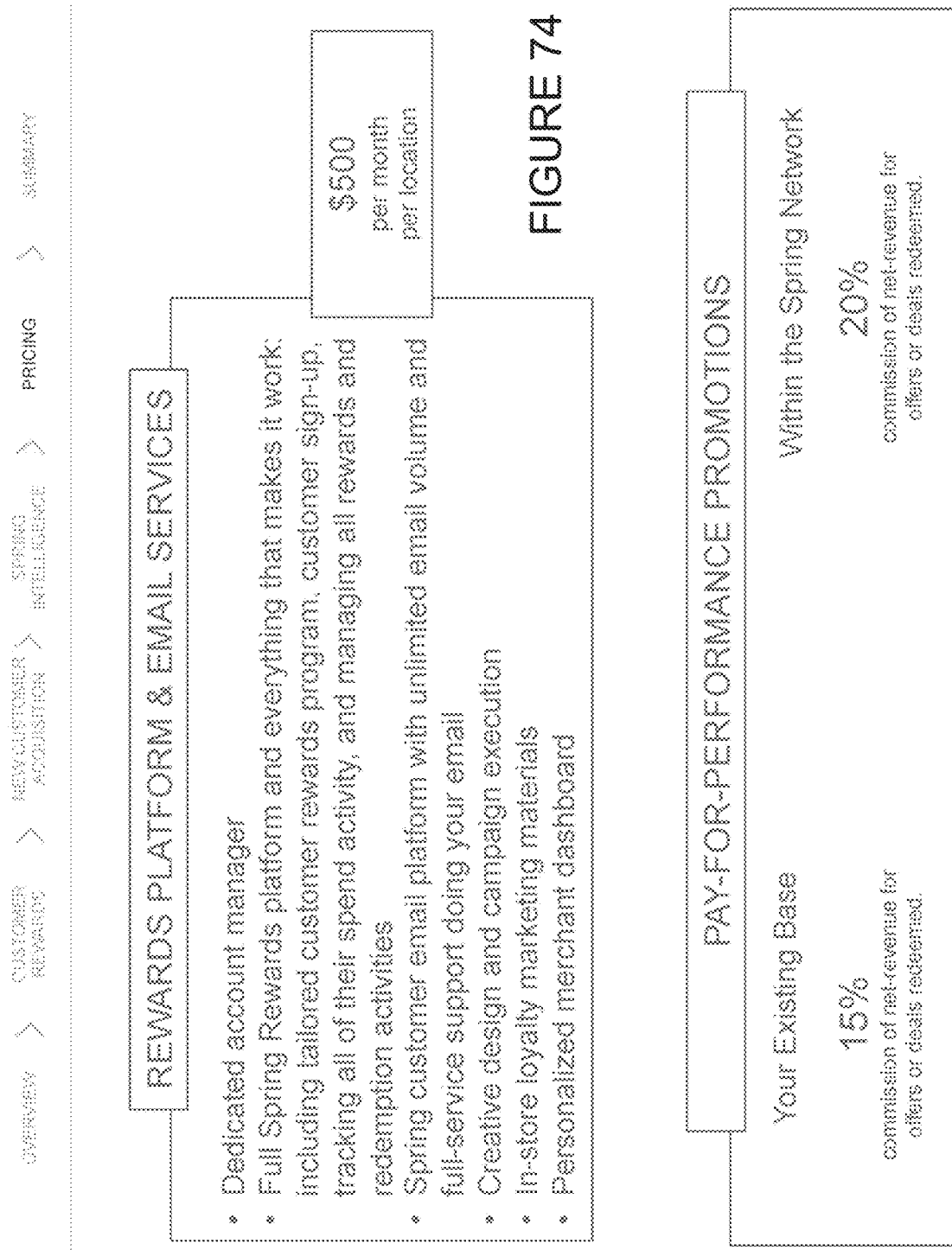
Figure 75:
Figure 76:
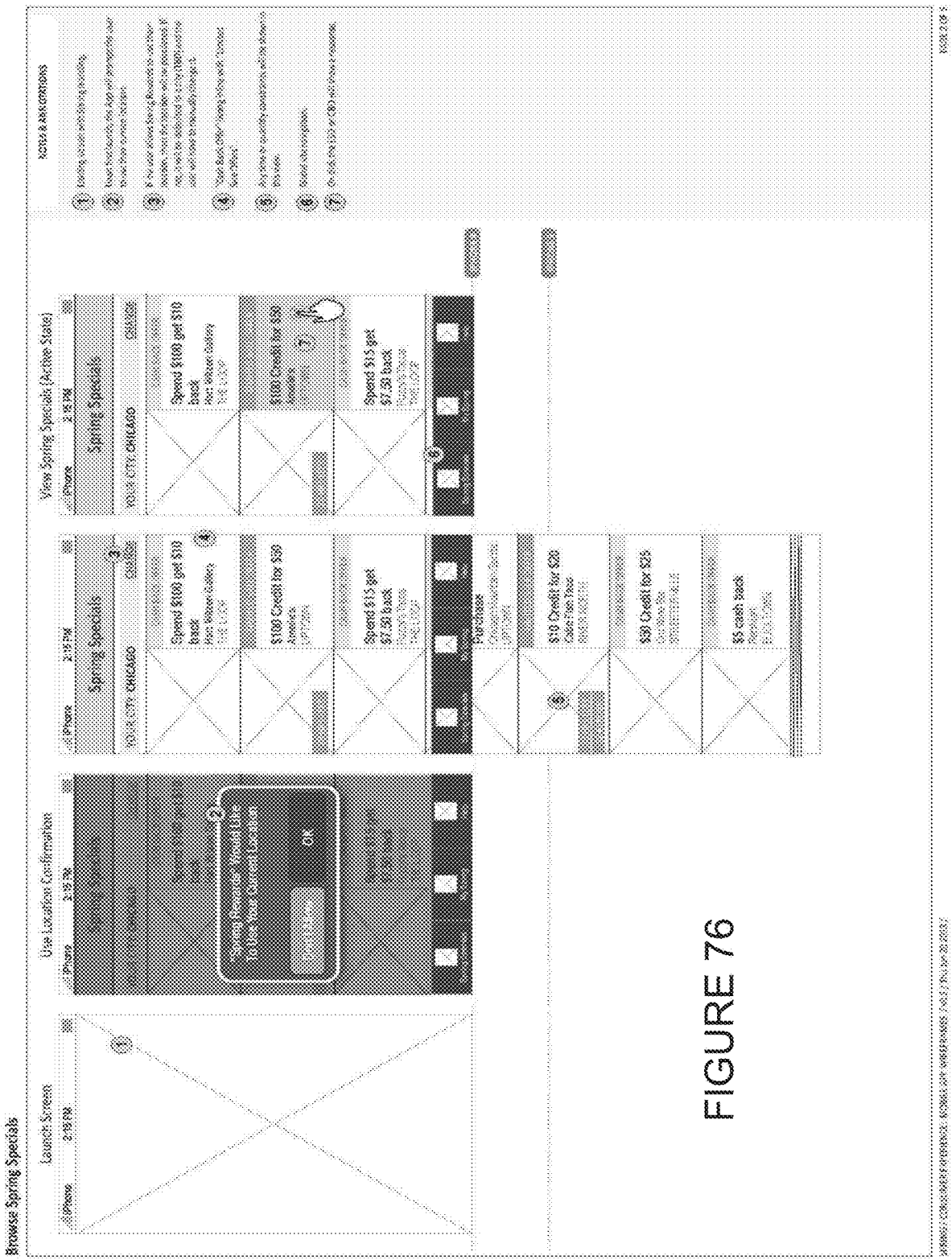
Figure 77:
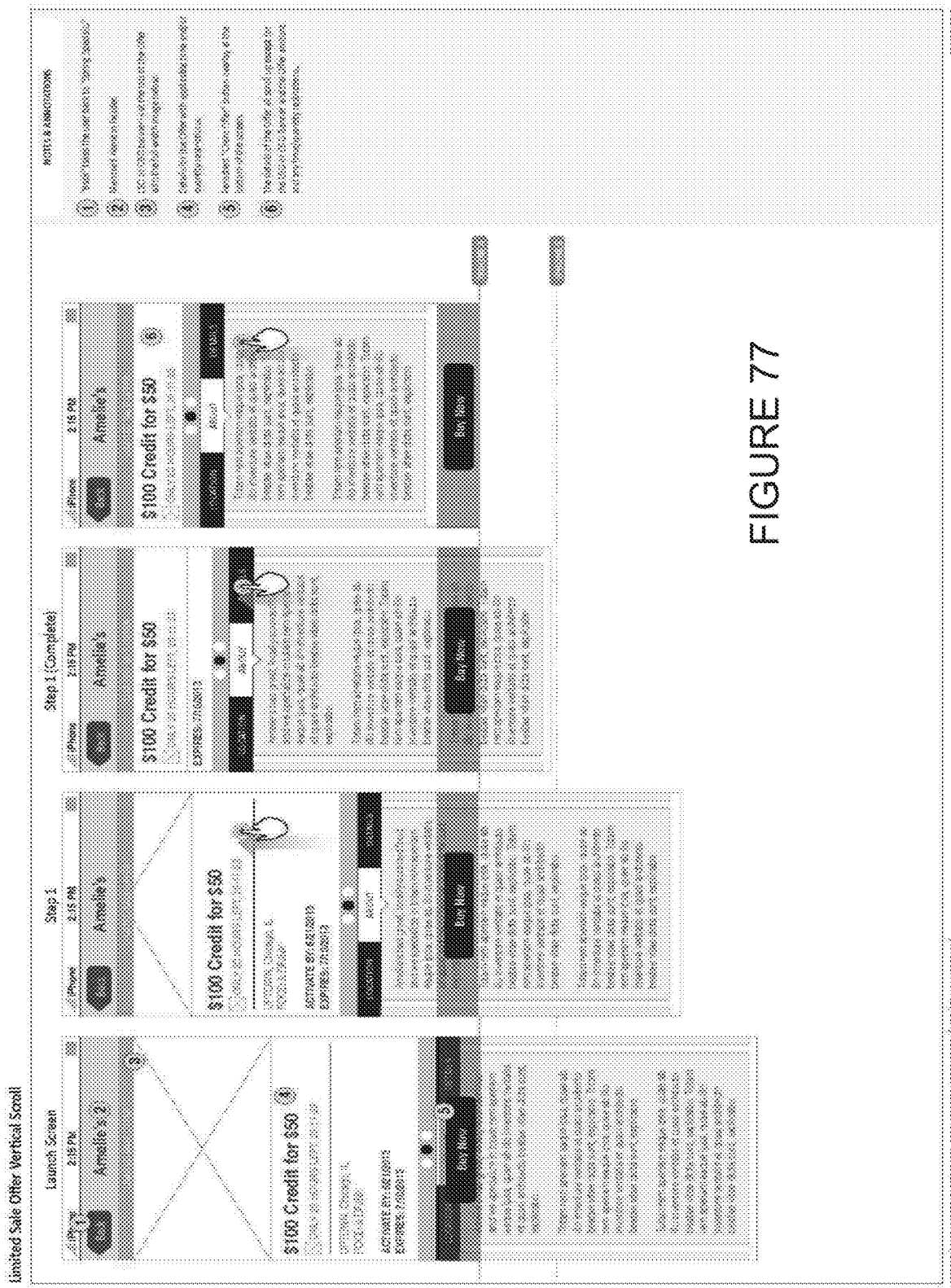
Figure 78:
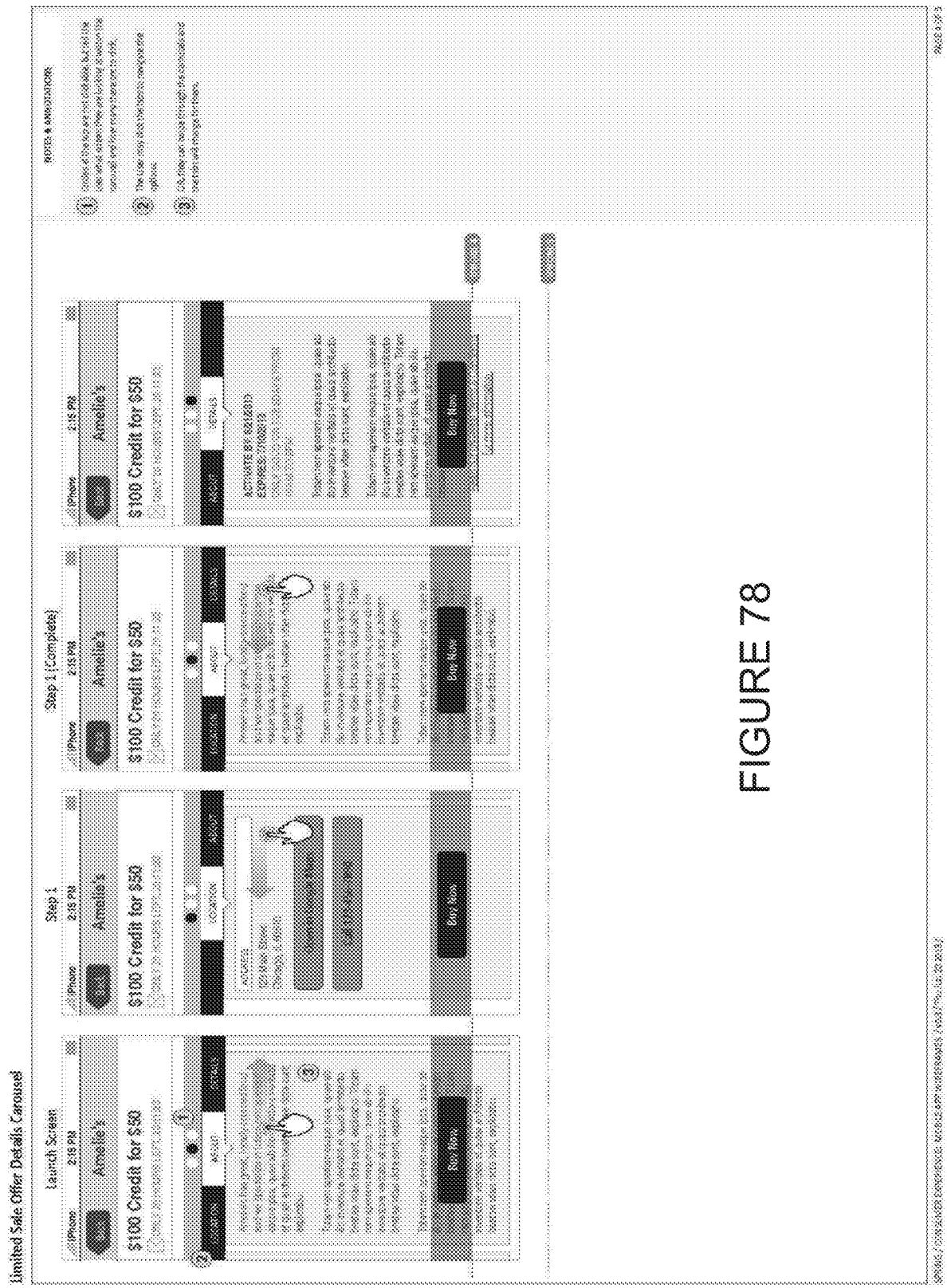
Figure 79:
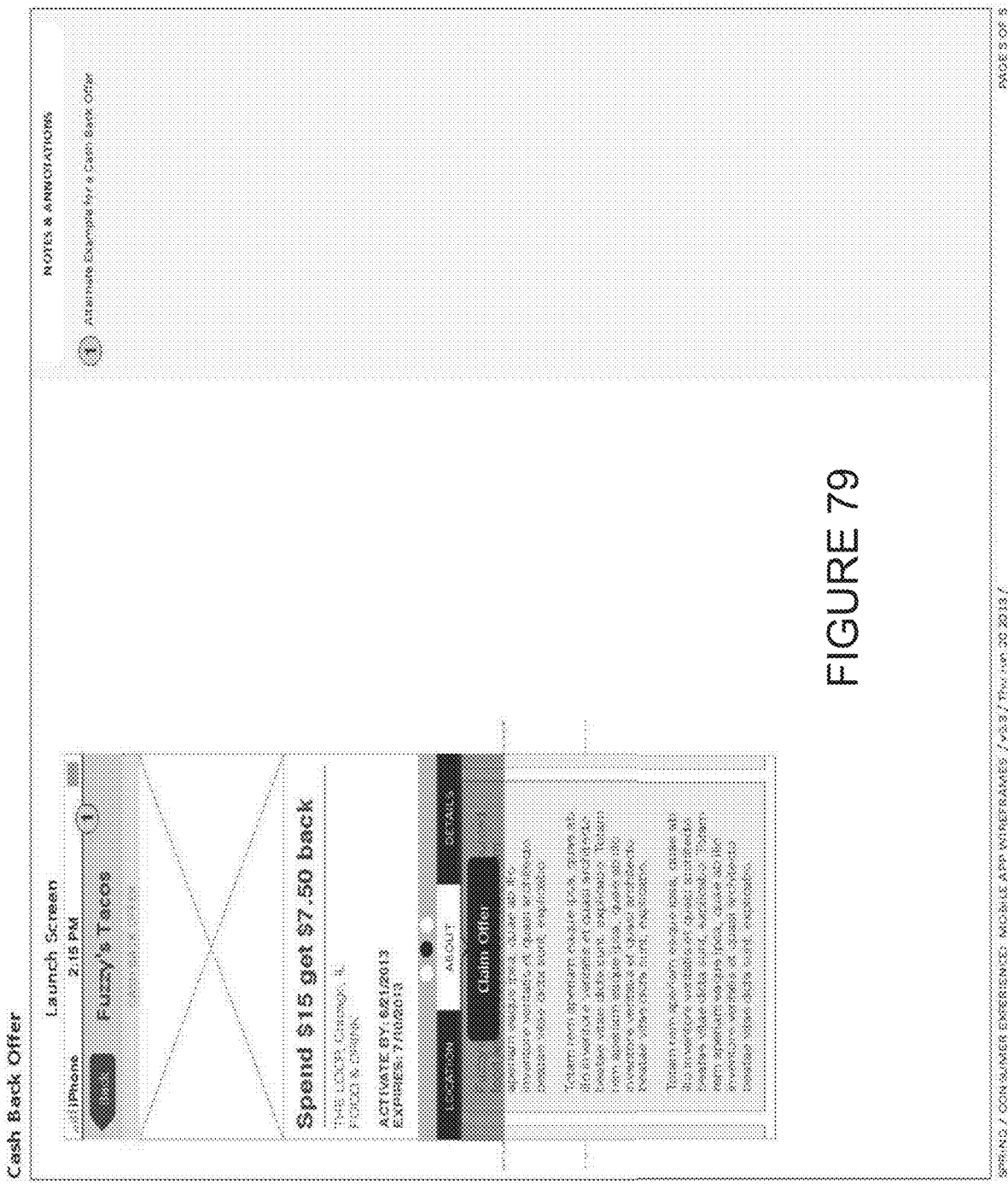
Figure 80:
Figure 81:
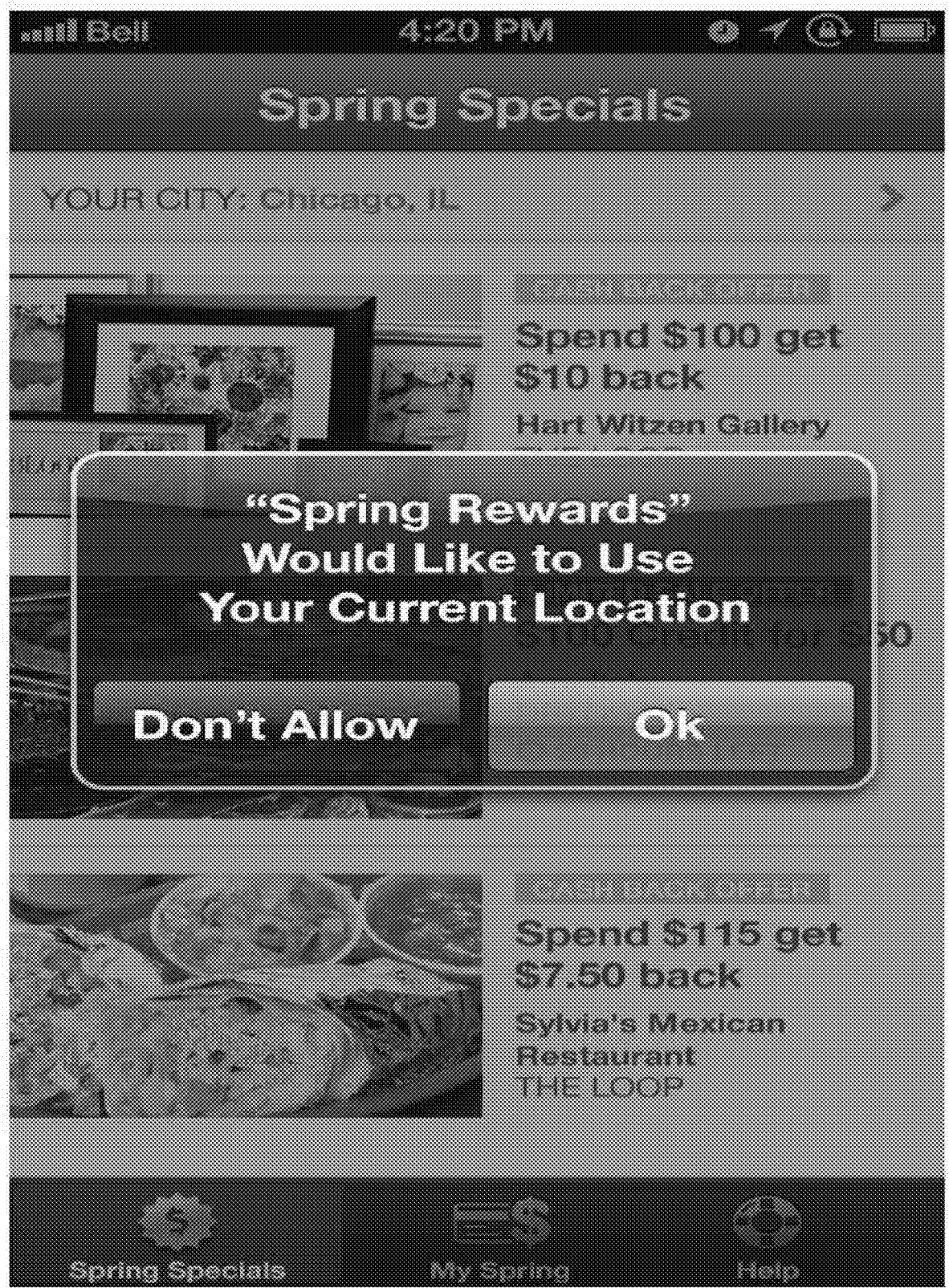
Figure 83:
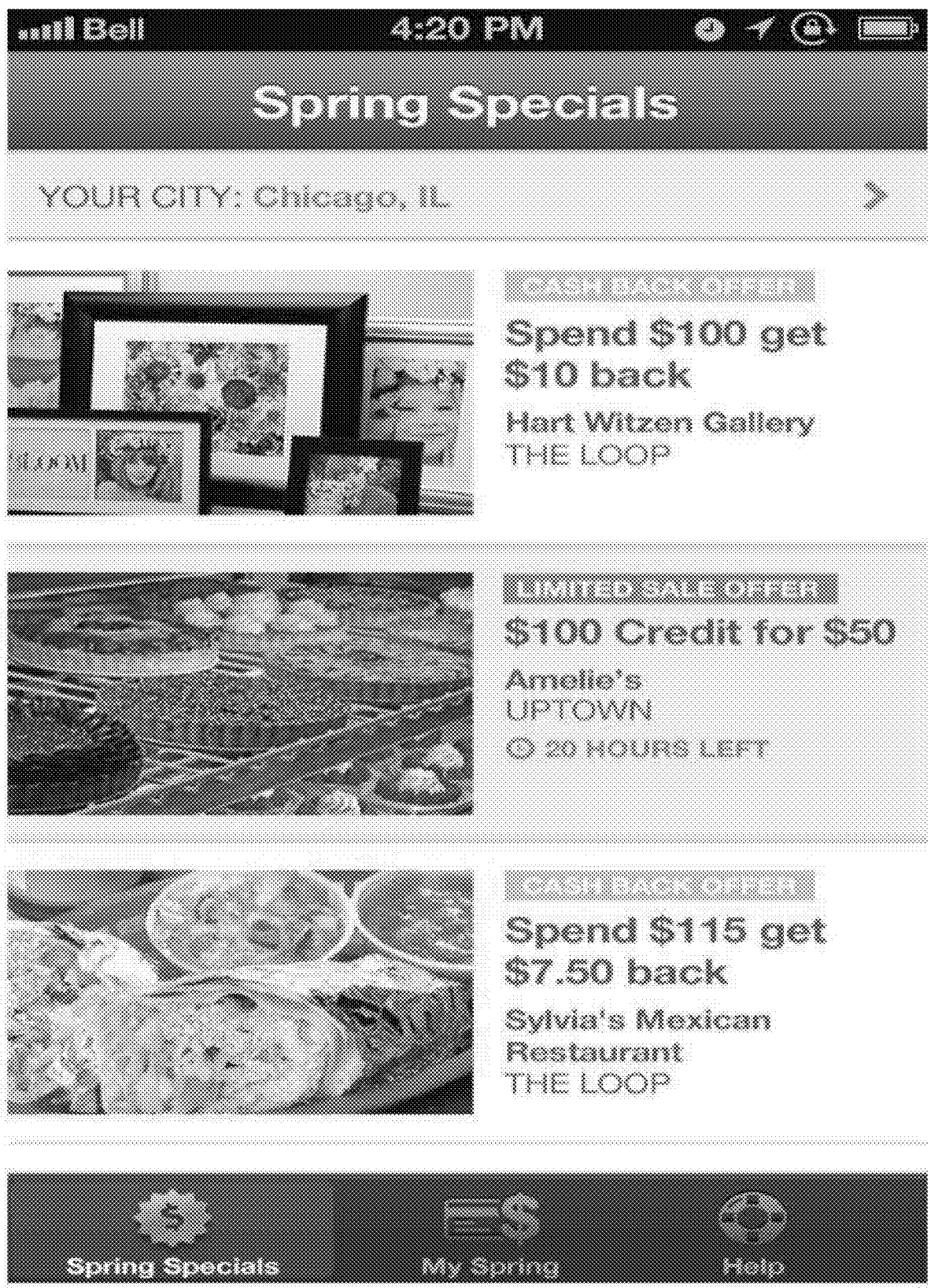
Figure 84:
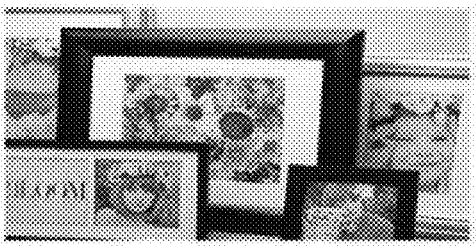

FIGS. 3-84 illustrate graphic user interface (GUI) diagrams of embodiments of the invention (corresponds to GUIs from PPA).

Figure 86:
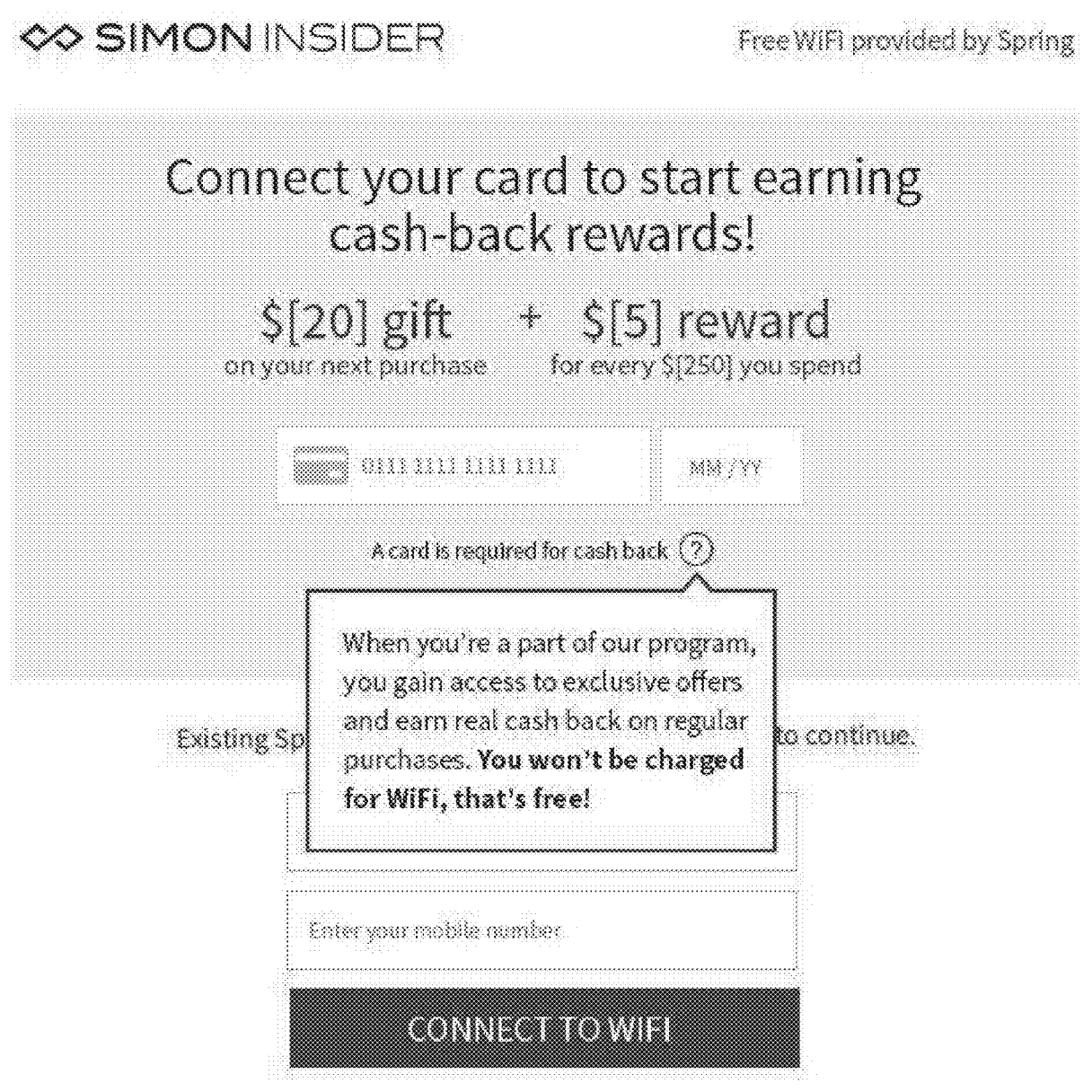

Another embodiment of the present invention includes using a WiFi captive web portal to enroll users in the platform of the present invention. FIG. 85 and FIG. 86 illustrate two embodiments of utilizing a WiFi captive web portal according to the present invention. Upon receiving a request from an electronic user device to access WiFi at a merchant location, a page is displayed on the electronic user device which prompts entry of a credit or debit card number and expiration date. Fields in which to enter an email address and phone number are also preferably displayed on the page. The page also displays fields for an existing user to enter an email address and phone number to login to their account to access WiFi. In one embodiment, registering with the platform or logging into the platform is required to access the WiFi.

The credit or debit card number is preferably encrypted on the electronic user device requesting WiFi access using public and private key pairs. The platform database is operable to unencrypt the credit or debit card number and enroll the associated card in the platform. If enrollment in the platform is accomplished through the WiFi captive portal, the enrollment is confirmed in real-time via email, SMS, MMS, or other messaging. If more information or confirmation of the user's wish to enroll is needed, an email, SMS, MMS, or other messaging is used to prompt for this information or confirmation of the user's wish to enroll. In another embodiment, upon connecting to WiFi through the WiFi portal and not connecting a card or account to the platform, an SMS message, email, MMS, or other message is sent to the connected device or a provided phone or email account 5 minutes after connecting to the WiFi portal or signing up for the platform. Alternatively, the message is sent 10 minutes, 15 minutes, 20 minutes, 25 minutes, 30 minutes, 1 hour, 2 hours, 4 hours, etc. after connecting to the WiFi portal or signing up for the platform.

The WiFi portal preferably includes a field for a user to enter a mobile number to enroll their mobile device. For a user who has already provided a mobile number and wants to reconnect to the WiFi, a cookie shows that the mobile number has been entered and prevents the mobile number field from being displayed on the WiFi portal or shows the mobile number field filled in with the mobile number that has been entered. If a cookie shows that a mobile number was once entered but is no longer on the back end of the platform, the mobile number field is displayed on the portal.

Third Party Partner Integration Scenarios

Third Party Partners are partner merchants, groups of merchants, malls, or any other party who provides for customer accounts, including cards, which may be part of an existing reward or offers program at that merchant, to be enrolled into the platform of the present invention. Preferably, the members or customers are able to enroll/unenroll accounts independently from any activities that occur on the platform. Advantageously, the present invention provides for Third Party Partner members to receive cash back directly to their enrolled accounts. Preferably, Third Party Partner members can convert reward "points" (or any other equivalent) balances to cash through the platform. Additionally, through the platform, Third Party Partner members can incentivize specific member actions (repeat visits, predetermined spend activities, i.e., where a certain product, good, service, time of day, day, spend level, purchase at a location, online purchase, and/or frequency of purchase through cash back. Third Party Partner members may be only Third Party Partner members and not be members of the platform of the present invention. Third Party Partner members may also be members of the platform of the present invention and also independently be Third Party Partner members. Challenge in integrating these "dual" members in the prior art include the fact that these dual members may add or remove cards from either program at any time, may associate cards with different email addresses in either program, and the passwords they use to protect their accounts may be different. These dual members may also receive email communications and text messages to members as they enroll themselves, their cards, claim offers and transact from either the platform of the present invention or from the Third Party program. The Third Party program and the platform of the present invention may include different web and mobile interfaces and links to these different web and mobile interfaces created using different programming.

Advantageously, the present invention provides for restricting enrollment in one mall or shopping center group if a user is enrolled in another mall or shopping center group. Preferably, upon a user who is enrolled in one mall or shopping center group attempting to enroll in the second mall or shopping center group via a transaction at a POS, electronically via email or an ad, via an app, or via any of the other enrollment mechanisms described above, the enrollment in the second mall or shopping center group is denied.

The present invention overcomes the challenges associated with integrating the functionality of the platform with the Third Party program. Particularly, the present invention provides for Third Party Partner Members to receive cash back on an enrolled card to enable the Third Party Partner to incentivize certain behaviors independent of a full offer experience. This includes, but is not limited to, allowing Third Party Partner members to convert point balances or any other type of reward balances to cash back or to award cash back for various user actions, such as repeat visit incentives. In one embodiment, this is accomplished by providing a secure Application Program Interface (API) to allow the Third Party Partner app or website to request a specific cash back amount to be placed on the account.

Authentication of API calls (examples of API calls include specific operations that client applications can invoke at runtime to perform specific tasks) are preferably performed over Hypertext Transfer Protocol Secure (HTTPS). To avoid PCI exposure for the Third Party Partner, API calls preferably originate in the client application. This is advantageous because it avoids the Third Party Partner's backend entirely, ensuring that the Partner is never directly in possession of credit card data. JSON Web Tokens are preferably used to authenticate all API calls, with each client application having a JSON Web Token (JWT) from the Partner backend before calling the Partner Notification API. Notably, JWTs expire, and the client application must request a new JWT from the partner backend upon expiration of a JWT. The client application passes the JWT in a custom HTTP header, preferably named X-JSON-Web-Token. Preferably, the JWT is encoded per the standard. The JAVASCRIPT Object Signing and Encryption (JOSE) header preferably specifies a RS256 algorithm. The Partner signs all JWTs with a private key, preferably with a minimum of 2048 bit length. The Partner shares the private key with the platform to verify the signature. In one embodiment, the JWT payload includes the following Claim Names: (1) the issuer is set to the partner_uuid supplied by the platform, (2) the subject is set to the consumer id generated and maintained by the Partner, (3) the Issued At is set to the date that the token is generated, and (4) the expiration date is set to a future date.

All API calls are scoped by the authentication token. For security, the API will respond with a 401 Unauthorized message if any of the following are untrue: the algorithm specified is not RS256, the signature could not be verified, the issuer is not recognized, the issuer in the JWT does not match the partner_uuid in the API request, the subject in the JWT does not match the consumer_id in the API request, the issued at is more than 1 minute in the future, the expiration is in more than 1 minute in the past, the expiration is before the issued date, and/or the expiration is more than a set number of hours/minutes ahead of the issued date.

The Partner resource is preferably immutable and created by the platform. The partner_uuid of the Partner resource is shared with the Partner and is used in API calls to address the Partner's resources. The Partner shares the public key with the platform that is used to verify the JWT authentication tokens. A public/private key pair is used to encrypt card information.

Request JSON and Response JSON code is used to get a consumer resource, create or update a consumer resource, and/or delete a consumer resource in a consumer API. Request JSON and Response JSON code is used to get card resources, create card resources, and/or delete card resources in a card API. Request JSON and Response JSON code is used to get membership resources and/or update/create membership resources in a membership API. Preferably, a card token uniquely identifies a card or account in this system using between 5-9 digits and/or alpha numeric characters, more preferably 7 digits.

PAN encryption is generated by encrypting plaintext PAN using the platform's RSA public key. In one embodiment, the algorithm for accomplishing this is (1) encrypt the pan using the public key and PKCS1_OAEP_PADDING and (2) encode the resulting encrypted pan using the URL safe base64 encoding algorithm. An example implementation of the algorithm is written in an object-oriented language (e.g., RUBY).

Rewards

Cash back rewards are discrete cash back amounts, good anywhere. Preferably, the cash back rewards are credited directly to an account or card. Mall cash rewards are discrete cash back amounts, good anywhere in a mall, shopping center, or other connected group of stores, preferably stores connected by location. In one embodiment, mall cash rewards are accumulated and the earner must decide where to use it before redeeming. This advantageously shifts the cost of the mall cash to mall or shopping center tenants. Mall incentives and offers function similarly to mall cash rewards by providing incentives or offers linked to an account or card that are useable across stores in a mall or shopping center.

Earning "actions" for rewards include a repeat visit incentive (automatically activating a reward in a supported currency after a user spends to a configurable targeted amount), a sign up incentive configurable by signup channel, and an invite a friend referral. Notably, sign up incentives are configurable based on the channel used to sign up for the platform, including but not limited to, web, mobile, tablet, wi-fi captive portal, and referral by existing user. Rewards for inviting a friend reward the user who referred the friend to the platform. In one embodiment, friend referrals are performed through a social network such as Facebook, Twitter, Linkedin, etc. Notably, referrals through a social network utilize unique capabilities of social networking in the referral and/or signup process, including but not limited to "liking" a page, sending/accepting a friend request, having the platform suggested to a user of the social network based on one or more friends liking the platform, hashtags, etc.

Incentives or offers sent via SMS/MMS, email, text, mobile apps, or any other digital methods preferably provide for users to claim/activate these incentives or offers by clicking on text or an email. This advantageously provides a technology based solution to the prior art by providing no login friction to claim the incentive or offer when a card or account is enrolled with the platform. "Merchant welcome" offers or incentives are also provided under the present invention, wherein an enrolled or un-enrolled user on a mobile device receives an offer or incentive based on the user's proximity to or presence in a merchant location. Preferably, the location is determined via WiFi, but is also determined via GPS in another embodiment. Merchant welcome offers are merchant specific or alternatively apply to an entire mall or shopping center in another embodiment. Additionally, a merchant welcome offer or any other merchant incentive or offer is operable to be sent via email with a corresponding SMS, MMS, mobile app, or any other type of electronic message notifying the platform user to check their email for offers. Offers are single offers or catalogs of offers (preferably up to 6 in one communication).

Enterprise Application

Another embodiment of the present invention is directed to an enterprise application which is operable to be included on a third-party website via inclusion of a reference to object oriented code, (e.g., JAVASCRIPT). Significantly, the object oriented code causes the enterprise application to adopt the look and feel of the hosting site such that the consumer would reasonably believe that the enterprise application is native to the hosting site. In other words, the object oriented code causes the enterprise application to adapt a plurality of visually perceptible elements visually corresponding to the third-party website. Notably, this solution is necessarily rooted in computer technology in order to overcome a problem specifically arising in the realm of computer networks. There is no pre-Internet or pre-computing technology analogous to causing an application to adopt the look and feel of a hosting site such that a consumer would reasonably believe that the enterprise application is native to the hosting site. Importantly, this is an advancement over prior art methods such as iFrame because the application "inherits" styling from the webpage. This reference enables management of a card linked offer reward program directly via the third-party site. Additionally, the enterprise application (via the reference to the object oriented code) provides for enrollment in a specific merchant's rewards program in the platform, see available offers, control a profile and account features including offers added and earned rewards ready for redemption, view rewards progress, view transaction history including all rewards progress transactions and any credits or offers that have been earned or claimed, maintain profile data, as well as consumer and card enrollment into the platform, claim offers, add or delete debit or credit cards, login/logout of the platform account, etc.

In one embodiment, the object oriented code causes the enterprise application to have the look and feel of the third party website via (a) a computer store containing data, for the third party website, defining a plurality of visually perceptible elements, which visually perceptible elements correspond to the third party website, (b) a computer server at an outsource provider, the computer server coupled to the computer store and programmed to: (i) receive from the web browser of a computer user a signal indicating presence of the enterprise application on the third party website; (ii) automatically identify as the source page the third party website on which the enterprise application has been activated; (iii) in response to identification of the source page, automatically retrieve the stored data corresponding to the source page; and (iv) using the data retrieved, automatically generate and transmit to the web browser a second web page that displays: (A) information associated with the platform and (B) the plurality of visually perceptible elements visually corresponding to the source page.

Preferably, the containing webpage and any landing webpages that link to the containing page utilize HTTPS protocol for reaching the object oriented code. The platform sends a subdomain to the owner of the third-party website to be used on the website. The subdomain value is preferably embedded in the script on the third-party website where the enterprise application is to be displayed.

In contrast to the prior art, which requires complex code, the present invention provides for only the subdomain value to be utilized on the third-party site to provide the enterprise application with the same look and feel as the third-party site. By way of example and not limitation, an example of the embedded subdomain is as follows, wherein SUBDOMAIN is the subdomain value sent by the platform:

```
<!DOCTYPE html>
<html>
<head>
<meta>
<title>Our Rewards Program</title>
<link rel="stylesheet" type="text/css" href="yourcssfile.css">
...
<script type="text/javascript" src="yourscripts.js"></script>
</head>
<body>
<h1>Our Rewards Program</h1>
<script src="https:// SUBDOMAIN .springmarketplace.com/loadSpring.js" type="text/javascript"></script>
</body>
</html>
```

Notably, the subdomain value can also be added to the <head> portion of the code or at the very end of the file by adding a DIV to the page <div id="app_container"></div>.

The enterprise app script adds a few items to the hosting webpage, including by way of example and not limitation, a CSS file and a few object oriented code files as well as a container for the content (with an ID of "app container"). The applications CSS file is preferably appended to the very top of the <head> tag, so that the containing pages' CSS can override any styles they want to. Almost all of the application's CSS is prefixed with #app_container, so that any styles are confined to the app, and won't conflict with the containing page.

Advantageously, the present invention provides for overriding any default styles by including the code "#app_container" along with any other desired selectors for the element for which the style should be overridden. The present invention does not require the use of the code "!important" in any override. The object oriented code (JAVASCRIPT) is appended after any existing scripts in the <head> and does not conflict with any existing scripts including but not limited to GOOGLE ANALYTICS/TAG MANAGER, etc.

Notably, the subdomain value can also be added to the <head> portion of the code or at the very end of the file by adding a DIV to the page <div id="app_container"></div>.

In a further embodiment of the present invention, a gift card is linked or the balance of a gift card is transferred to a card or account registered with the platform of the present invention. Preferably, the gift card or balance of the gift card is useable at a specific retailer associated with the gift card. Alternatively, the gift card or balance of the gift card is useable at a collection of retailer (i.e., across stores in a mall or shopping center). Gift cards are issued directly to a member enrolled in the platform or previously issued gift cards are linked to the account or card of the platform member. Preferably, upon performing a transaction at the merchant with the card or account registered with the platform, the full balance or a partial balance from the gift card is automatically applied to the transaction. Preferably, the partial balance Alternatively, the consumer is asked whether the consumer would like to apply the gift card balance to the transaction via a GUI, pop up message, or any other electronic notification.

Notably, the unconventional and non-generic combination of known elements which form the platform of the present invention provides an improvement to the technology of an integrated platform for merchants and consumers which provides a novel framework for tracking consumer spending as well as providing offers, rewards, and incentives. Advantageously, the platform provides for single enrollment in a single platform which provides offers, rewards, and incentives across a multiplicity of merchants in a platform. The platform solves numerous problems of the prior art, including providing for users to earn rewards that are redeemable at merchants where the user spends as well as earning rewards redeemable outside the merchant. This platform leverages existing computer technology to provide technological solutions to problems of the prior art as well as inventive concepts. Specifically, the present invention provides an integrated platform which provides offers, rewards, and incentives for a variety of merchants. The present invention also provides for automatic electronic redemption for prepurchased offers, non-prepurchased offers, incentives, or rewards, by a user checking out with their payment account or card at a merchant in the platform, either online or at a point of sale, wherein the prepurchased offers, non-prepurchased offers, incentives, or rewards are for the specific merchant or for a mall or shopping center group which includes the specific merchant. The present invention also provides for proximity-based detection by a point-of-sale, a beacon, or any other proximity sensing technology, of a mobile app with prepurchased offers, non-prepurchased offers, incentives, or rewards, and facilitates redemption of the prepurchased offers, non-prepurchased offers, incentives, or rewards through the mobile app when a consumer checks out, online or at a point of sale, with the mobile app or a payment card linked to the mobile app. These particular, practical applications represent improvements to the technology of, inter alia, electronic payment systems, mobile apps, and electronic rewards, offers, and incentives. Unlike the prior art, which requires separate rewards accounts and separate actions for redemptions of incentives, rewards, offers, etc., the present invention provides a technology based solution of an integrated platform which solves these prior art problems. Additionally, the present invention provides for offers, rewards, incentives, etc. for specific "item-level" products and services by, in one embodiment, automatically electronically confirming the purchase upon scanning a code of the good or service and/or by automatic recognition during check out on an online platform. Upon the user presenting their card or account for payment, the platform is notified that the good or service has been purchased and the offer and/or incentive is redeemed and/or the incentive is earned with no further action required by the user.

Certain modifications and improvements will occur to those skilled in the art upon a reading of the foregoing description. Preferably the loyalty and rewards platform of the present invention is compatible with any electronic payment systems or formats, including any point of sale (POS) electronic payment transaction at a merchant. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for a locality-based merchant offers, incentives, or rewards program on a cloud-based platform comprising:
   a platform database hosted on a remote server computer, wherein the remote server computer includes at least one processor operable to receive and transmit one or more sets of instructions;
   a web tier supporting a plurality of consumer applications, merchant applications, and administrative applications, wherein the web tier is hosted in a cloud and provides data and services to a plurality of websites;
   a network services tier hosted on the cloud and providing a backend set of services, the backend set of services operable for real-time communication with financial services parties, wherein the backend set of services are operable to enroll a consumer account in the cloud-based platform, redeem an offer for the consumer account, redeem an incentive for the consumer account, or credit a reward to the consumer account;
   a secured wireless network hosted for a locality of merchants operable to receive an account number or a card number associated with the consumer account as a prerequisite for providing wireless access to a mobile communications device through a wireless router associated with a wireless captive web portal, wherein the consumer account is not charged for the wireless access, and wherein the remote server computer is operable to automatically enroll the consumer account with the associated received account number or the associated received card number in the cloud-based platform;
   a digital cookie including identifying information for the mobile communications device;
   wherein the remote server computer is connected over a network with the web tier and the network services tier;
   wherein the remote server computer, the web tier, and the network services tier are independent of the financial services parties;
   wherein, upon enrollment of the consumer account in the cloud-based platform, the network services tier is further operable to enroll the consumer account in a merchant offers program, incentives program, or rewards program;
   wherein enrollment of the consumer account in the merchant offers program, incentives program, or rewards program occurs automatically upon performing a transaction with the consumer account with a merchant via entry of the account number into a field on a website;
   wherein entry of the account number into a field on a website occurs via an enterprise application on a third-party website;
      wherein the third-party website contains a visually programmed element linked to the cloud-based platform;
      wherein the remote server computer is programmed to:
         receive from a web browser a signal indicating a presence of the enterprise application;
         automatically identify as a source page the third-party website on which the enterprise application has been activated;
         automatically retrieve visual source code corresponding to the third-party website;
         automatically generate and transmit a second web site with visually perceptible elements visually corresponding to the third-party website;
         wherein the signal indicating the presence of the enterprise application is received via a unique subdomain corresponding to the enterprise application alone;
   wherein the remote server computer is operable to receive spend behavior for the consumer account directly from at least one of the financial services parties and track and store the spend behavior for the consumer account in the platform database, wherein the spend behavior includes in-store purchases, online-based purchases, and mobile app-based purchases associated with the enrolled consumer account;
   wherein the network services tier is operable to receive authorization files related to the transaction from the at least one of the financial services parties;
   wherein the network services tier is operable to send the offer, the reward, or the incentive to the mobile application on the mobile communications device in real-time upon receiving the authorization files related to the transaction;
   wherein the remote server computer is further operable to generate at least one advertisement, at least one promotion, and/or at least one marketing incentive based on the spend behavior for the consumer account, apply the at least one advertisement, the at least one promotion, and/or the at least one marketing incentive to the consumer account, and transmit a notification to the mobile communications device;
   wherein the at least one advertisement, the at least one promotion, and/or the at least one marketing incentive is targeted based on an analysis of the spend behavior for the consumer account;
   wherein the at least one advertisement, the at least one promotion, and/or the at least one marketing incentive includes a cross-merchant offer, incentive, or reward, wherein the cross-merchant offer, incentive, or reward is generated by the remote server computer based on spend behavior at a first merchant and is redeemable only at a second merchant;
   wherein a location of the enrollment of the consumer account is determined from geographic coordinates obtained via a geopositioning module on the mobile communications device in combination with a connection to the secured wireless network, wherein an administrative application is operable to restrict enrollment of the consumer account in a competing locality-based merchant offers program, incentives program, or rewards program based on the location of enrollment; and
   wherein the locality of merchants is one group of merchants in a shopping center, mall, or other physical, locality-based commerce center.

2. The system of claim 1, wherein the mobile communications device is connected to the network services tier over the network;
   wherein the mobile communications device includes a mobile communications device application;
   wherein the network services tier is operable to receive clearing files related to the transaction from the at least one of the financial services parties;
   wherein the network services tier is operable to send the offer, the reward, or the incentive to the mobile communications device application on the mobile communications device upon receiving the clearing files related to the transaction.

3. The system of claim 1, further comprising a gift card account for the merchant, wherein the gift card account is linked to the consumer account and is operable to link at least one gift card for a specific merchant, and upon initiating a transaction with the merchant with the consumer account, automatically applying a partial balance or a full balance of the gift card account to the transaction.

4. The system of claim 1, further comprising a prepurchased offer for products or services from the merchant, wherein the prepurchased offer is purchased via a third party distributor, and wherein the network services tier is operable to link the prepurchased offer to the consumer account, and upon initiating a transaction with the merchant with the consumer account, automatically applying the prepurchased offer to the transaction.

5. The system of claim 4, wherein the prepurchased offer is linked to the consumer account through an Application Program Interface (API), the API operable to allow a third-party partner to request credit be applied to the consumer account.

6. The system of claim 1, further comprising an offer for products or services from the merchant, wherein the offer for products or services is activated via click-select on a digital advertisement on a website, an email, or an application, and wherein activation of the offer for products or services adds the offer for products or services to the consumer account, wherein the offer for products or services is automatically redeemed by the consumer account when criteria for the offer for products or services are met.

7. A method for operation of a cloud-based platform comprising:
  a remote server computer of a financial services provider sending transaction data relating to a consumer account registered with the cloud-based platform to a platform database hosted on a cloud, wherein the cloud also includes a network services tier;
    wherein the remote server computer includes at least one processor operable to receive and transmit one or more sets of instructions;
  the network services tier sending a message to an email address associated with the consumer account, a telephone number associated with the consumer account, or a mobile application linked to the consumer account, wherein the mobile application linked to the consumer account is supported by a web tier hosted in the cloud;
  the network services tier communicating in real-time with financial services parties, wherein the remote server computer, the web tier, and the network services tier are independent of the financial services parties;
  the remote server computer automatically enrolling the consumer account in the cloud-based platform via a wireless network captive web portal upon receiving an account number of the consumer account as a prerequisite to a consumer associated with the consumer account receiving wireless network access through a wireless router associated with the wireless network captive web portal, wherein the consumer account is not charged for the wireless network access;
  the remote server computer receiving spend behavior for the consumer account directly from at least one of the financial services parties and tracking and storing the spend behavior for the consumer account, wherein the spend behavior includes in-store purchases, online-based purchases, and mobile app-based purchases associated with the enrolled consumer account;
  the network services tier receiving authorization files related to a transaction from the at least one of the financial services parties;
  the network services tier sending an offer, a reward, or an incentive to the mobile application on a mobile communications device in real-time upon receiving the authorization files related to the transaction;
  the network services tier enrolling the consumer account in a merchant offers program, an incentives program, or a rewards program in the cloud-based platform via an enterprise application on a third-party website,
    wherein the third-party website contains a visually programmed element linked to the cloud-based platform;
    wherein the remote server computer is programmed to:
      receive from a web browser a signal indicating a presence of the enterprise application;
      automatically identify as a source page the third-party website on which the enterprise application has been activated;
      automatically retrieve visual source code corresponding to the third-party website;
      automatically generate and transmit a version of the third-party website with visually perceptible elements visually corresponding to the third-party website;
      wherein the signal indicating the presence of the enterprise application is received via a unique subdomain corresponding to the enterprise application alone;
  the remote server computer generating at least one advertisement, at least one promotion, and/or at least one marketing incentive based on the spend behavior for the consumer account, apply the at least one advertisement, the at least one promotion, and/or the at least one marketing incentive to the consumer account, and transmit a notification to the mobile communications device;
  wherein the at least one advertisement, the at least one promotion, and/or the at least one marketing incentive is targeted based on an analysis of the spend behavior for the consumer account;
  wherein the at least one advertisement, the at least one promotion, and/or the at least one marketing incentive includes a cross-merchant offer, incentive, or reward, wherein the cross-merchant offer, incentive, or reward is generated by the remote server computer based on spend behavior at a first merchant and is redeemable only at a second merchant;
  wherein a location of the enrollment of the consumer account is determined from geographic coordinates obtained via a geopositioning module on the mobile communications device in combination with a connection to the secured wireless network, wherein an administrative application is operable to restrict enrollment of the consumer account in a competing locality-based merchant offers program, incentives program, or rewards program based on the location of enrollment and
  wherein the merchant offers program, the incentives program, or the rewards program corresponds to a locality of merchants, wherein the locality of merchants is one group of merchants in a shopping center, mall, or other physical, locality-based commerce center.

8. The method of claim 7, wherein the transaction data includes clearing files.

9. The method of claim 7, wherein the message includes a notification of enrollment in the merchant offers program, incentives program, or rewards program registered with the cloud-based platform, wherein the transaction was performed at a merchant associated with the merchant offers program, incentives program, or rewards program.

10. The method of claim 7, wherein the message includes a notification of rewards at a merchant associated with the transaction data.

11. The method of claim 7, further comprising, upon initiation of the transaction, the network services tier identifying a gift card account linked to the consumer account and associated with a merchant for the transaction, wherein the gift card account is linked to at least one gift card for a specific merchant, and the network services tier automatically applying a partial balance or a full balance of the gift card account to the transaction.

12. The method of claim 7, further comprising, upon initiation of the transaction, the network services tier identifying a prepurchased offer for goods or services from a merchant, wherein the prepurchased offer is purchased via a third party distributor, and linking the prepurchased offer to the consumer account, and the network services tier automatically applying the prepurchased offer to the transaction.

13. The method of claim 12, wherein the prepurchased offer is linked to the consumer account through an Application Program Interface (API), the API operable to allow a third-party partner to request credit be applied to the consumer account.

14. The method of claim 7, further comprising:
the remote server computer receiving a notification of a click-select activation of the offer on a digital advertisement on a website, an email, or an application; and
the remote server computer adding the offer to the consumer account, wherein the offer is automatically redeemed by the consumer account when criteria for the offer are met.

15. A system for a locality-based merchant offers, incentives, or rewards program on a cloud-based platform comprising:
a platform database hosted on a remote server computer, wherein the remote server computer includes at least one processor operable to receive and transmit one or more sets of instructions;
a web tier supporting a plurality of consumer applications, merchant applications, and administrative applications, wherein the web tier is hosted in a cloud and provides data and services to a plurality of websites;
a network services tier hosted on the cloud and providing a backend set of services, the backend set of services operable for real-time communication with financial services parties, wherein the backend set of services are operable to enroll a consumer account in the cloud-based platform, redeem an offer for the consumer account, redeem an incentive for the consumer account, or credit a reward to the consumer account;
wherein the remote server computer, the web tier, and the network services tier are independent of the financial services parties;
wherein, upon enrollment of the consumer account in the cloud-based platform, the network services tier is further operable to enroll the consumer account in a merchant offers program, incentives program, or rewards program;
wherein enrollment of the consumer account in the merchant offers program, incentives program, or rewards program occurs automatically upon performing a transaction with the consumer account at the merchant via entry of an account number into a field on a website, via entry of the account number into a field on a mobile application, via a magnetic card swipe transaction, via a smart card transaction, via a Near Field Communication (NFC) transaction, via a Radio Frequency (RF) transaction, or through taking a photo of a card associated with the consumer account;
wherein entry of the account number into a field on a website occurs via an enterprise application on a third-party website;
wherein the third-party website contains a visually programmed element linked to the cloud-based platform;
wherein a computer server is programmed to:
receive from a web browser a signal indicating a presence of the enterprise application;
automatically identify as a source page the third-party website on which the enterprise application has been activated;
automatically retrieve visual source code corresponding to the third-party website;
automatically generate and transmit a version of the third-party website with visually perceptible elements visually corresponding to the third-party website;
wherein the signal indicating the presence of the enterprise application is received via a unique subdomain corresponding to the enterprise application alone;
wherein the remote server computer is operable receive spend behavior for the consumer account directly from at least one of the financial services parties and track and store the spend behavior for the consumer account in the platform database, wherein the spend behavior includes in-store purchases, online-based purchases, and mobile app-based purchases associated with the enrolled consumer account wherein the network services tier is operable to receive authorization files related to a transaction from the at least one of the financial services parties;
wherein the network services tier is operable to send the offer, the reward, or the incentive to the mobile application on the mobile communications device in real-time upon receiving the authorization files related to the transaction;
the enterprise application further operable to display rewards progress, see available offers, available incentives, and available rewards from merchants, and view transaction history;
wherein the remote server computer is further operable to generate at least one advertisement, at least one promotion, and/or at least one marketing incentive based on the spend behavior for the consumer account, apply the at least one advertisement, the at least one promotion, and/or the at least one marketing incentive to the consumer account, and transmit a notification to the mobile communications device;
wherein the at least one advertisement, the at least one promotion, and/or the at least one marketing incentive is targeted based on an analysis of the spend behavior for the consumer account;
the network services tier further operable to provide the offers, the incentives, or the rewards for the merchant offers program, incentives program, or rewards program based on consumer proximity to or consumer presence within a merchant location;

wherein a location of enrollment of the consumer account is determined from geographic coordinates obtained via a geopositioning module on the mobile communications device in combination with a connection to the secured wireless network, and wherein an administrative application is operable to restrict the enrollment of the consumer account from a competing locality-based merchant offers program, incentives program, or rewards program based on the location of enrollment; and wherein a locality of merchants is one group of physical merchants in a shopping center or mall.

16. The system of claim 15, wherein enrollment of the consumer account in the cloud-based platform occurs in conjunction with making a reservation for goods or services on a web page or the mobile application.

* * * * *